US005434964A

United States Patent [19]

Moss et al.

[11] Patent Number: 5,434,964

[45] Date of Patent: Jul. 18, 1995

[54] MOVEMENT AND REDIMENSIONING OF COMPUTER DISPLAY WINDOWS

[75] Inventors: Nicolas N. Moss, San Jose; Ronald Marianetti, II, Mountain View, both of Calif.

[73] Assignee: Radius Inc., Sunnyvale, Calif.

[21] Appl. No.: 27,005

[22] Filed: Mar. 5, 1993

Related U.S. Application Data

[63] Continuation of Ser. No. 470,728, Jan. 25, 1990, abandoned.

[51] Int. Cl.[6] ..................... G06F 3/153

[52] U.S. Cl. ..................... 395/157; 395/161

[58] Field of Search ............... 395/157, 161, 137, 155, 395/159

[56] References Cited

U.S. PATENT DOCUMENTS

| | | | |
|---|---|---|---|
| 4,179,823 | 12/1979 | Sullivan et al. | 35/10.24 |
| 4,225,929 | 9/1980 | Ikeda | 364/521 |
| 4,267,555 | 5/1981 | Boyd et al. | 340/748 |
| 4,533,910 | 8/1985 | Sukonick et al. | 340/721 |
| 4,542,377 | 9/1985 | Hagen et al. | 340/727 |
| 4,635,212 | 1/1987 | Hatazawa | 395/137 X |
| 4,704,697 | 11/1987 | Kiremidjian et al. | 364/518 |
| 4,712,191 | 12/1987 | Penna | 364/900 |
| 4,752,828 | 6/1988 | Chapuis et al. | 358/183 |
| 4,769,636 | 9/1988 | Iwami et al. | 340/724 |
| 4,806,920 | 2/1989 | Sawada | 340/727 |
| 4,819,189 | 4/1989 | Kikuchi et al. | 364/521 |
| 4,831,368 | 5/1989 | Masimo et al. | 340/720 |
| 4,831,556 | 5/1989 | Oono | 364/521 |
| 4,845,643 | 7/1989 | Clapp | 364/518 |
| 4,876,488 | 10/1989 | Gentile | 315/378 |
| 4,890,257 | 12/1989 | Anthias et al. | 364/900 |
| 4,931,960 | 6/1990 | Morikawa | 364/519 |
| 4,947,344 | 8/1990 | Hayashi et al. | 395/137 X |
| 4,952,920 | 8/1990 | Hayashi | 340/727 |
| 5,001,697 | 3/1991 | Torres | 395/159 X |
| 5,146,212 | 9/1992 | Venolia | 340/709 |
| 5,227,771 | 7/1993 | Kerr et al. | 395/157 X |

FOREIGN PATENT DOCUMENTS

0156116A3 2/1985 European Pat. Off. .

OTHER PUBLICATIONS

Microsoft Windows Step by Step (Trademark of Microsoft Corporation 1992) pp. 11-13.

E. S. Cohen, et al., "Automatic Strategies in the Siemens RTL Tiled Window manager," pp. 111-119, 2nd IEEE Conference on Computer Workstations, Mar. 7-10, 1988 , Santa Clara, Calif., U.S.A.

*Primary Examiner*—Heather R. Herndon
*Assistant Examiner*—Vo Nguyen
*Attorney, Agent, or Firm*—Stuart P. Meyer; Elizabeth F. Enayati

[57] ABSTRACT

A computer display system includes a display screen capable of flipping between portrait orientation and landscape orientation and includes a method for repositioning and resizing display windows in response to flipping between such oprientations of the display screen. The windows are moved and resized according to a set of rules to yield displays which take advantage of the new orientation. Where the computer display system includes coordinated, multiple display screens, images controlled for display on fixed-orientation display screens do not change as a result of a flip between orientations of a variable-orientation display screen.

3 Claims, 55 Drawing Sheets

MOVEMENT AND REDIMENSIONING OF COMPUTER DISPLAY WINDOWS

This is a continuation of application Ser. No. 07/470,728 filed 25 Jan. 1990, now abandoned.

37 C.F.R. §1.71 Authorization

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATIONS

| Inventor | Assignee | Appl. No. | Date Filed | Class |
|---|---|---|---|---|
| Nguyen | Radius, Inc. | 07/447,110 | 12/6/89 | 231 |
| Oyama | Radius, Inc. | 07/444,371 | 12/1/89 | 291 |
| Oyama | Radius, Inc. | 07/444/373 | 12/1/89 | 291 |

MICROFICHE APPENDIX

This document includes a microfiche Appendix comprising three microfiche for a total of 158 frames.

BACKGROUND OF THE INVENTION

Traditionally, computer display screens have been designed either to provide a "portrait" orientation, in which the vertical dimension is greater than the horizontal dimension, or to provide a "landscape" orientation, in which the horizontal dimension is greater than the vertical dimension. Recent advances in technology have made possible the use of both portrait and landscape orientations with the same computer. Some computer display systems allow the user of the computer to reposition a display screen between portrait and landscape orientations, and some computers allow the simultaneous use of multiple display screens. When the orientation of a display screen is repositioned between portrait and landscape orientations, some display area is necessarily lost from view and other area is gained. In a computer system that uses "window" based displays, the area that is lost may include important portions of a window necessary to allow the user to move or resize the window. There may also be other screens displaying data which do not change in orientation. In order to ensure that the resulting display is usable, some method for automatically redefining the coordinate system of the computer displays in the system, and resizing and moving windows, is desirable.

SUMMARY OF THE INVENTION

Accordingly, the present intention provides a method to resize and move windows on a computer display system when a display screen comprising part or all of the computer display system is repositioned between portrait and landscape orientations. Consideration is given to the display area lost due to the change in orientation, the display area gained due to the change in orientation, and, if multiple display screens are involved, whether the change in orientation of one screen should cause a change in the coordinate definitions of any other screens.

BRIEF DESCRIPTION OF THE DRAWINGS

FIGS. 11(*a*) and 11(*b*) detail the window resizing portion of the control panel display window with the auto-rezoom facility of the window resizing feature enabled and disabled, respectively.

FIG. 13(*b*) shows a block diagram of software support routines in accordance with the present invention.

DETAILED DESCRIPTION OF THE INVENTION

Figure 1A:
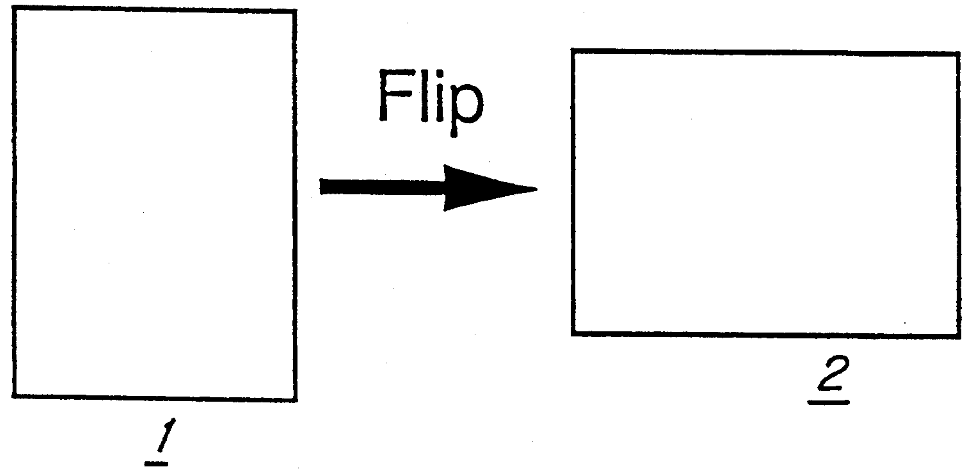
FIG. 1*a* shows the change from portrait to landscape orientation.
Figure 1B:
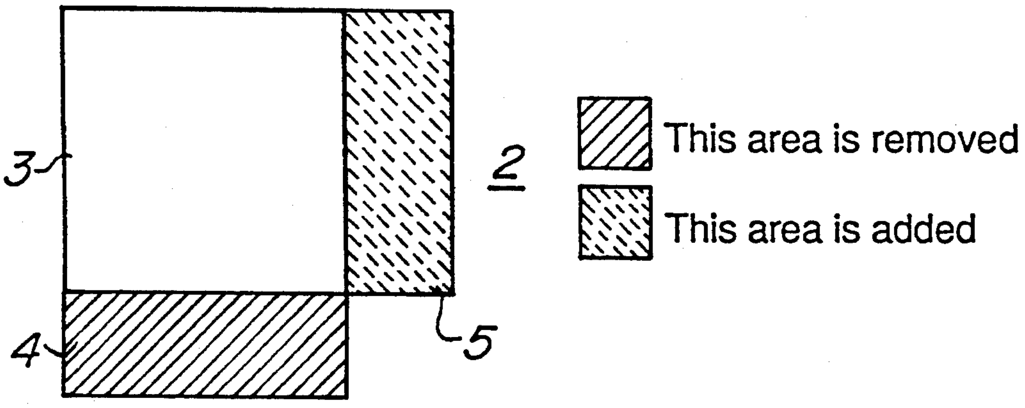
FIG. 1*b* shows the display area removed and added as the result of the change in orientation illustrated in FIG. 1*a*.

Referring now to FIG. 1*a*, there is shown a computer display screen which may be operated either in portrait orientation 1 or landscape orientation 2. With some display screens, it is possible to reposition, or "flip" the orientation of the screen at any time. FIG. 1*b* shows that when such a flip occurs from portrait orientation 1 to landscape orientation 2, some display area 4 will be removed, a corresponding area 5 will be added, and some display area 3 will be neither removed nor added.

Figure 2:
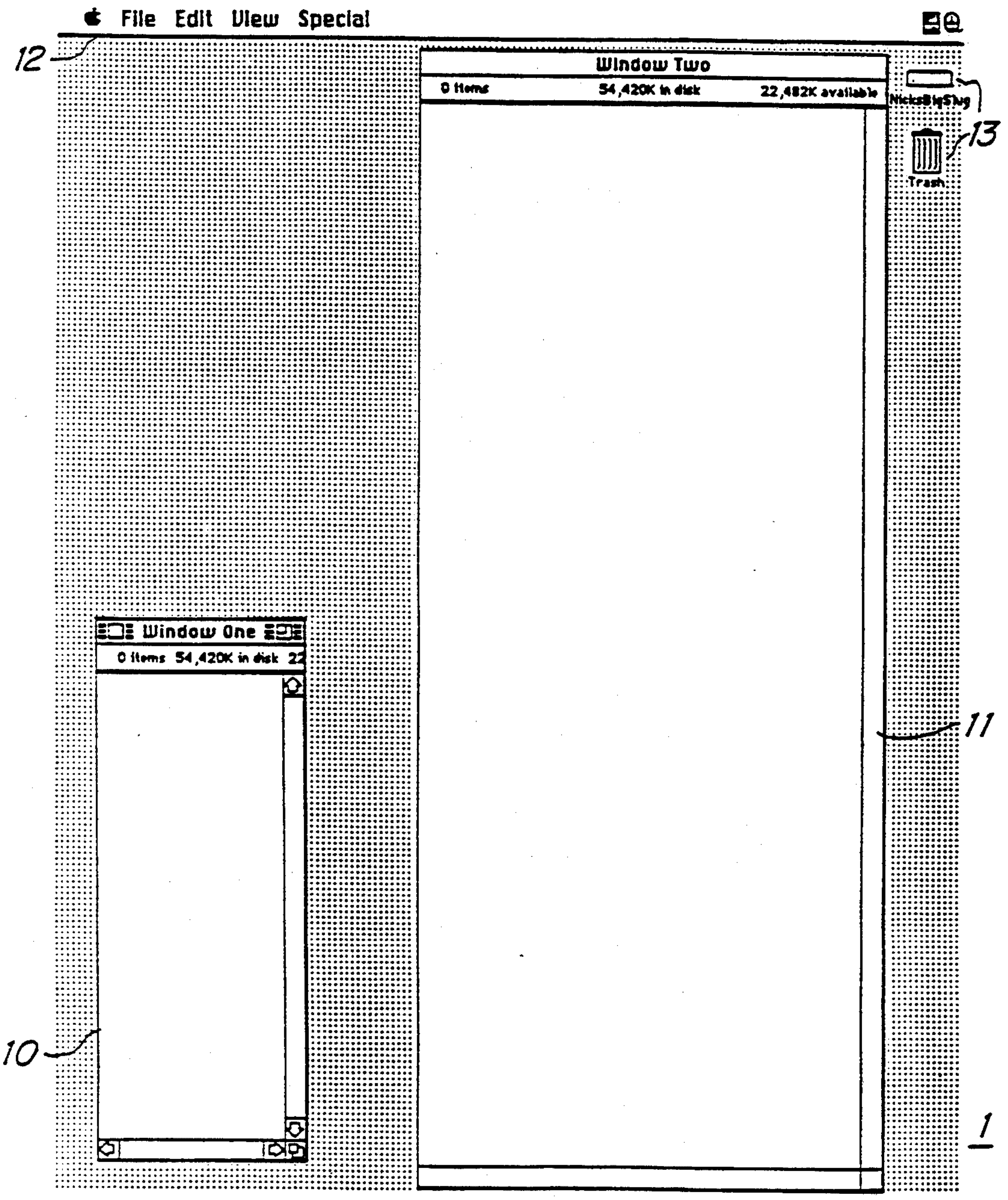
FIG. 2 shows a portrait orientation screen with two windows.
Figure 3:
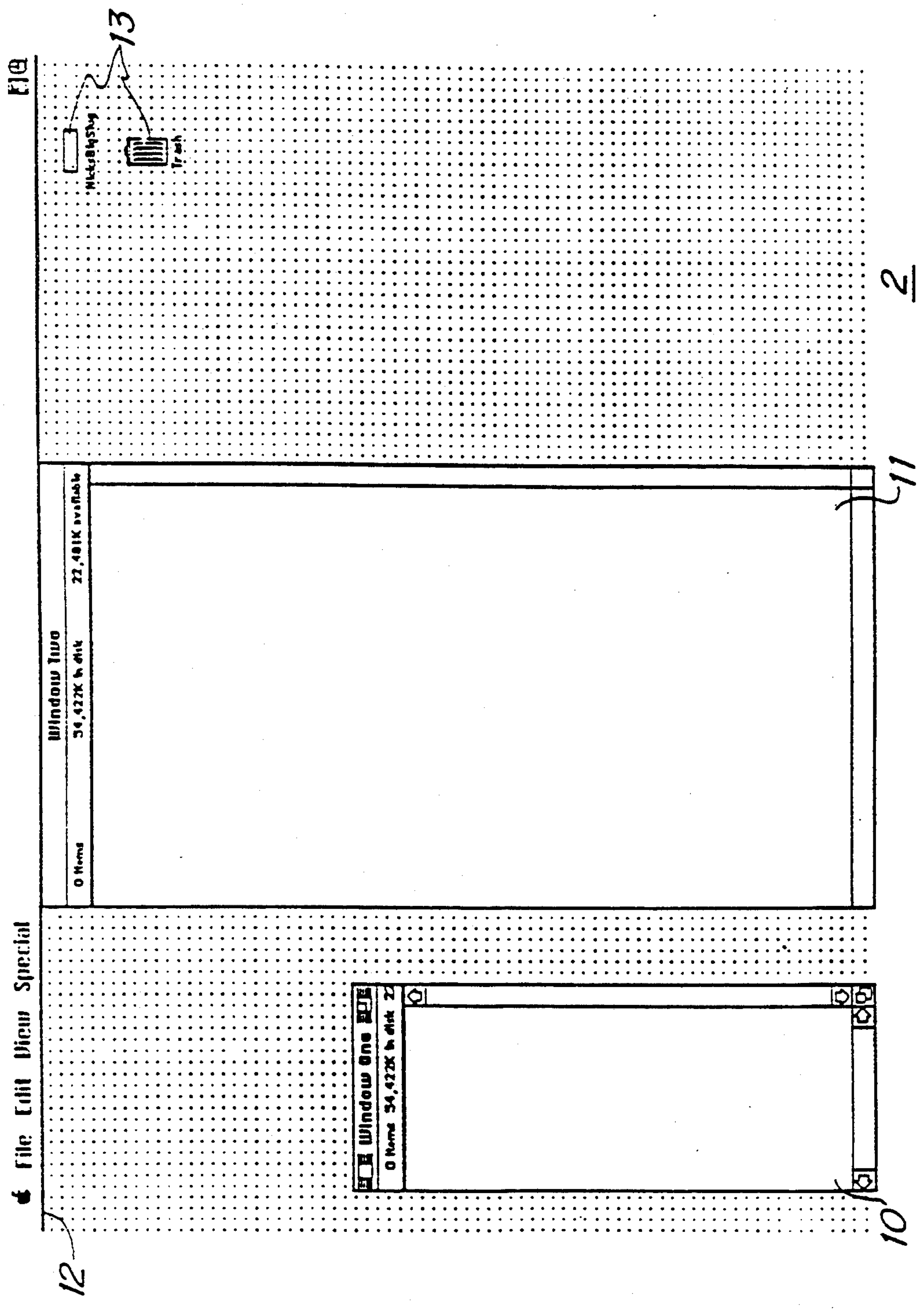
FIG. 3 shows how the screen of FIG. 2 is displayed in landscape orientation in accordance with the present invention.

FIG. 2 shows a display 1 in portrait orientation with a smaller window 10, a larger window 11, a main menu bar 12 and two icons 13. In accordance with the present invention, a flip from the portrait orientation of FIG. 2 results in the resizing or moving of the smaller and larger windows 10, 11, the main menu bar 12 and the two icons 13. The display which results from such a flip is shown in FIG. 3. The smaller window 10 is moved vertically upward to fit entirely within the confines of the landscape display 2, the vertical dimension of the larger window 11 is reduced to fit entirely within the confines of the landscape display 2, the horizontal dimension of the main menu bar 12 is increased to completely reach from the left side of the landscape display 2 to the right side of the landscape display 2, and the icons 13 are moved further away from the larger window 11.

It is desirable to have windows and menu text which were visible and accessible before a flip remain visible and accessible after a flip. It is also desirable to have the portions of windows which were accessible before the flip remain accessible after a flip. If the computer display system makes use of other display screens than the one which is flipped, then it is desirable that the impact of a flip on those other display screens should be minimal. In addition, if the main menu bar appears before the flip, then it must change in size in accordance with the new dimensions of the flipped display screen. Similarly, icons must remain accessible in both orientations of the display screen.

Accordingly, the present invention determines which display screen in a computer system having multiple display screens should control a particular window. This is accomplished by weighting the importance of the various edges of a window, determining which window edges appear on which display screen, and computing a weighted sum for each display screen. One embodiment of the present invention uses the following weighting scheme:

8 is added to the weighted sum for a display screen if that display screen contains the top edge of the window.

4 is added to the weighted sum for a display screen if that display screen contains the left edge of the window.

2 is added to the weighted sum for a display screen if that display screen contains the right edge of the window.

1 is added to the weighted sum for a display screen if that display screen contains the bottom edge of the window.

Thus, if a display screen contains the entire window, the sum is 15, and if the display screen does not contain any portion of the window, the sum is 0. The display screen which has the highest sum for a window is considered to control that window. If no display screen contains a sum greater than 0, the window is controlled by whichever display screen contains the main menu bar. The top edge of a window is considered the most important edge because it normally contains the title bar for the window, which is used for manual placement, zooming, and closure of the window.

In accordance with the present invention, when a display screen which contains the entirety of a window is flipped, the window is resized and moved as required to ensure that the window remains in its entirety on the flipped display screen. An example of this is shown in FIGS. 1 and 2, where the small and large windows 10 and 11 are retained entirely in the landscape display 2 after the flip. A vertical move of the smaller window 10 allows it to fit within the landscape display 2. The larger window 10 in the portrait orientation display 1 of FIG. 2 is too tall to fit in the landscape display 2 of FIG. 3, even if the larger window 10 is moved as far up vertically as possible. Therefore, the larger window 10 is resized to a smaller vertical dimension in order to allow the window 10 to fit in the landscape display 2 of FIG. 3. In the preferred embodiment of the invention, this resizing is accomplished by software which mimics the code generated by a pointing device (or "mouse") to resize windows manually.

In the preferred embodiment, the initial location and size of windows 10 and 11 are stored in memory when the display screen is flipped so that flipping the display screen back to its original orientation results in a display identical to the initial display. However, if the user changes the size or locations of windows on the flipped display screen, flipping the display screen back to its original orientation will not result in a display identical to the initial display.

Figure 4:
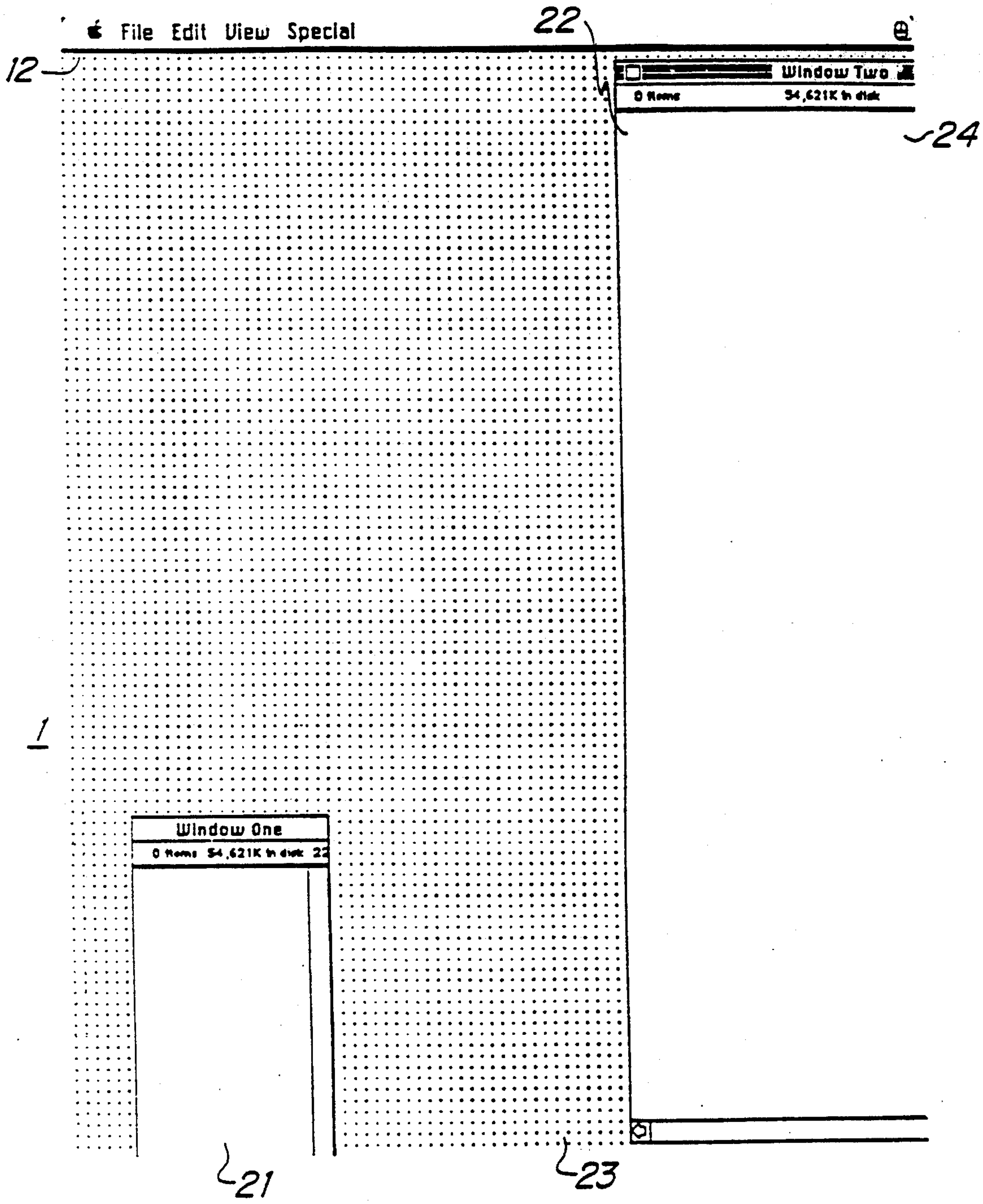
FIG. 4 shows a portrait orientation screen with portions of two windows.
Figure 5:
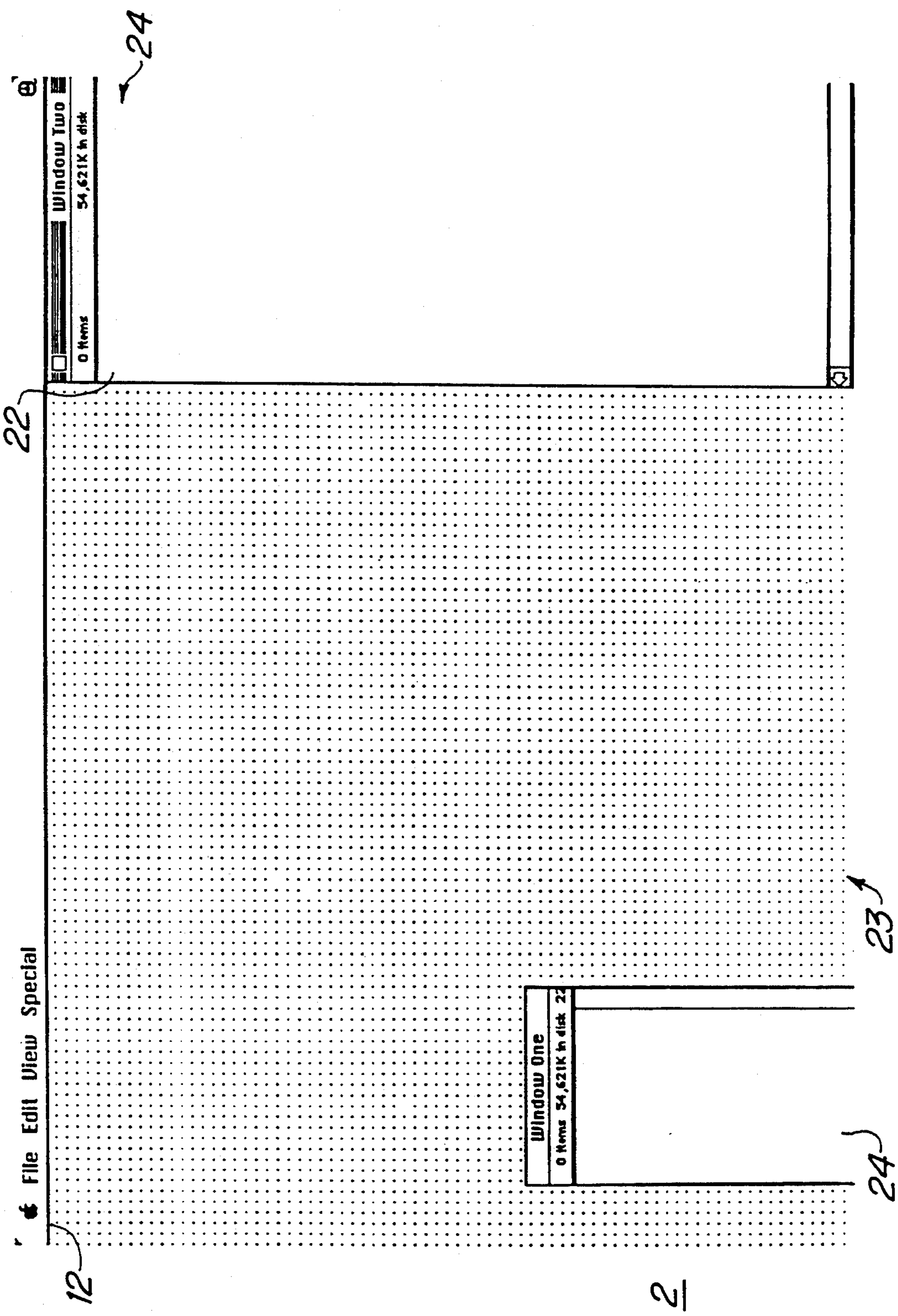
FIG. 5 shows how the screen of FIG. 4 is displayed in landscape orientation in accordance with the present invention.
Figures 6, 6A, 6B:
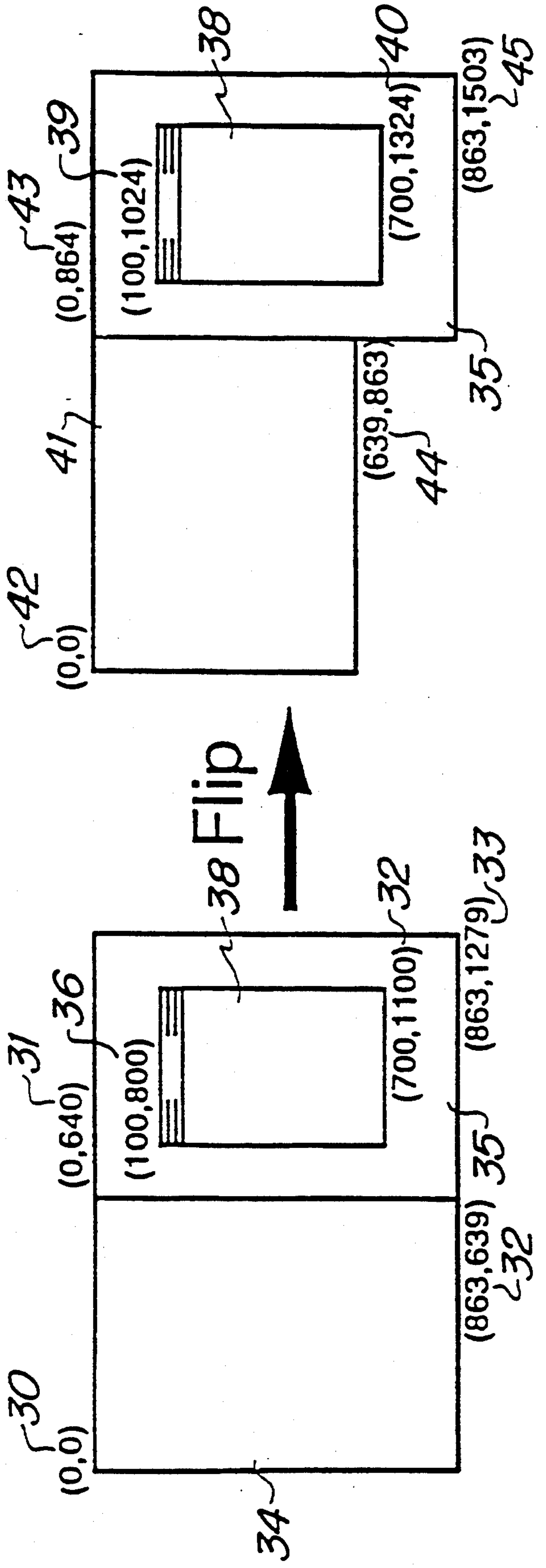
FIGS. 6*a* and 6*b* show the portion of a display on a filed-orientation screen, both before and after the orientation of a second associated screen is repositioned from portrait to landscape orientation, respectively.

Referring now to FIG. 4, windows 21 and 22 are shown only partially contained in the portrait display 1. In accordance with the present invention, when the display screen is flipped, the top-left edge of each of the windows 21, 22 is kept the same distance from whichever edges of the display that the window extends beyond, as illustrated in FIG. 5. In FIG. 4, the window 21 extends below the bottom edge 23 of the portrait display 1. When the display screen is flipped as shown in FIG. 5, the top-left edge of window 21 is maintained at the same distance from the lower edge 23 of the landscape display 2. Similarly, in FIG. 4, the window 22 extends past the right edge 24 of the portrait display 1. When the display screen is flipped, as shown in FIG. 5, the top-left edge of window 22 is maintained at the same distance from the right edge 24 of the landscape display 2. The vertical dimension of window 22 is also decreased in the change of orientation from FIG. 4 to FIG. 5 to maintain the lower edge of window 22 on the lower border of the landscape display 2, as illustrated in FIG. 5. As in the previously described situation, the initial location and size of the windows are stored in memory for use in the event the display screen is flipped back to its original orientation without the user having made any changes to the size or location of the windows.

Referring now to FIG. *6a*, a coordinate system is used to define locations on the display screens 34, 35. In this case, display screen 34 is a portrait orientation on a display screen capable of flipping, and display 35 is a portrait orientation on a fixed-orientation display screen. One embodiment of the present invention uses a coordinate system having its origin 30 at the top-leftmost displayed pixel and including a first number that refers to the number of pixels below the origin, and a second number that refers to the number of pixels to the right of the origin. Thus, as illustrated in FIG. *6a*, if the portrait orientation of display screen 34 is 865 pixels high by 640 pixels wide, the bottom-rightmost pixel 32 will have the coordinates (863, 639). Similarly, the top-leftmost pixel 31 of the fixed-orientation display 35 will have the coordinates (0,640) and the bottom-rightmost pixel 33 of the fixed-orientation display screen 35 will have the coordinates (863, 1279). A window 38 contained entirely on the fixed-orientation display screen 35, as illustrated in FIG. *6a*, has a top left corner 36 with the coordinates (100,800) and a lower right corner 37 with the coordinates (700, 1100).

When the display screen 34 is flipped, the coordinate system changes. Referring now to FIG. *6b*, the portrait display screen 34 of FIG. *6a* is illustrated as flipped to a landscape-oriented display screen 41. The origin 42 of the landscape-oriented display screen 41 retains the coordinates (0,0), but the bottom-rightmost corner 44 of the landscape-oriented display screen 41 now has the coordinates (639, 863). The top-rightmost pixel 43 of the fixed-orientation display screen 35 now has the coordinates (0,864), and the bottom-rightmost pixel 45 of display screen 35 now has the coordinates (863, 1503). The coordinates of the top-leftmost corner 39 and bottom-rightmost 40 corner of the window 38 in the fixed portrait-oriented display screen 35 become (100, 1024) and (700, 1324), respectively. The local coordinate system of the fixed-orientation display screen 35 thus changes as a result of flipping the portrait-oriented display screen 34 to a landscape-oriented display screen 41. In the preferred embodiment, the coordinates of a window 38 controlled by a fixed-orientation display screen 35 are adjusted so that the location of the window 38 relative to the top-leftmost pixel 43 of the fixed-orientation display screen 35 remains unchanged after the other display screen 34 is flipped.

Figure 7:
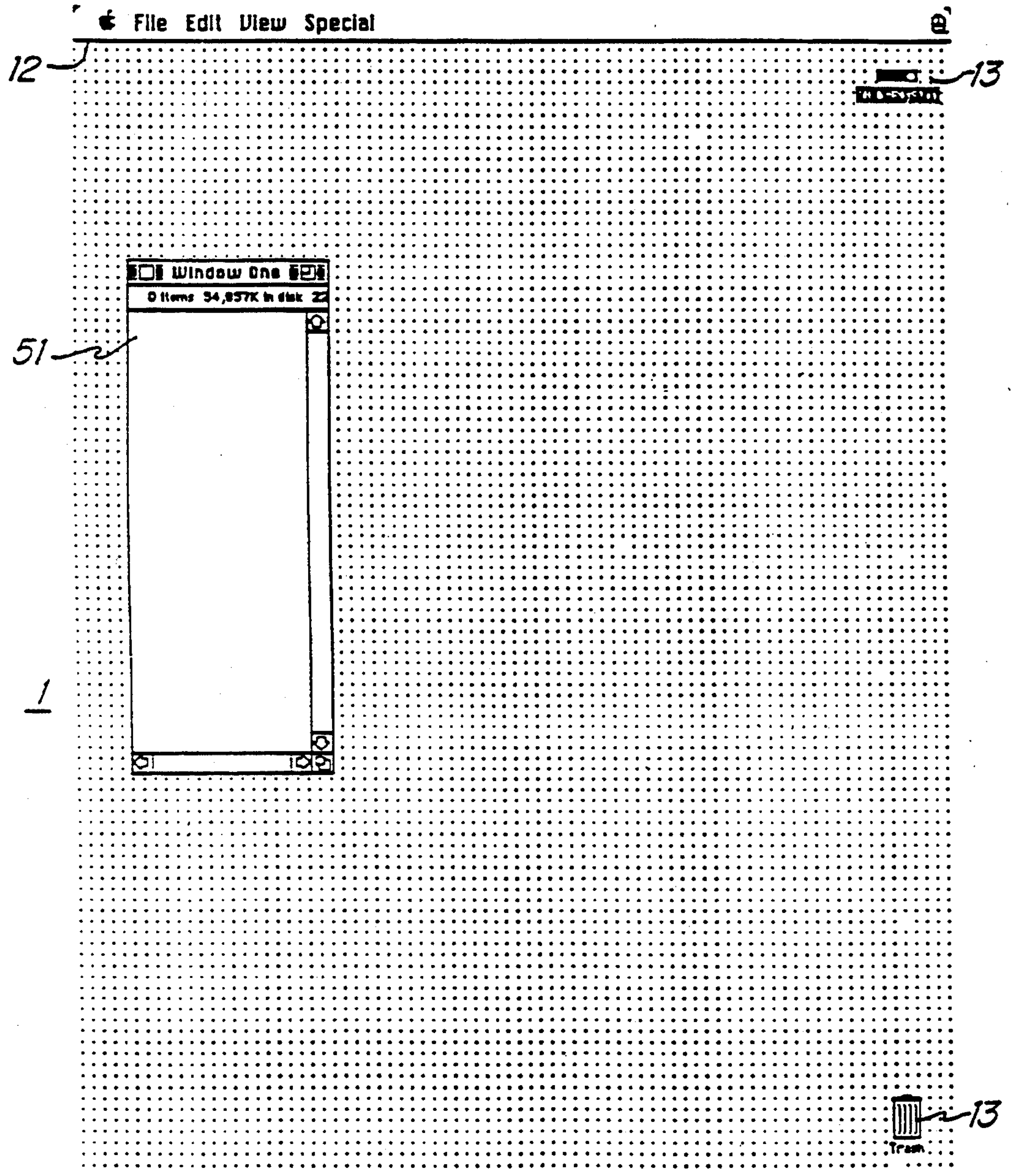
FIG. 7 shows a screen in portrait orientation with one window.
Figure 8:
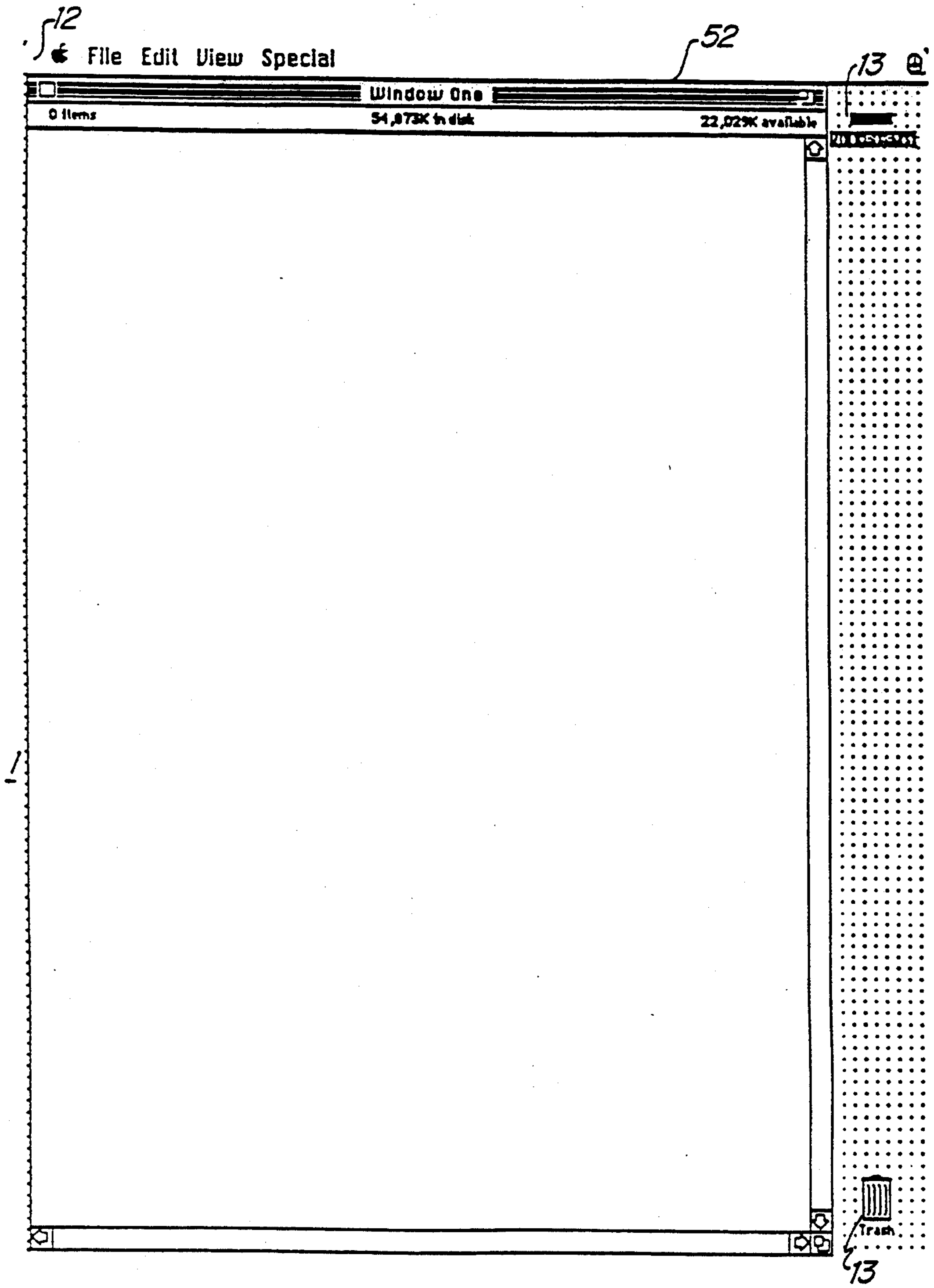
FIG. 8 shows a screen in portrait orientation with the same window as shown in FIG. 7 after that window has been enlarged by zooming in the traditional manner.
Figure 9:
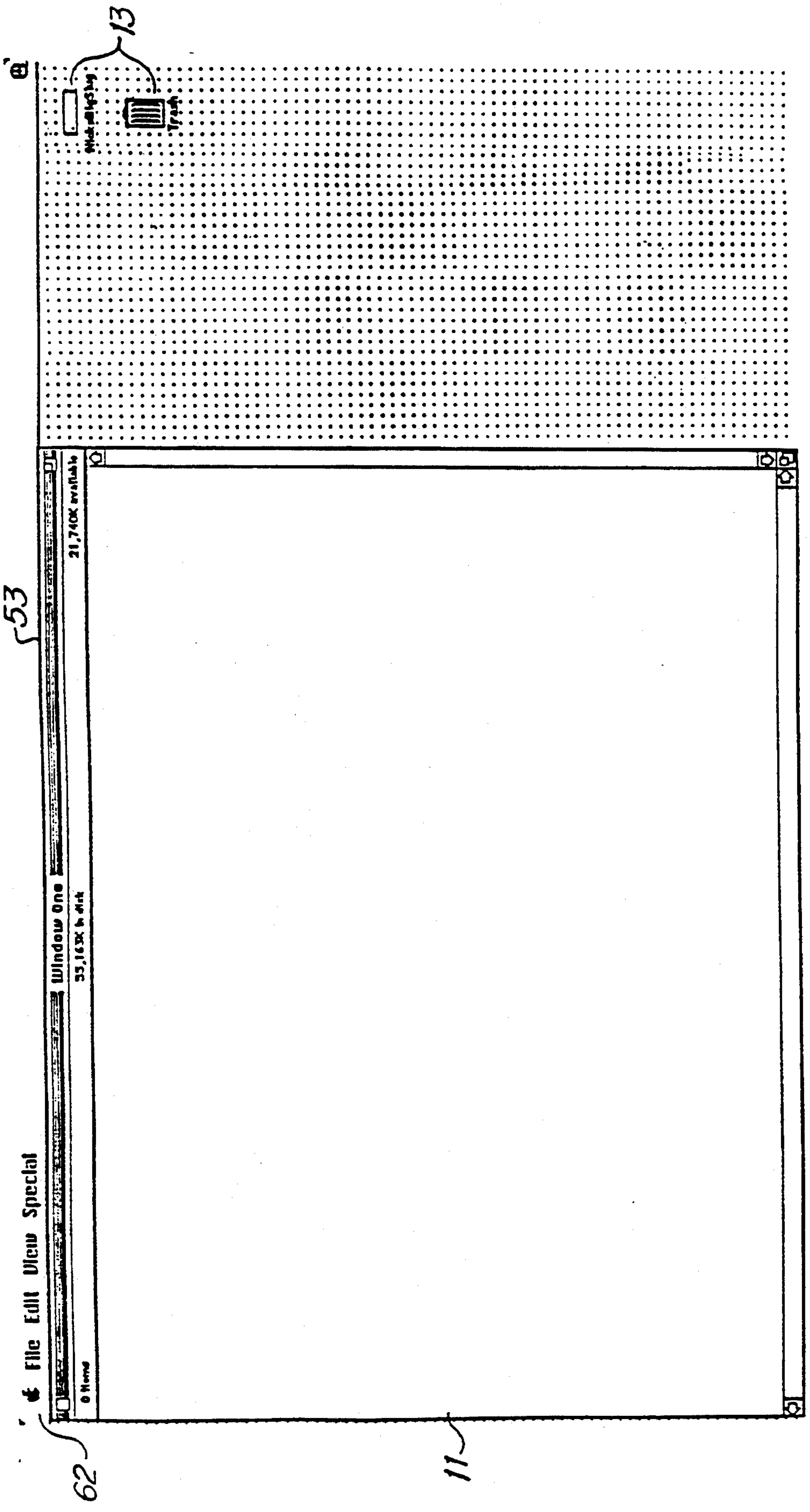
FIG. 9 shows how the screen of FIG. 8 is displayed in landscape orientation in accordance with the present invention.
Figure 10:
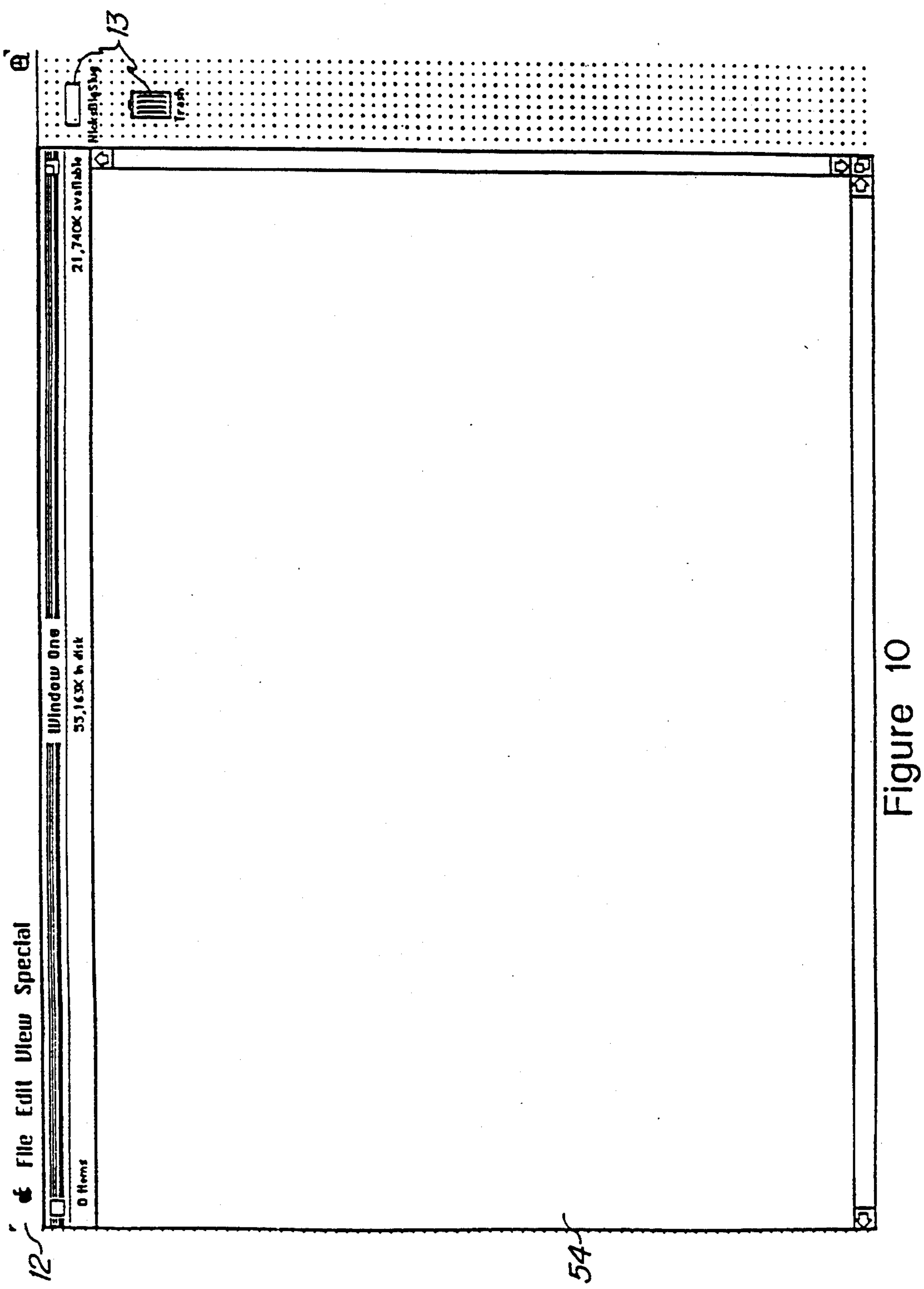
FIG. 10 shows a screen in landscape orientation with the same window as shown in FIG. 8 after the screen orientation has been repositioned from portrait to landscape orientation with the automatic zoom feature operative in accordance with the present invention.

FIGS. 7 through 10 illustrate how windows may be enlarged via "zooming" in accordance with the present invention. In FIG. 7, the portrait-oriented display screen 1 completely contains a window 51, and also contains a title bar 12 and icons 13. FIG. 8 shows the window 51 of FIG. 7 enlarged via conventional zoom processing available in the prior art. The zoomed window 52 in FIG. 8 is illustrated as enlarged to fill the screen as completely as possible without covering the menu bar 12 or the icons 13. FIG. 9 shows the result of flipping the portrait-oriented display screen 1 of FIG. 8 to a landscape-oriented display screen 2. The vertical dimension of the window 52 in FIG. 8 is reduced in the window 53 of the landscape-oriented display screen 2 of FIG. 9 in order that the entire window 53 remains on the landscape-oriented display screen 2 of FIG. 9. The icons 13 are also moved so that they fit in the rightmost area of the landscape-oriented display screen 2 of FIG. 9. Conventional zoom processing of the window 52 in FIG. 8 thus does not result in sufficient expansion of the window 53 to fill the screen after the screen has been flipped to a landscape-oriented display screen 2, as illustrated in FIG. 9. In order to enlarge the window 53 to completely fill the landscape-oriented display screen 2 of FIG. 9, second conventional zoom processing must be used to expand the window 54, as illustrated in FIG. 10. The window 54 is thus enlarged with a different form factor of height and width to substantially fill the screen as completely as possible without covering the menu bar 12 or the icons 13.

In accordance with the Preferred embodiment of the present invention, a window may be automatically zoom processed when the display screen is flipped. FIG. 10 is illustrative of the result obtained when the display screen of FIG. 8 is flipped from portrait to landscape orientation, and the window 52 is automatically zoom processed. In accordance with the present invention, automatic zoom processing maintains the same relative spacing between the edges of windows and the corresponding edges of display screens so that the menu bar 12 and icons 13 remain accessible. Conventional data processing may be used (e.g., "Cleanup Desktop" program available from Apple Computer, Inc.) to move the icons 13 in response to a flip between orientations of the display screen. Some windows, particularly windows known as "dialog boxes," are not capable of being resized by conventional window processing, and are not resized in accordance with the present invention following a flip between display screen orientations.

Figure 11:
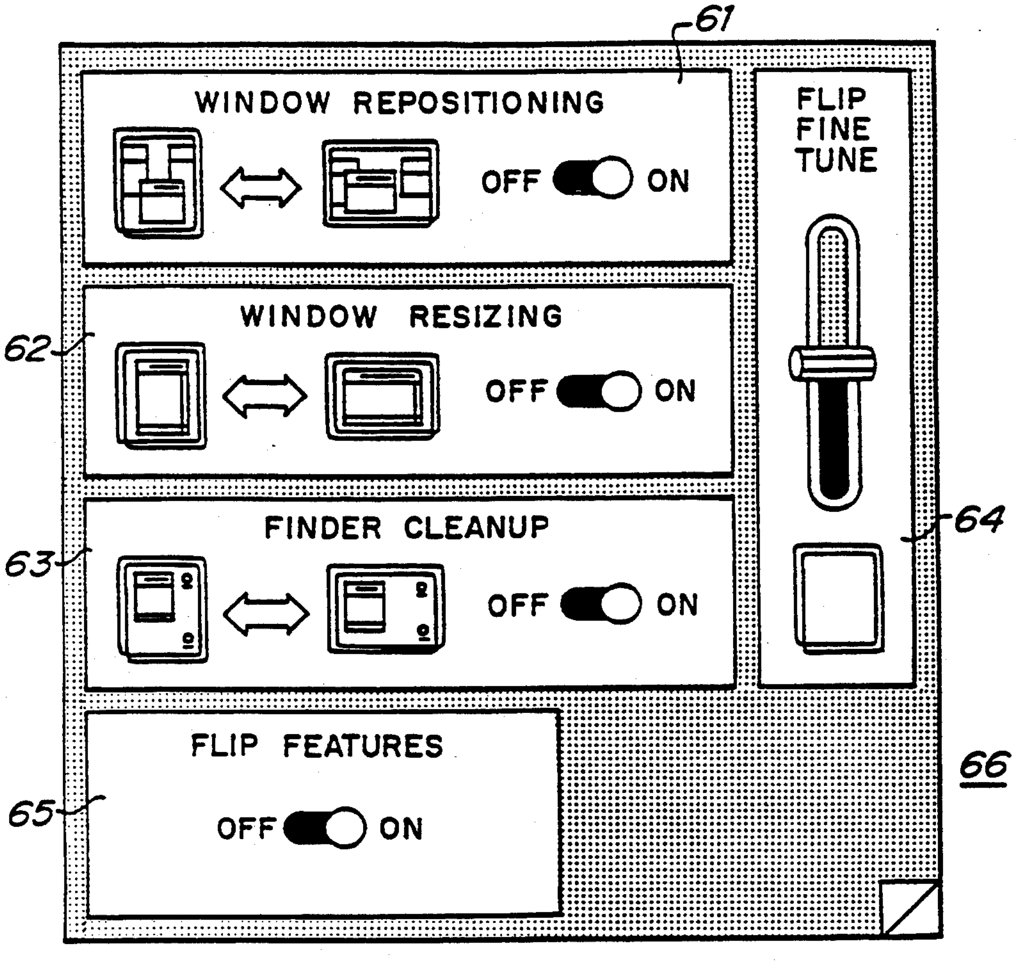
FIG. 11 shows a control panel display window for selecting features in accordance with the present invention.
Figure 11A:
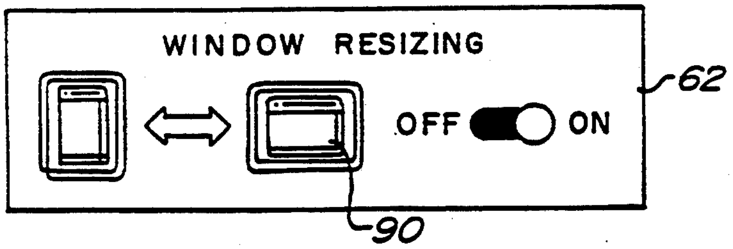
Figure 11B:
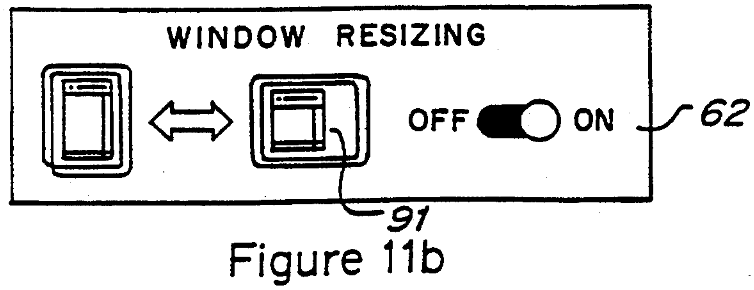

Referring now to FIG. 11, there is shown a display of a control panel 66 which enables a user to disable certain features provided in accordance with the present invention. The image of a control panel switch 61 on this display 66 indicates that the window positioning feature is enabled. Another image of a control panel switch 62 on this display 66 indicates that the window resizing feature is enabled. A third image of a control panel switch 63 on this display 66 indicates that the finder cleanup feature, which relocates icons, is enabled. The image of a control 64 on this display 66 indicates adjustment of the display after the screen flip to account for any minor irregularities. Another image of a switch 65 is provided on this display 66 which indicates that all of the flip features are enabled. A user may alter any of the switch images 61 through 65 using conventional window-and-button technology by positioning a display cursor (not shown) over the desired switch position and clicking a button on the mouse of the computer system (not shown).

Referring now to FIGS. 11(*a*) and 11(*b*), more detail is shown regarding the image of the window resizing control panel switch 62. The image of this control panel switch 62 indicates two functions. The first function, already described, is to allow the window resizing feature to be disabled. The second function is to allow the auto-rezoom feature, in accordance with the present invention, to be disabled. When a user points to, and selects, the icon 90 of FIG. 11(*a*) with the mouse, using conventional window-and-button technology, the icon 90 changes to the icon 91 of FIG. 11(*b*), indicating that the auto-rezoom feature has been disabled.

Figure 12:
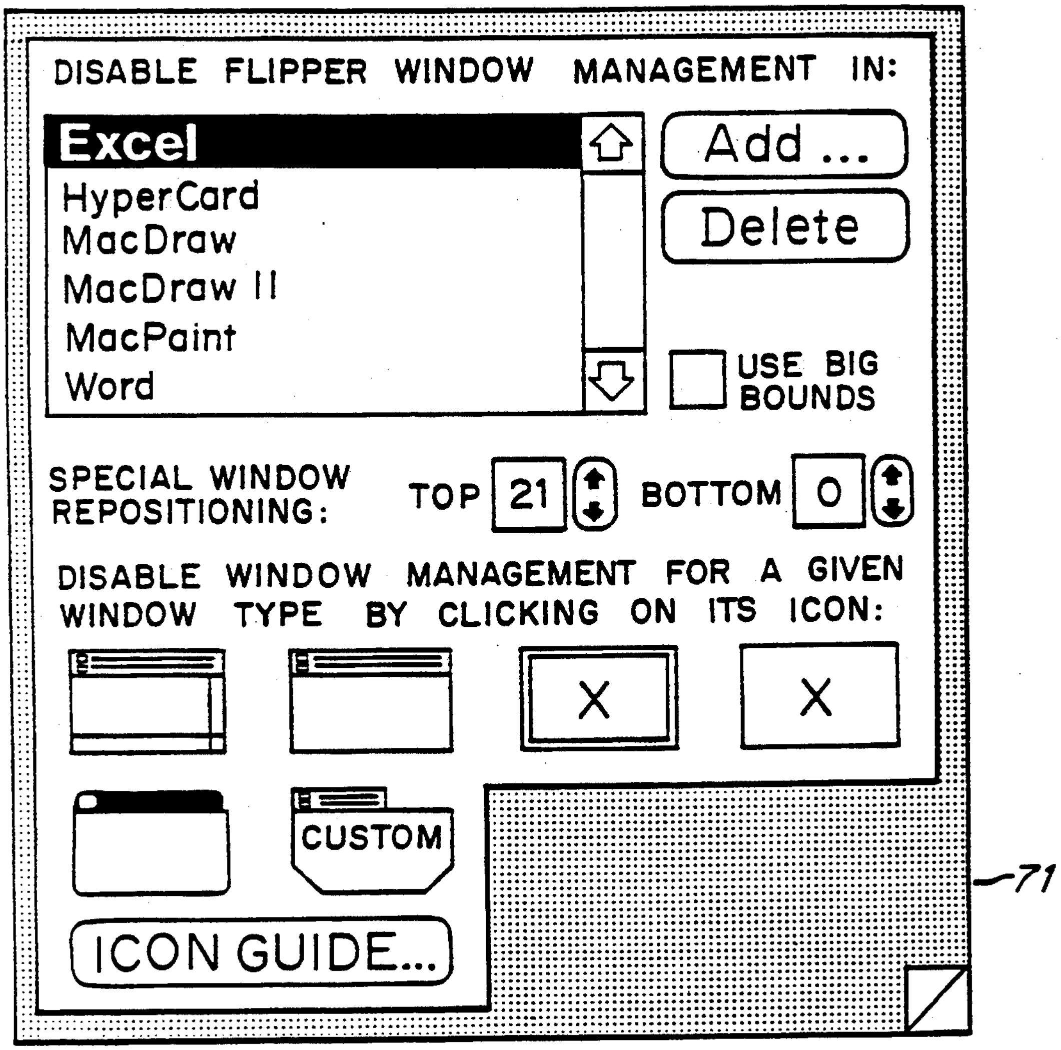
FIG. 12 shows a control panel display window for disabling features and providing custom commands for selected window types in accordance with the present invention.

It is not feasible to reposition the windows provided with some conventional computer programs. FIG. 12 illustrates a control panel window that indicates to a user ways in which to customize specific windows of specific computer programs.

Figure 13A:
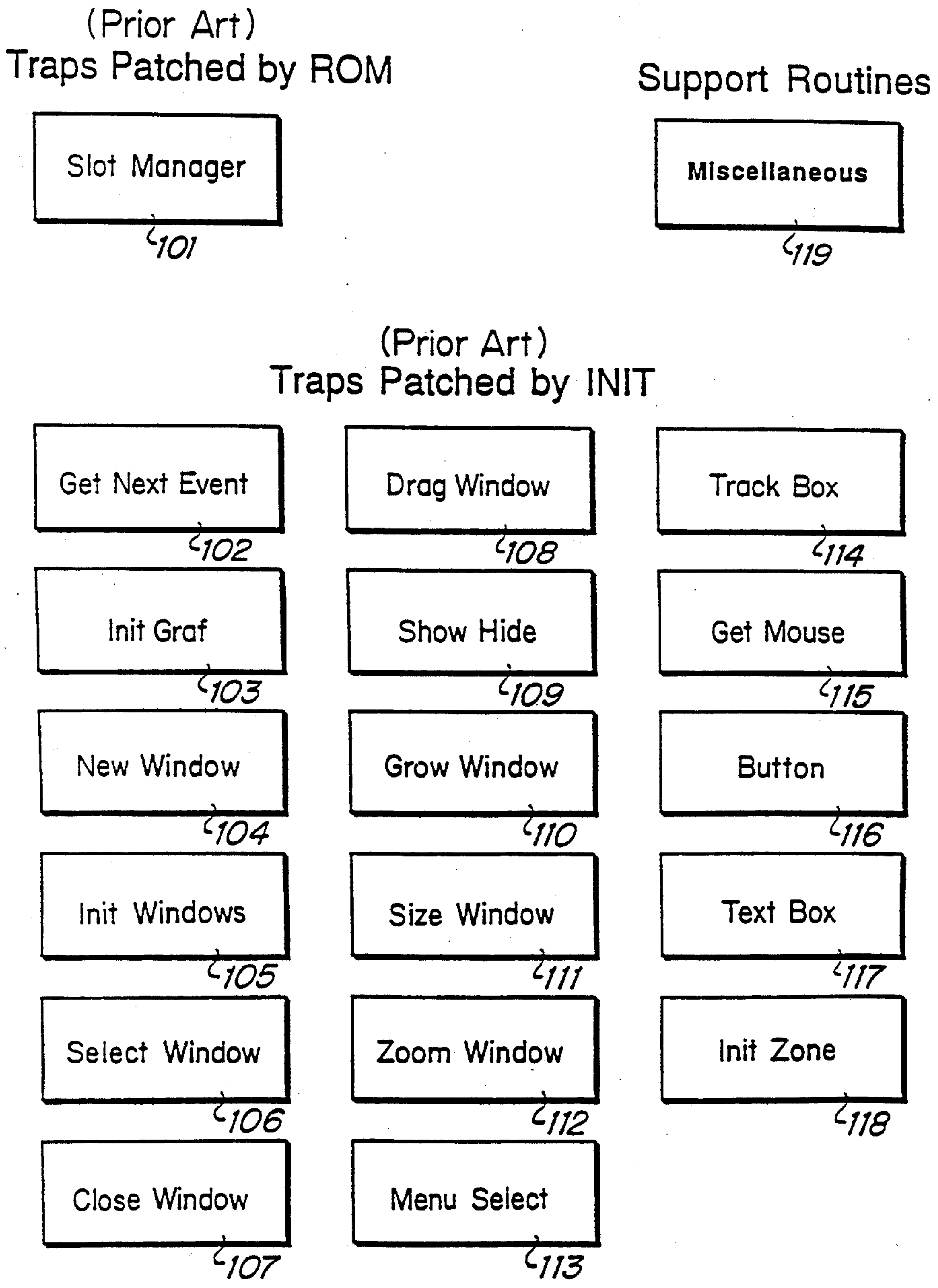
FIG. 13(*a*) shows a block diagram of software patches to prior art software routines in accordance with the present invention.
Figure 13B:
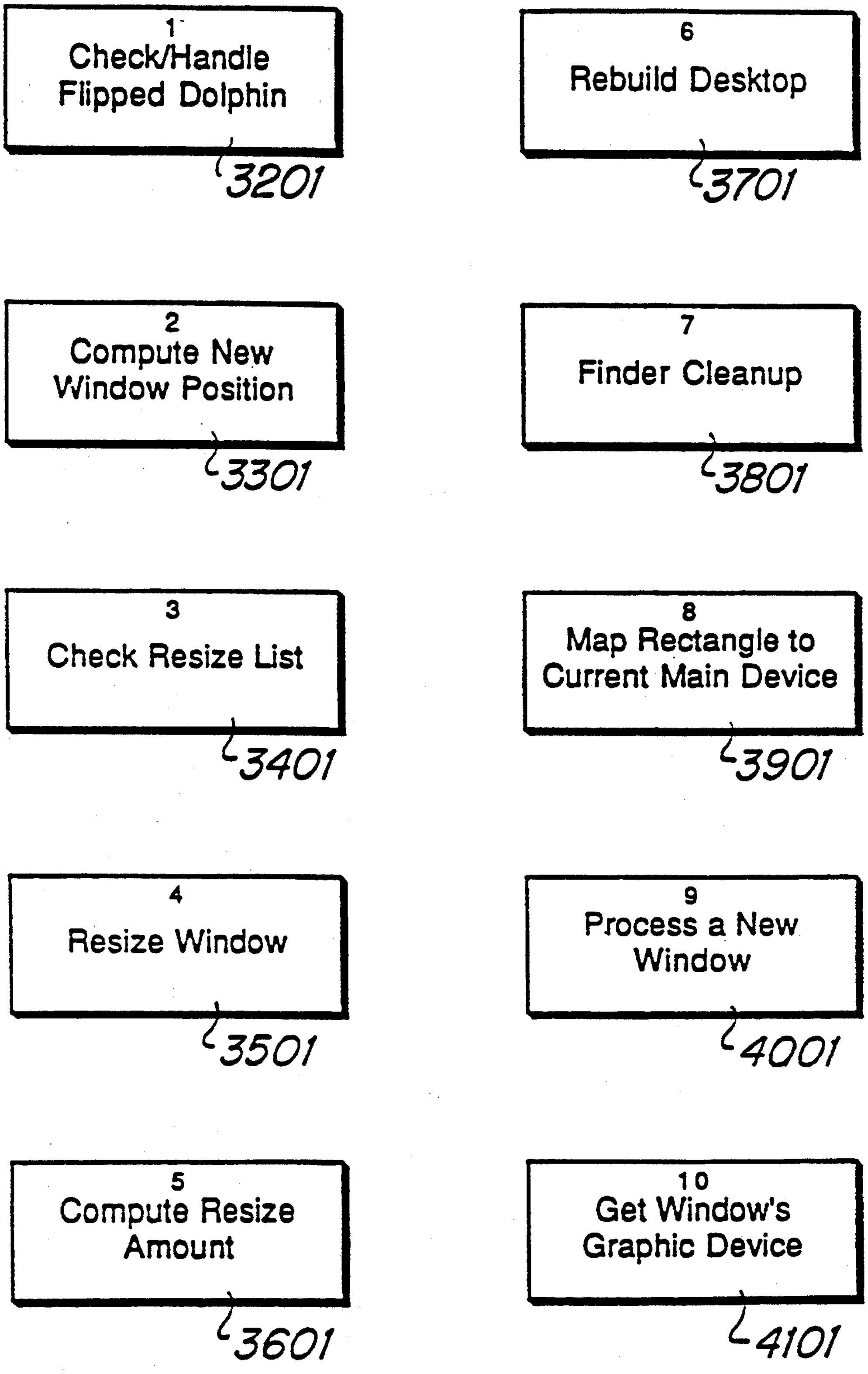

The preferred embodiment of the invention makes use of a number of prior art routines to move and resize windows. FIG. 13(*a*) illustrates these routines. In order for the invention to move or resize a window, certain information must be saved for each window which is currently in use. The prior art routine NewWindow 104 implements the allocation and initialization of the required additional information. When a window is closed, the additional information is no longer needed. The prior art routine CloseWindow 107 is used to de-allocate the storage allocated by NewWindow. The prior art routine GetNextEvent 102 is used to coordinate the flip-related actions such as flip detection, window movement and window resizing, with the operating system of the computer.

In accordance with the invention, when a flip is detected, a list of existing windows is created. During software calls to the GetNextEvent routine 102, the prior art routines GetMouse 115 and Button 116 are used to simulate manual manipulation of the mouse. The prior art routine ShowHide 109 is used to move and resize existing windows that are presently hidden from the user's view by a current application program.

Prior art routines Dragwindow 108, GrowWindow 110 and ZoomWindow 112 are used after a flip in accordance with the present invention to correct the limits of a prior art constant called "screenBits.bounds" which sets corresponding parameters for window dragging, sizing and zooming. Some application programs employ prior art routines such as SizeWindow 111 instead of Zoomwindow 112. The prior art routines TrackBox 114 and SizeWindow 111 are used with such application programs.

The prior art routines InitGraf 103 and InitWindows 105 are used in accordance with the present invention to determine the amount of memory in an internal display buffer required to be allocated for an application program, where an application supports such a buffer, to allow the application to properly present a display in either portrait or landscape orientation. Application programs sometimes allocate such a buffer, based on the "screenBits.bounds" constant, in order to speed up data presentation and refresh.

The prior art routine MenuSelect 113 is used in accordance with the present invention to reposition the icons in the conventional icon-based user interface typically used with the invention. Similarly, the prior art routine TextBox 117 is used to reposition menu bar application names when initiating such applications after a flip.

The prior art routines InitZone 118, GetNextEvent 102 and SelectWindow 106 are used in accordance with the present invention to allow processing of multiple application program windows which may be active in a "MultiFinder" environment typically found in computers used with the invention. In the MultiFinder environment, there may be several application programs running without their windows being directly accessible ("background applications"). Typically the MultiFinder environment only allows a single set of windows, those of the "foreground application", to be resized. In accordance with the present invention, a table of active application programs is maintained, and window resizing is accomplished whenever an application is selected to become the foreground application. The prior art routine InitGraf 103 is employed to prevent the removal of software "patches" made in accordance with the present invention when a new application is initiated in the "MultiFinder" environment.

The prior art routine SlotManager 101 is used in accordance with the present invention to allow the definition of multiple video devices for versions of the operating system of the computer which would otherwise only allow one video device, and therefore one orientation, per hardware slot. In accordance with the present invention, each possible display orientation is considered a separate device, and therefore it is essential that multiple devices be permitted.

Miscellaneous support software routines 119 are provided in accordance with the preferred embodiment. These routines 119 are illustrated in detail in FIG. 13(*b*)

and their corresponding flow diagrams are given in FIGS. 32 through 41.

Referring now to FIG. 13(*b*), the routine Check/-Handle Flipped Dolphin (abbreviated "FlipOut") 3201 is the main routine for detecting when a flip is made and altering the windows accordingly.

The routine Compute New Window Position (abbreviated "PositionWindow") 3301 calculates and modifies the bounding parameters of a window responsive to a display screen flip.

The routine Check Resize List 3401 builds and processes the list of windows which need to be resized responsive to a display screen flip.

The routine Resize Window 3501 generates phantom mouse clicks as required to resize a window responsive to a display screen flip.

The routine Compute Resize Amount (abbreviated "CalcWindResize") 3601 calculates the amount by which a window must be resized responsive to a display screen flip in order for the window to remain accessible and logically placed on the flipped display.

The routine Rebuild Desktop 3701 checks to see whether multiple displays are being used in the system and, if they are, changes the relationships between the display screens responsive to a display screen flip.

The routine Finder Cleanup (or "CleanUpFinder") 3801 generates phantom mouse clicks, responsive to a flip of the display screen, to initiate a prior art "Finder Cleanup" procedure.

The routine Map Rectangle to Main Device (abbreviated "MapBigRect") 3901 maps a given window size to best fit within the current dimensions of whichever display contains the prior art main menu bar.

The routine Process a New Window (abbreviated "ProccessNewWind") 4001 performs allocations required to keep track of reorientation and resizing information, checks to make sure that window size is maintained in accordance with a previous dimension of the display that it associated with, and if not, generates any phantom mouse clicks necessary to resize the window to the current dimensions of the associated display.

The routine Get Window's Graphic Device (abbreviated "GetWindGD") 4101 determines which of the multiple displays is best associated with a window, considering which of the top, left, bottom, and right edges of the window are contained in each display.

FIGS. 14 through 31 illustrate in greater detail the manner in which the prior art routines shown in FIG. 13(*a*) are "patched" in accordance with the present invention. FIGS. 32 through 41 illustrate in greater detail the manner in which the ten routines shown in FIG. 13(*b*) operate in accordance with the present invention.

Figure 14:
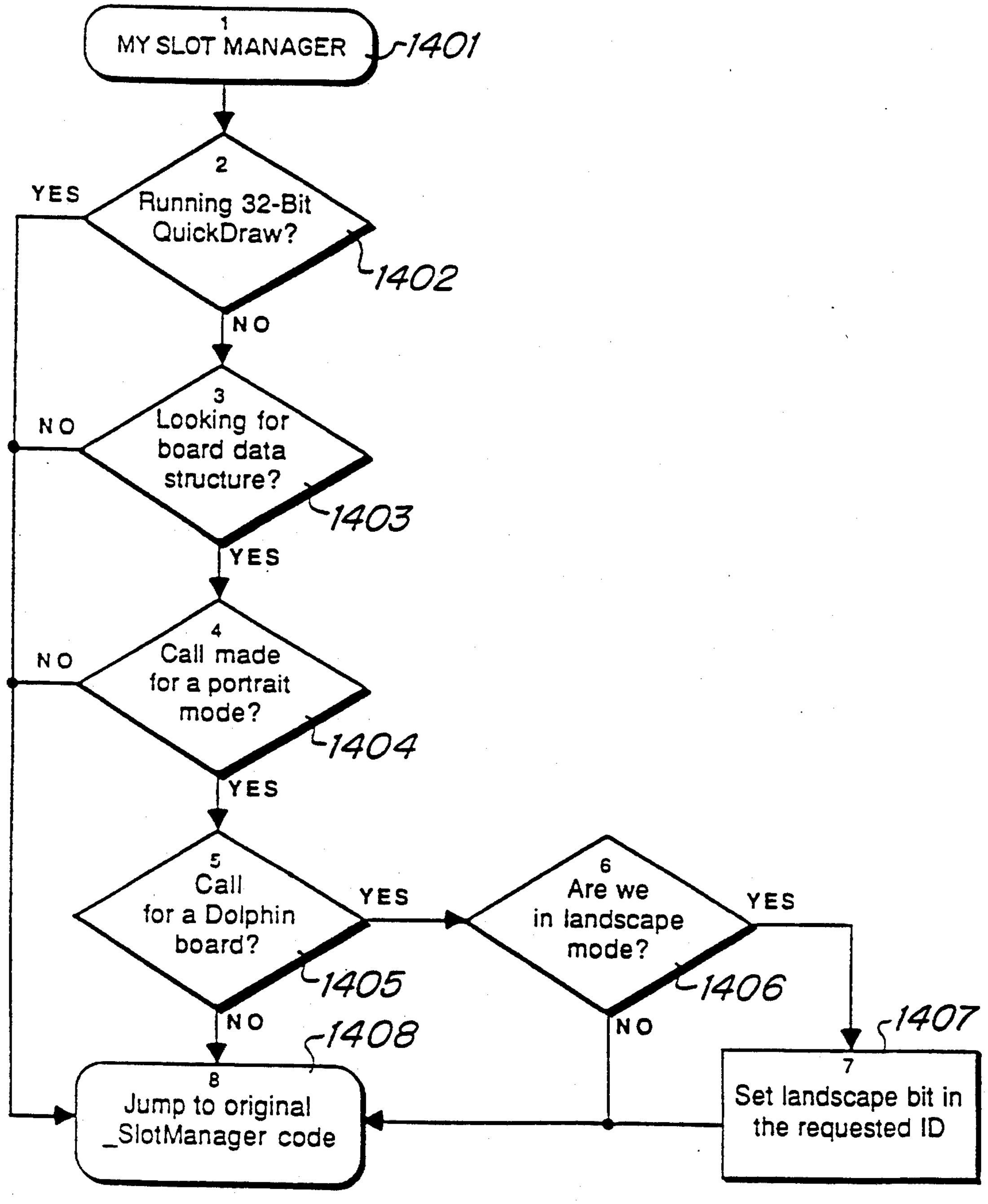
FIG. 14 shows a flow diagram of the software patch, in accordance with the present invention, to the prior art routine _SlotManager.

Referring now to FIG. 14, the routine MySlotManager 1401 includes test 1402 to determine whether the prior art "32-Bit QuickDraw" System is running. If it is, then execution jumps immediately to the prior art _SlotManager code 1408, because the different orientations of the present invention are implemented via 32-Bit QuickDraw's "video families," and hence, there is no need to modify data. Otherwise, test 1403 is performed to see if the calling algorithm is looking for a board data structure which might have to be modified to reflect the current orientation of the present invention. If the calling algorithm is not looking for such a structure, execution jumps immediately to the original _SlotManager code 1408. Otherwise, test 1404 is performed to determine if the calling algorithm is looking for the video circuit board data which specifies parameters for a video mode. If not, execution jumps immediately to the original _SlotManager code 1408. Otherwise, test 1405 is performed to determine whether the calling algorithm is looking for video parameter board data of a board which supports changes in display orientation. If not, execution jumps immediately to the original _SlotManager code 1408. Otherwise, test 1406 is performed to determine if the board for which the video parameters are being requested of is in landscape orientation. If not, execution jumps immediately to the prior art _SlotManager code 1408. Otherwise, the landscape bit of the identifying number of the board whose video parameters are being requested is set. Finally, execution is transferred to the prior art _SlotManager code 1408 with the modified identifying number. This patch allows for an operating system which is not running 32-Bit QuickDraw to have access to the video parameters for both orientations of the present invention using only one board identifying number. The patch intercepts requests for video parameters from the present invention, and modifies the board identifying number if the present invention is in landscape mode. Thus the prior art _SlotManager code returns the video parameters of the current orientation of the present invention, and thus simulates the effects of the prior art "video families" concepts of 32-Bit QuickDraw.

Figure 15:
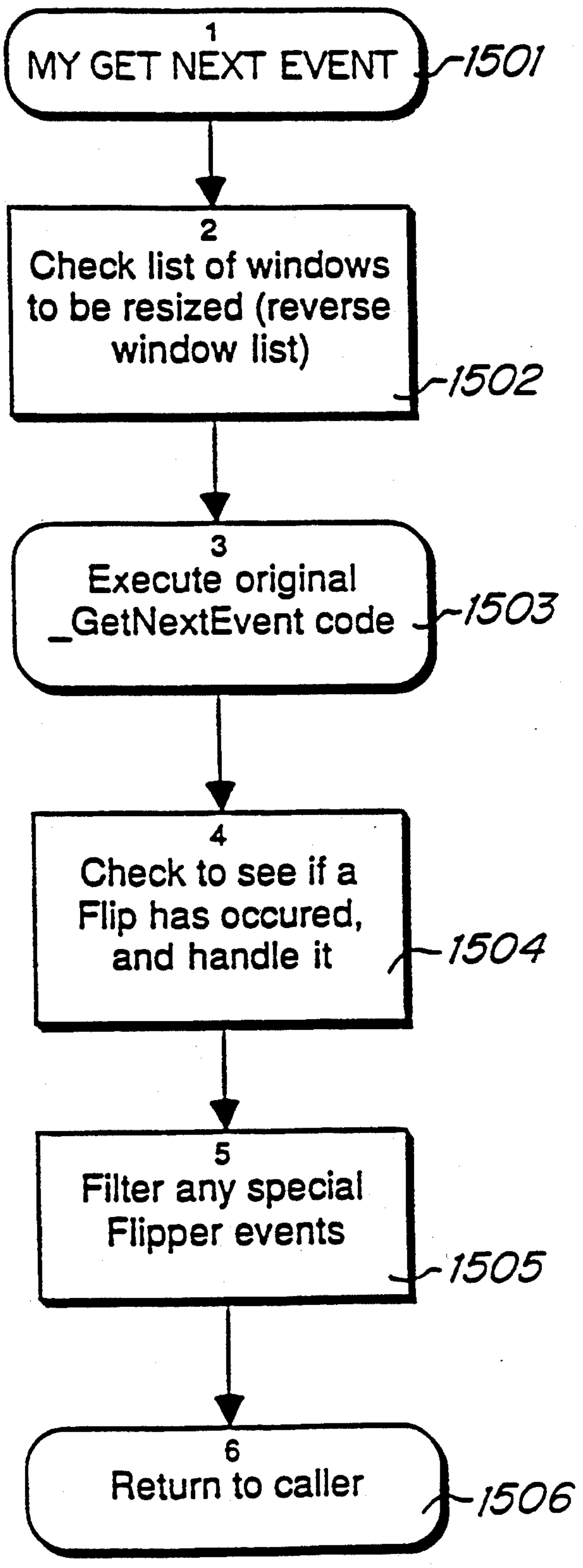
FIG. 15 shows a flow diagram of the software patch, in accordance with the present invention, to the prior art routine _GetNextEvent.

Referring now to FIG. 15, the routine MyGetNextEvent 1501 executes step 1502 to check the list of windows that needs to be resized after a flip has occurred. It then executes the prior art _GetNextEvent code 1503. Next, step 1504 is executed which checks for, and processes, any flip which has occurred. Finally, it executes step 1505 which provides any filtering required to assist in the processing of phantom mouse events generated by the present invention. This patch provides a convenient location for the preferred embodiment of the present invention to detect and respond to a new monitor orientation resulting from the user flipping a display. It coordinates the resizing actions required to change windows to a new display orientation, as well as detecting changes in orientation and providing any filtering required during the processing of phantom mouse events used to implement many of the effects of the present invention.

Figure 16:
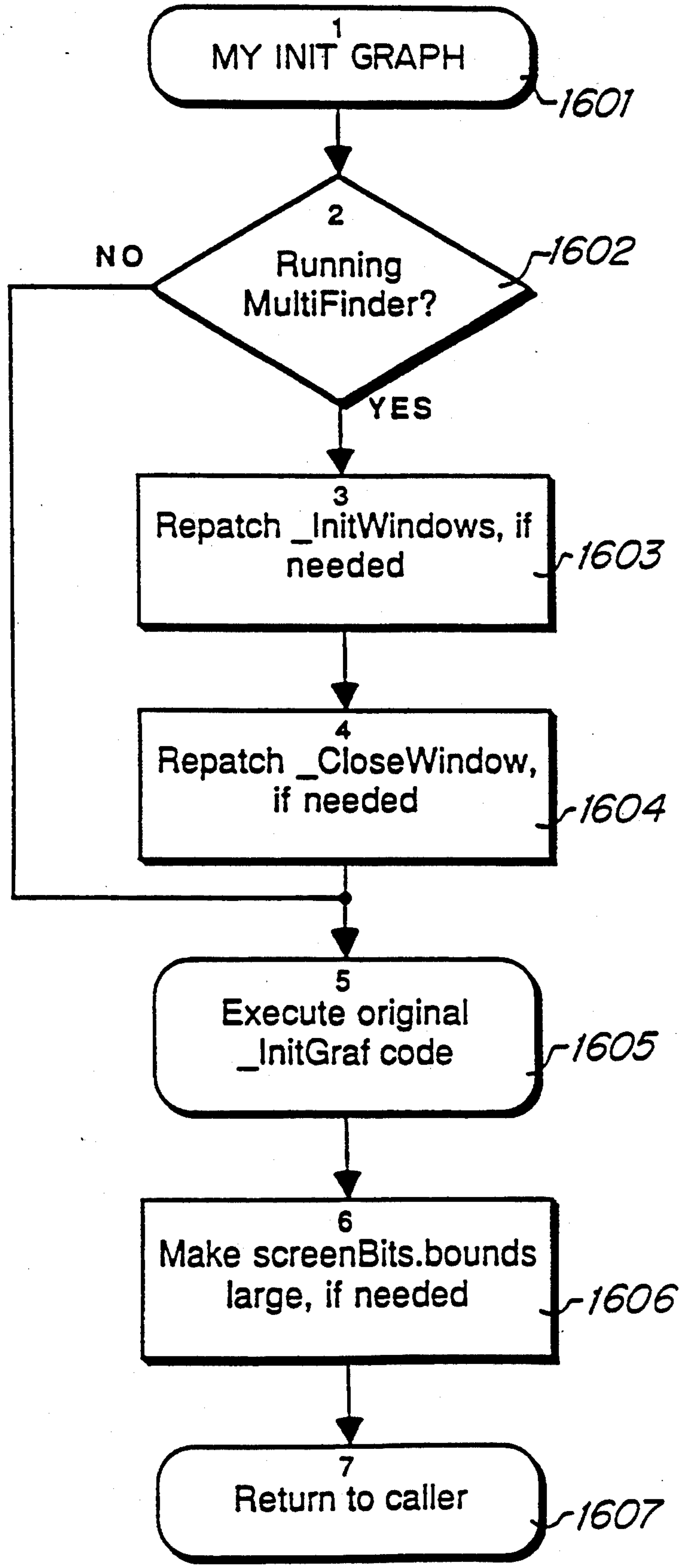
FIG. 16 shows a flow diagram of the software patch, in accordance with the present invention, to the prior art routine _InitGraf.

Referring now to FIG. 16, the routine MyInitGraf 3601 includes test 1602 to see if MultiFinder is executing on the machine, and if so, steps 1603 and 1604 are executed to reinstall patches to the prior art routines _InitWindows and _CloseWindow. Otherwise, control transfers directly to the execution of step 1605 which calls the prior art _InitGraf code. Finally, if needed, step 1606 sets the prior art global variable "screenBits.-bounds" to be a rectangle which encompasses the dimensions of both orientations of the present invention. This patch does two things. First, if the prior art program "MultiFinder" is running, it reinstalls patches to prior art routines _InitWindows and _CloseWindow, which may have been removed. Second, if called by an application specified by the user as "incompatible," it sets the prior art global variable "screenBits.bounds" to be a rectangle which encompasses the dimensions of both orientations of the present invention.

Figure 17:
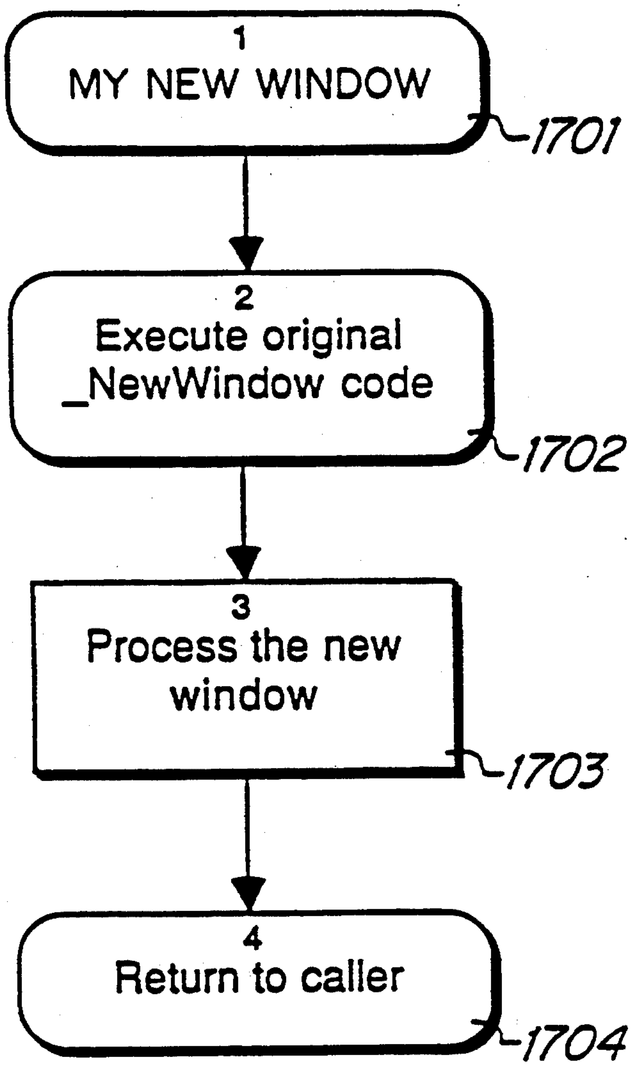
FIG. 17 shows a flow diagram of the software patch, in accordance with the present invention, to the prior art routine _NewWindow.

Referring now to FIG. 17, the routine MyNewWindow 1701 calls the prior art _NewWindow code 1702, and then executes step 1703 which allocates and initializes a data structure used by the present invention to reposition and/or resize the window after a change in display orientation has been made. This patch provides a convenient place for the present invention to create any additional data structures required to process the new windows after a change in display orientation.

Figure 18:
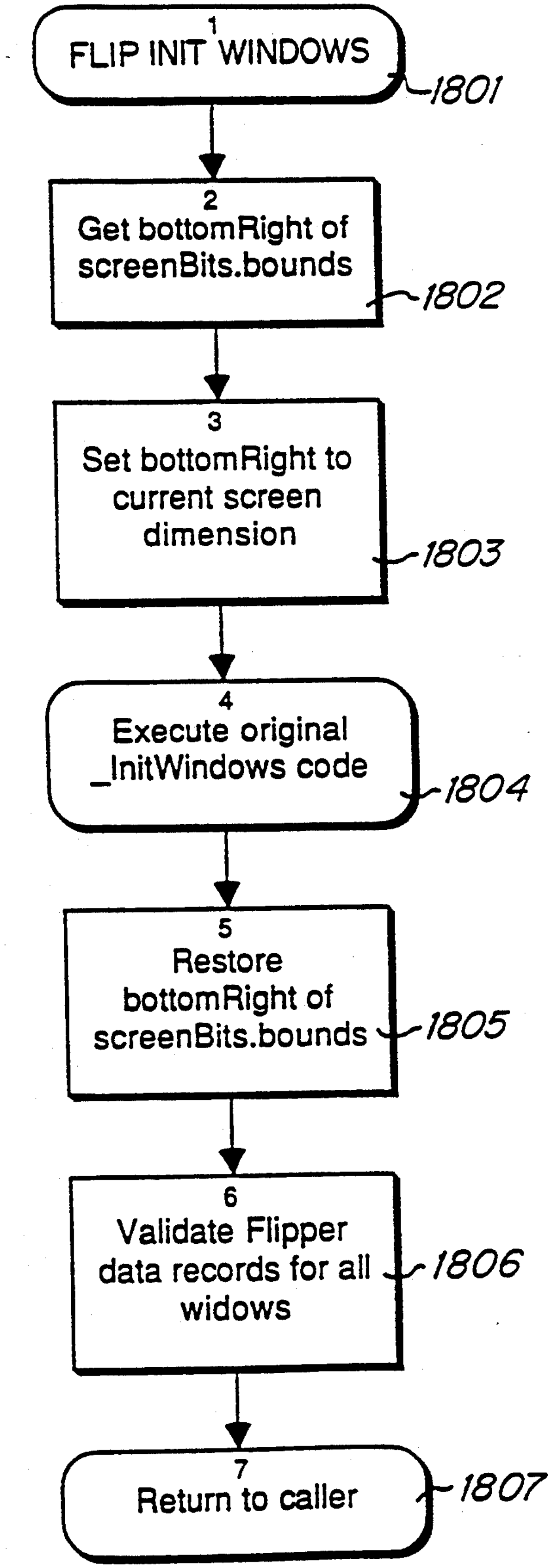
FIG. 18 shows a flow diagram of the software patch, in accordance with the present invention, to the prior art routine _InitWindows.

Referring now to FIG. 18, the routine FlipInitWindows 1801 executes step 1802 to retrieve the current bottom right corner of the prior art global parameter "screenBits.bounds." Next, step 1803 is executed to set the bottom right corner of the prior art global "screenBits.bounds" to match the current dimensions of the display which contains the menu bar. Next, the prior art _Initwindows code 1804 is executed. Step 1805 is then executed to restore the bottom right corner of the prior art global screenBits.bounds to its original value. Next, step 1806 is executed to make sure that the windows for which the present invention has allocated an extra data structure still exist in the system, and if not, to deallocate the extra data structure. Finally, execution is returned to the caller 1807. This patch does two things. First, it ensures that the bottom right corner of the prior art global "screenBits.bounds" is correct during execution of the prior art _InitWindows routine. Second, it makes sure that all of the windows for which the present invention has allocated an extra data structure still exist.

Figure 19:
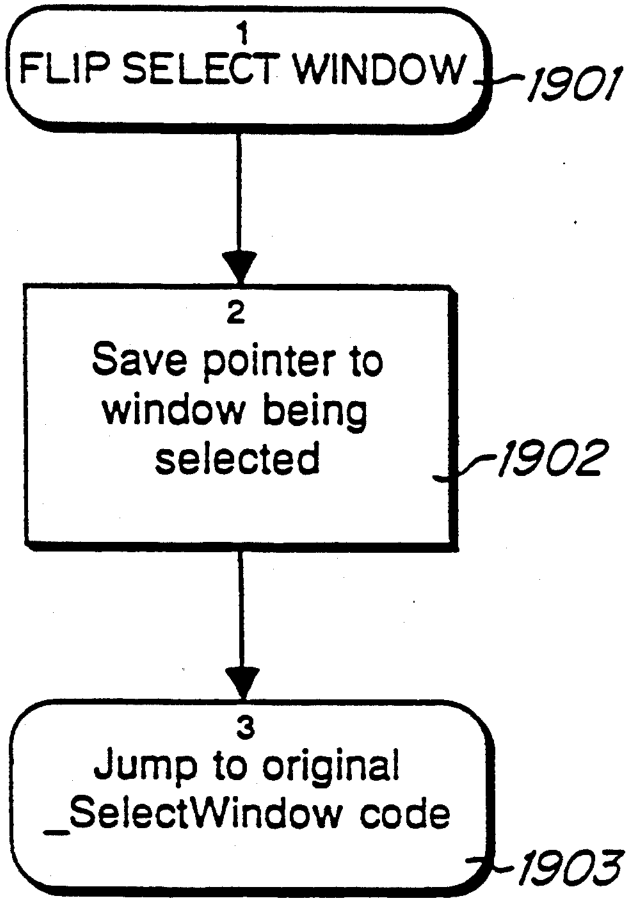
FIG. 19 shows a flow diagram of the software patch, in accordance with the present invention, to the prior art routine _SelectWindow.

Referring now to FIG. 19, the routine FlipSelectWindow 1901 executes step 1902 to save the pointer to the window being selected into global storage. Next, execution passes directly to the prior art _SelectWindow code 1903. This patch updates the pointer of the preferred embodiment to the topmost window on the desktop, which is needed for determining if a new application has become the current application in a MultiFinder environment.

Figure 20:
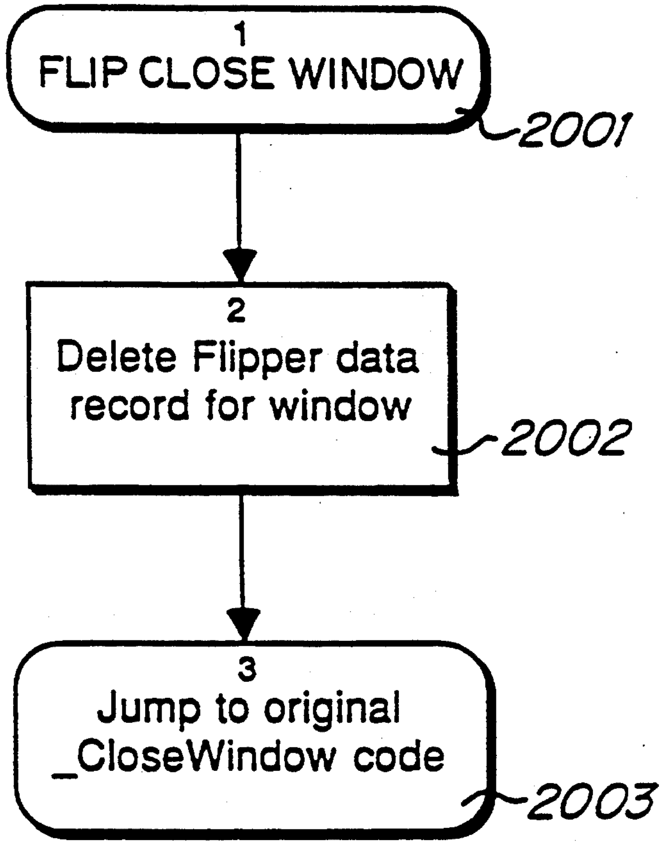
FIG. 20 shows a flow diagram of the software patch, in accordance with the present invention, to the prior art routine _CloseWindow.

Referring now to FIG. 20, the routine FlipCloseWindow 2001 executes step 2002 which deallocates the extra data structure allocated by the present invention when the window was created. Finally, execution passes directly to the prior art _Closewindow code. This patch deal locates the extra data structure allocated by the present invention when the window was created, since once the window is closed, the extra data structure serves no purpose.

Figure 21:
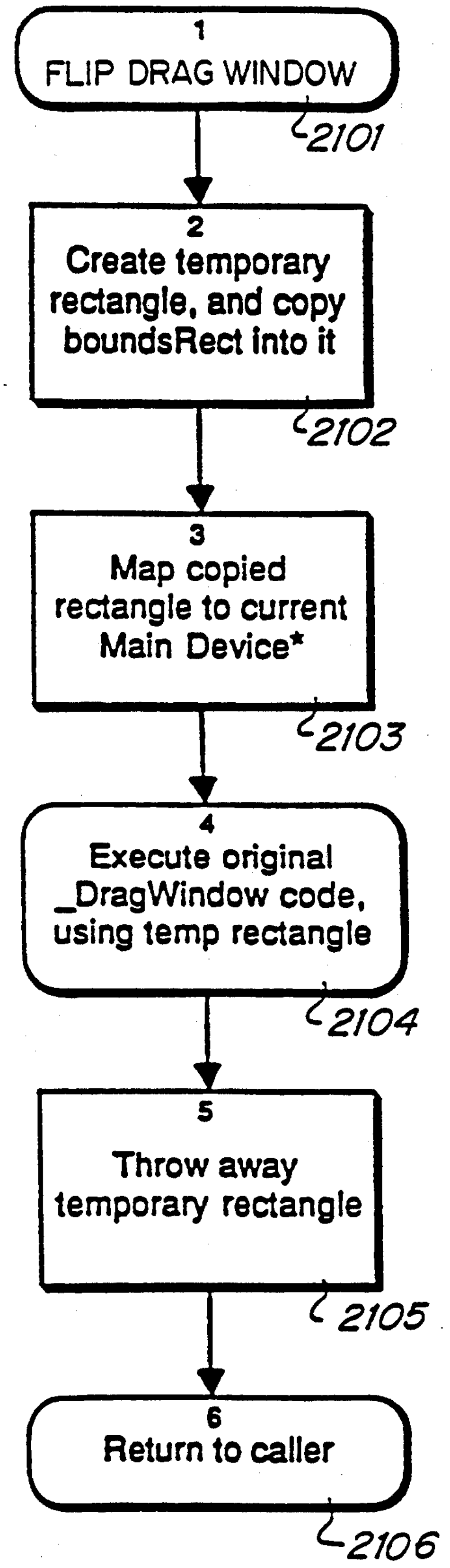
FIG. 21 shows a flow diagram of the software patch, in accordance with the present invention, to the prior art routine _DragWindow.

Referring now to FIG. 21, the routine FlipDragWindow 2101 executes step 2102 which creates a copy of the "boundsRect" parameter. Next, step 2103 is executed which remaps the "boundsRect" copy to match the dimensions of the display which contains the menu bar, if necessary. Next, the prior art _DragWindow code 2104 is executed, using the modified copy of the "boundsRect" parameter. Next, step 2105 is executed which deal locates the "boundsRect" copy. Finally, execution is returned to the caller 2106. This patch insures that the "boundsRect" parameter matches the dimensions of the display which contains the menu bar. Applications normally call the prior art _DragWindow routine using a "boundsRect" which matches the dimensions of the display containing the menu bar when the application was launched. If this display is one that is capable of being flipped, and the user then flips the display, the "boundsRect" parameter for subsequent _DragWindow calls will not match the current dimensions of the display. This patch then remaps a copy of the "boundsRect" parameter to match the current dimension of the flipped display.

Figure 22:
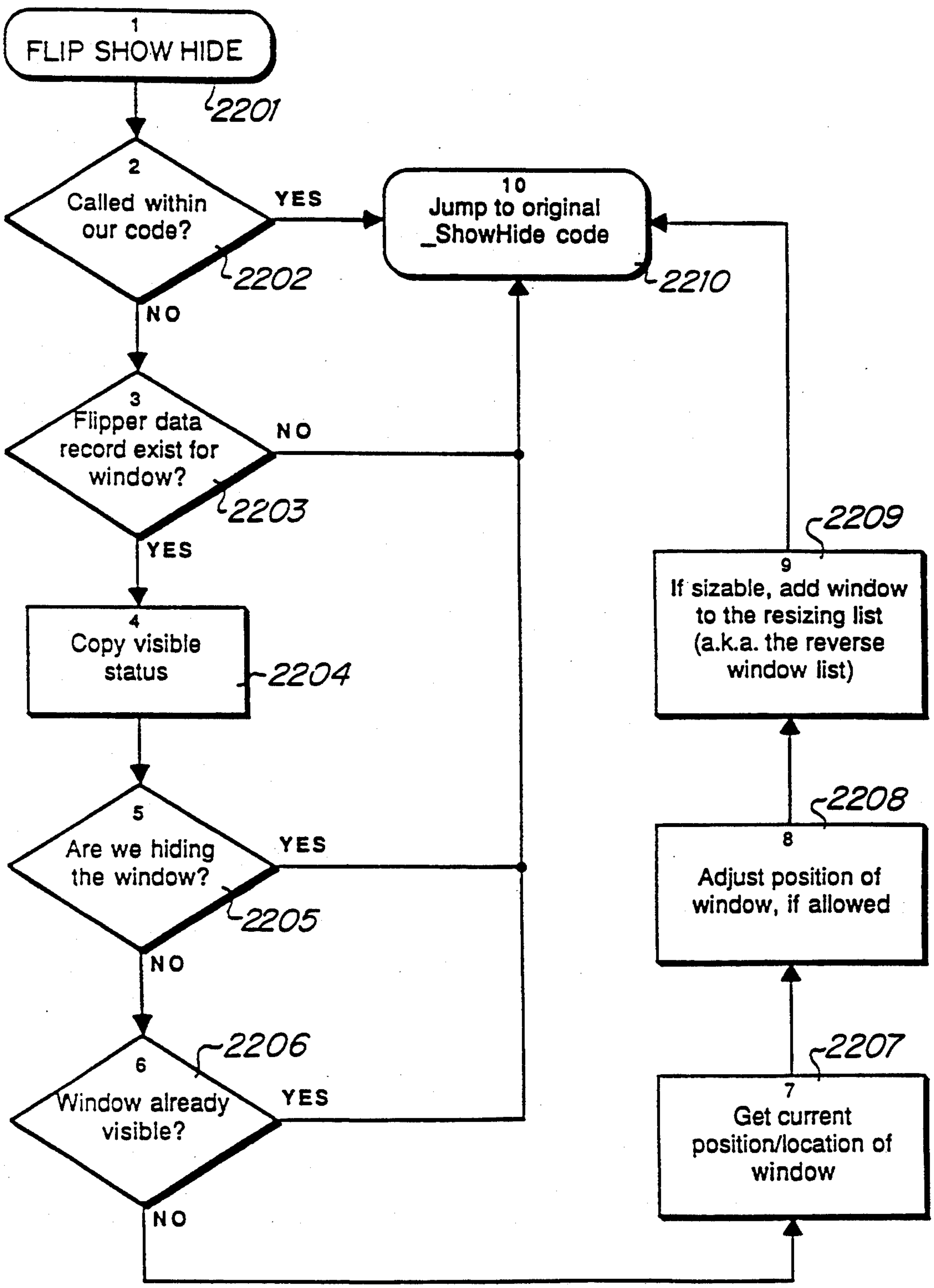
FIG. 22 shows a flow diagram of the software patch, in accordance with the present invention, to the prior art routine _ShowHide.

Referring now to FIG. 22, the routine FlipShowHide 2201 contains test 2202 which determines whether the prior art _ShowHide routine has been called from within the present invention. If so, execution transfers directly to the prior art _ShowHide code 2210. Otherwise, test 2203 is made to check for the existence of the extra data structure normally allocated to the window by the present invention. If no such data structure exists, execution transfers directly to the prior art _ShowHide code 2210. Otherwise, step 2204 is executed which copies the visible status of the window into the extra data structure. Next, test 2205 is made to determine if the calling procedure wants to hide the window. If the window is being hidden, execution transfers directly to the prior art _ShowHide code 2210. Otherwise, a check is made to see if the window is visible. If it is, execution transfers directly to the prior art _ShowHide code 2210. Otherwise, step 2207 is executed to determine the current position/location of the window. Next, step 2208 is executed to adjust the position of the window (as needed) to the current desktop configuration, if allowed by the user. Next, if the window is of the type which can be resized, step 2209 is executed to add the window to the list of windows to be resized. Finally, execution transfers directly to the prior art _ShowHide code 2210. This patch facilitates the repositioning and resizing of windows which were not visible when the user flipped the orientation of the display screen in accordance with the present invention.

Figure 23:
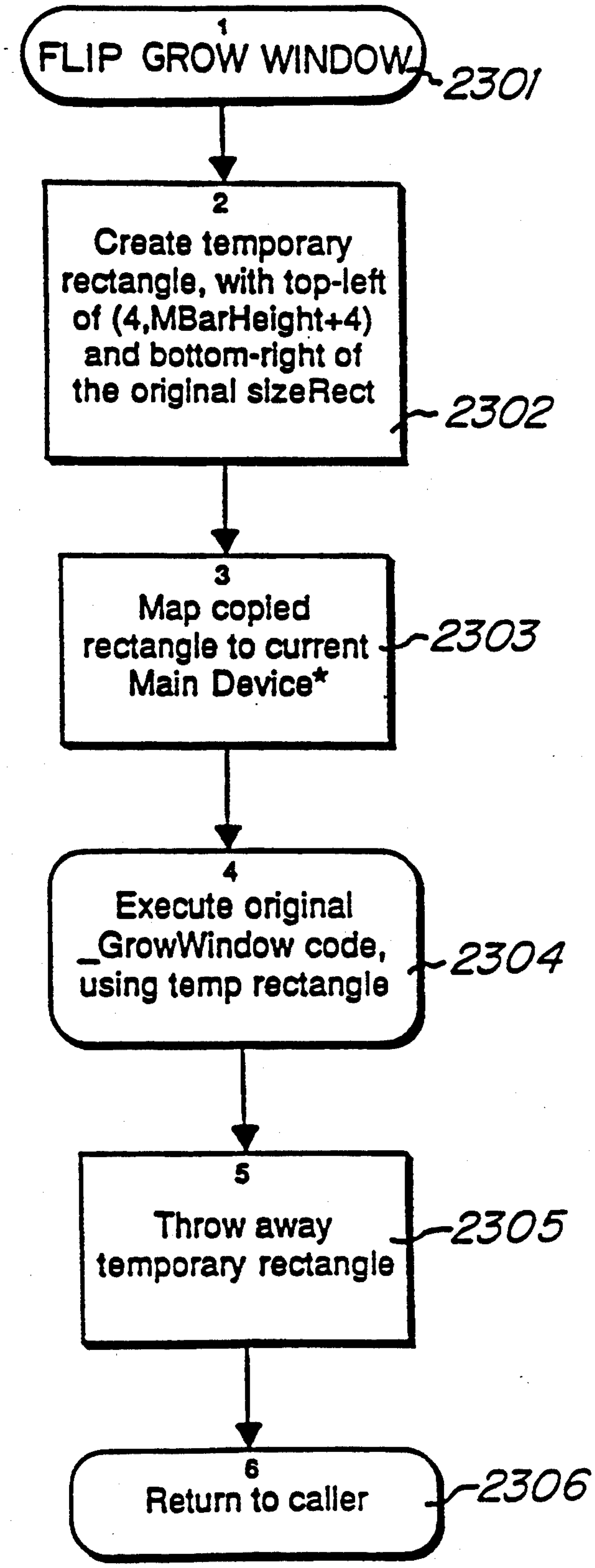
FIG. 23 shows a flow diagram of the software patch, in accordance with the present invention, to the prior art routine _GrowWindow.

Referring now to FIG. 23, the routine FlipGrowWindow 2301 executes step 2302 which allocates a rectangle, assigns (4,MBarHeight+4) to the top-left corner and copies the sizeRect parameter's bottom-right to the temporary rectangle's bottom-right. Next, step 2303 is executed to map the temporary rectangle to the current size of the display which contains the menu bar. Next, the prior art _GrowWindow routine 2304 is executed, using the temporary rectangle in place of the prior art sizeRect parameter. Finally, step 2305 deallocates the temporary rectangle. This patch insures that the sizeRect parameter passed to the prior art _GrowWindow routine matches the current size of the display which contains the menu bar.

Figure 24:
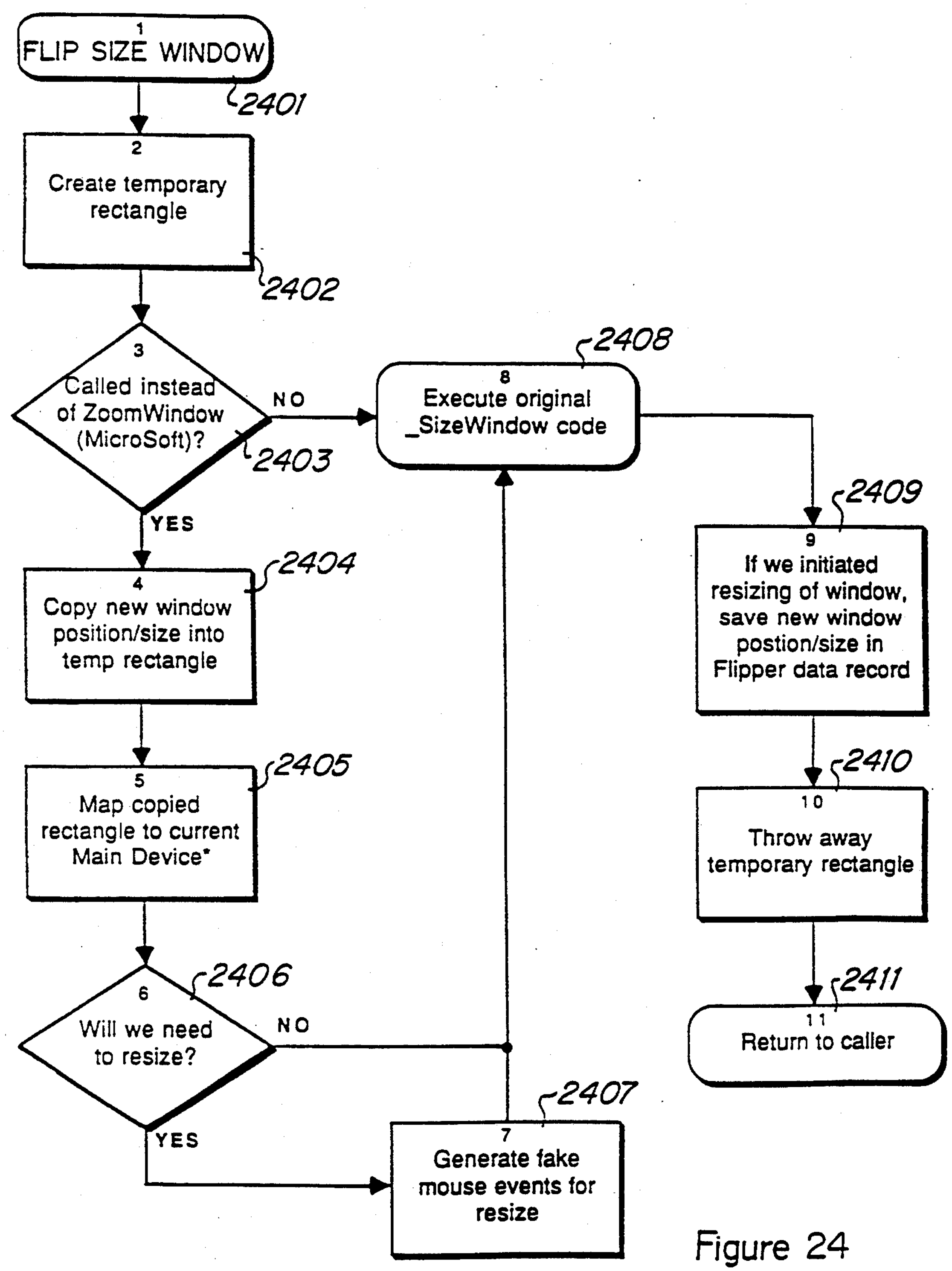
FIG. 24 shows a flow diagram of the software patch, in accordance with the present invention, to the prior art routine _SizeWindow.

Referring now to FIG. 24, the routine FlipSizeWindow 2401 executes step 2402 which creates a temporary rectangle. Next, test 2403 is made to determine whether the prior art _SizeWindow routine is being called to implement a window zooming function. If it is not, execution transfers directly to the prior art _SizeWindow code 2408. Otherwise, step 2404 is executed to copy the position and size of the new window into the temporary rectangle. Next, step 2405 is executed to map the temporary rectangle to the current size of the display with the menu bar. Next, test 2406 is executed which determines if the window will have to be additionally resized so that it will be contained on the display with the menu bar. If not, execution transfers directly to the prior art SizeWindow code 2408. Otherwise, step 2407 generates phantom mouse events, by mimicking the code generated when a user points and clicks with a mouse, based on the remapped temporary rectangle to further resize the window. Next, the prior art _SizeWindow code 2408 is called. Next, step 2409 is executed, which saves the new position and size of the window if the prior art _SizeWindow routine was invoked. Finally, step 2410 is executed to deallocate the temporary rectangle. This patch makes sure that applications which zoom windows using the prior art _Sizewindow routine (instead of the prior art _ZoomWindow routine) correctly zoom the window to the current size of the display containing the menu bar.

Figure 25:
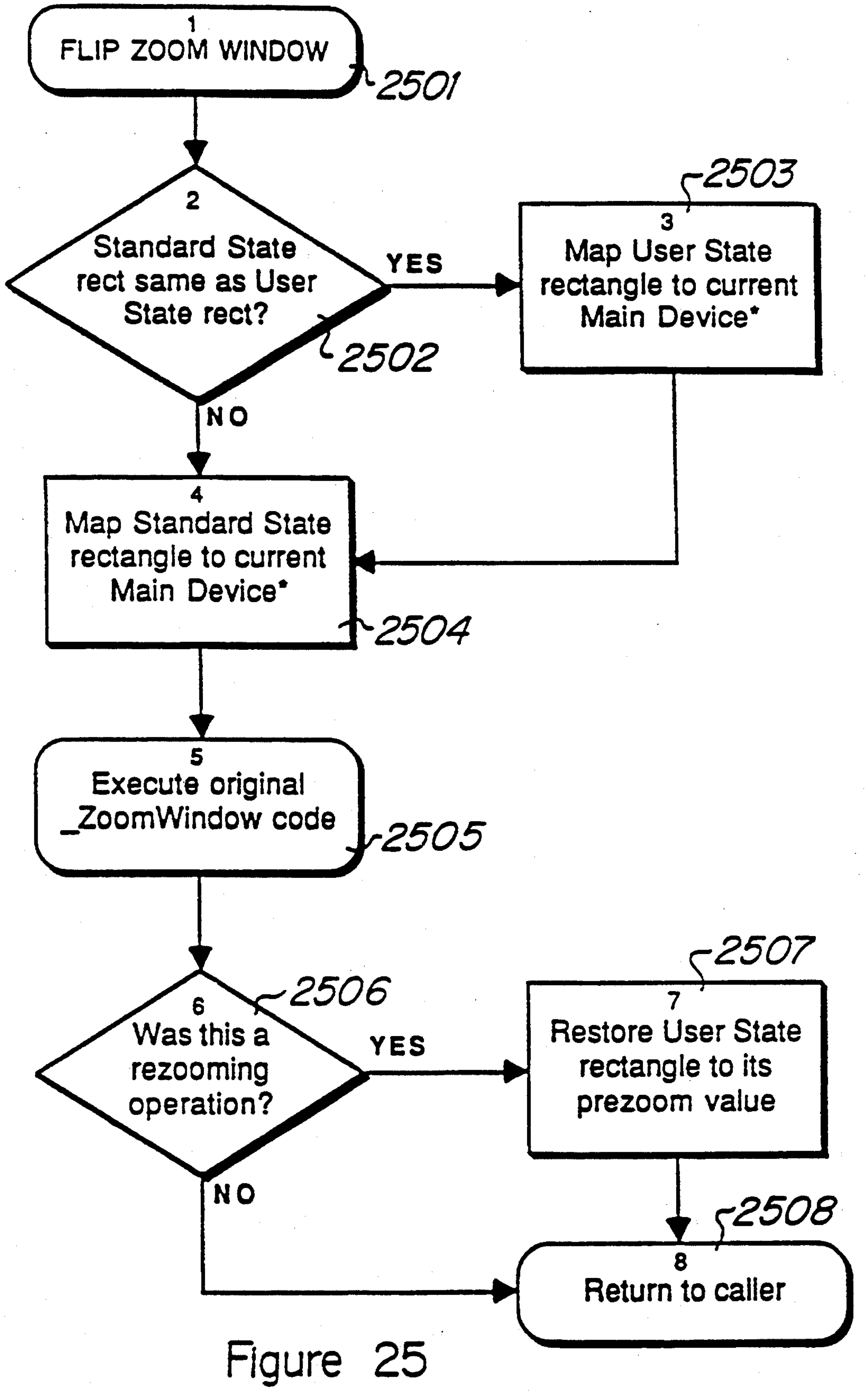
FIG. 25 shows a flow diagram of the software patch, in accordance with the present invention, to the prior art routine _ZoomWindow.

Referring now to FIG. 25, the routine FlipZoomWindow 2501 contains test 2502 which determines if the standard state rectangle of the window is the same as its user state rectangle. If not, control passes directly to step 2504. Otherwise, step 2503 is called to map the user state rectangle to current size of the display containing the menu bar. Next, step 2504 maps the standard state rectangle to the current size of the display with the menu bar. Next, the prior art _ZoomWindow code 2505 is executed. Next, test 2506 is made to determine if the prior art _Zoom Window routine was called to rezoom a window to match a new display orientation due to the user flipping the display. If not, execution is immediately returned to the caller 2508. If so, step 2507 restores the user state rectangle to its prezoom state. Next, execution is returned to the caller 2508. This patch performs two functions. First, it makes sure that the user state and standard state rectangles for the window being zoomed map properly to the current dimensions of the display with the menu bar. The second function performed by the patch allows the user to zoom back in to a small standard state after a rezooming operation. This is accomplished by storing the small standard state rectangle, and restoring this value after the call to the prior art _ZoomWindow routine (which may alter the standard state rectangle to be an undesirable value).

Figure 26:
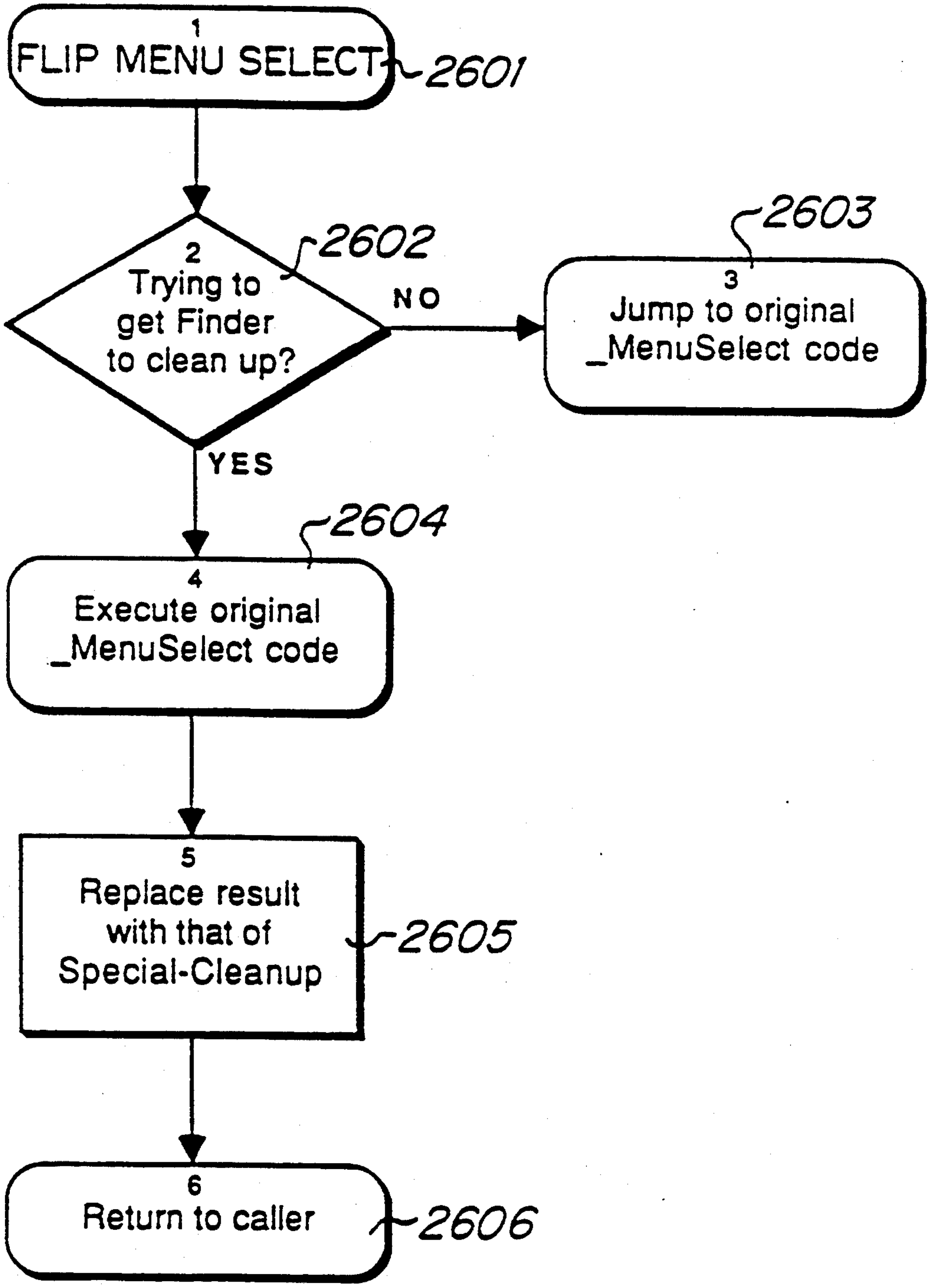
FIG. 26 shows a flow diagram of the software patch, in accordance with the present invention, to the prior art routine _MenuSelect.

Referring now to FIG. 26, the routine FlipMenuSelect 2601 includes test 2602 which determines if the Finder is being invoked to perform a cleanup operation. If not, control passes immediately to the prior art _MenuSelect code 2603. Otherwise, the prior art _MenuSelect code 2604 is called as a subroutine. Next, step 2605 replaces the result of the call with the menu item identifier of Special-Cleanup. Finally, control is returned to the caller 2606. This patch facilitates invoking a Finder cleanup operation by returning the menu item identifier of Special-Cleanup when called.

Figure 27:
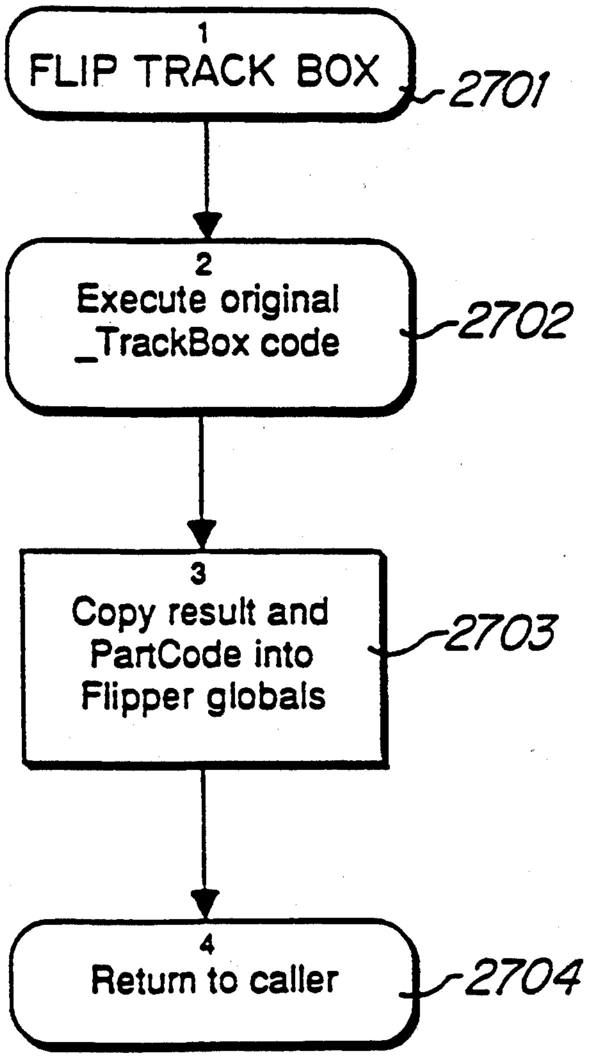
FIG. 27 shows a flow diagram of the software patch, in accordance with the present invention, to the prior art routine _TrackBox.

Referring now to FIG. 27, the routine FlipTractBox 2701 calls the prior art _TrackBox code 2702. Next, it executes step 2703 which copies the result into global storage. Finally, it returns to the caller 2704. This patch saves the result of the call to the prior art _TrackBox routine so that it may later be examined by the SizeWindow patch, to determine if _SizeWindow is being called to zoom a window.

Figure 28:
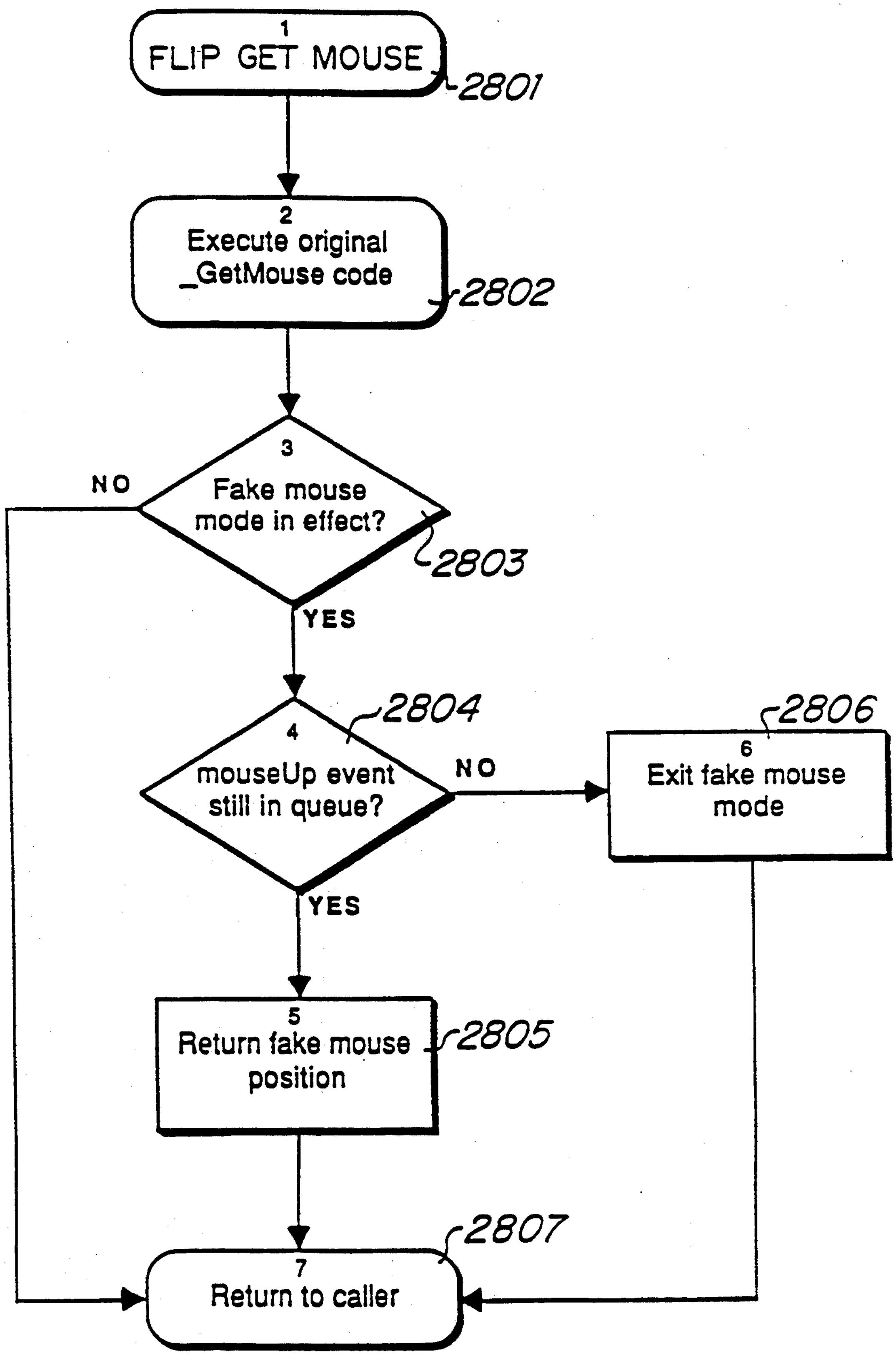
FIG. 28 shows a flow diagram of the software patch, in accordance with the present invention, to the prior art routine _GetMouse.

Referring now to FIG. 28, the routine FlipGetMouse 2801 calls the prior art _GetMouse code 2802. Next, it performs test 2803 which determines if a phantom mouse event is being generated. If not, control is immediately returned to the caller 2807. Otherwise, test 2804 is performed to make sure that the phantom mouse up event is still in the event queue of the system. If so, step 2805 is executed which returns the phantom mouse position instead of the actual position of the mouse on the display. If not, step 2806 is executed which cancels the phantom mouse event. In either case, execution next returns to the caller 2807. This patch permits the acceptance by application programs of phantom mouse events generated in accordance with the present invention. It returns the phantom position for the mouse instead of the real position whenever a phantom mouse event is generated.

Figure 29:
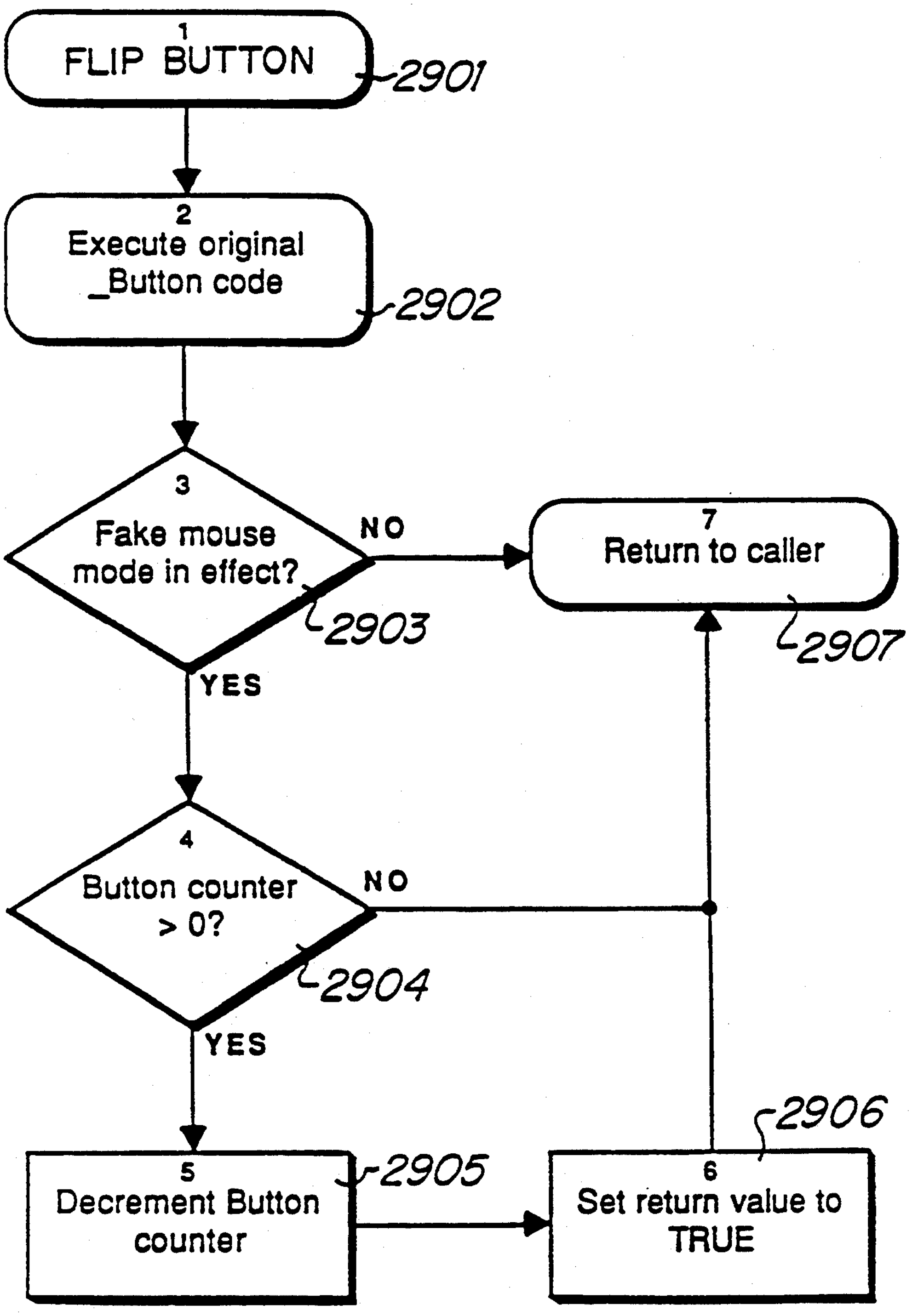
FIG. 29 shows a flow diagram of the software patch, in accordance with the present invention, to the prior art routine _Button.

Referring now to FIG. 29, the routine FlipButton 2901 executes the prior art _Button code 2902. Next, it performs test 2903 which determines if a phantom mouse event is generated. If not, control is immediately returned to the caller 2907. Otherwise, test 2904 is performed which determines if the button counter of the present invention is greater than zero. If not, execution immediately returns to the caller 2907. Otherwise, step 2905 is executed which decrements the button counter. Next, step 2906 is called which forces the return value of the prior art _Button routine to be TRUE. Finally, execution returns to the caller 2907. This patch permits application programs to accept the phantom mouse events generated in accordance with the present invention. It returns TRUE for a specified number of iterations instead of the real condition of the mouse button whenever the preferred embodiment is generating a phantom mouse event.

Figure 30:
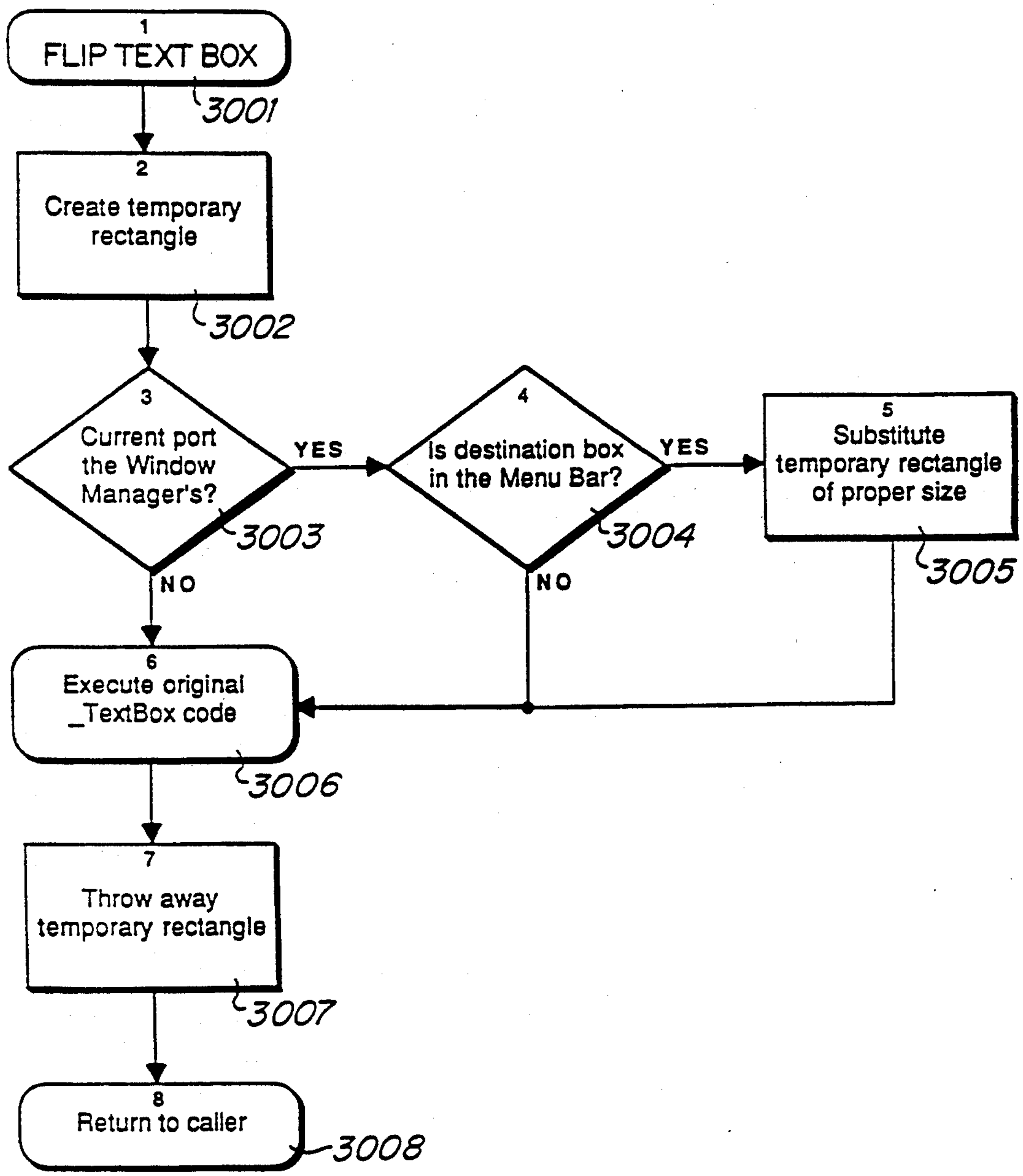
FIG. 30 shows a flow diagram of the software patch, in accordance with the present invention, to the prior art routine _TextBox.

Referring now to FIG. 30, the routine FlipButton 3001 calls step 3002 which creates a temporary rectangle. Next, it executes test 3003 which determines if the current drawing port belongs to the prior art WindowManager. If not, control passes to steps 3006. Otherwise, test 3004 is made to determine if the location of the text box is in the menu bar. If not, control passes to step 3006. Otherwise, code 3005 is executed which assigns the temporary rectangle to the proper size for the current orientation of the display with the menu bar, and substitutes the temporary rectangle for the original box parameter. Next, the prior art _TextBox code 3006 is executed. Next, step 3007 deal locates the temporary rectangle. Finally, execution is returned to the caller 3008. This patch fixes a Finder-based incompatibility with displays capable of multiple orientations, such as those in accordance with the present invention. It insures that the Finder will place the names of launched applications in the center of the menu bar.

Figure 31:
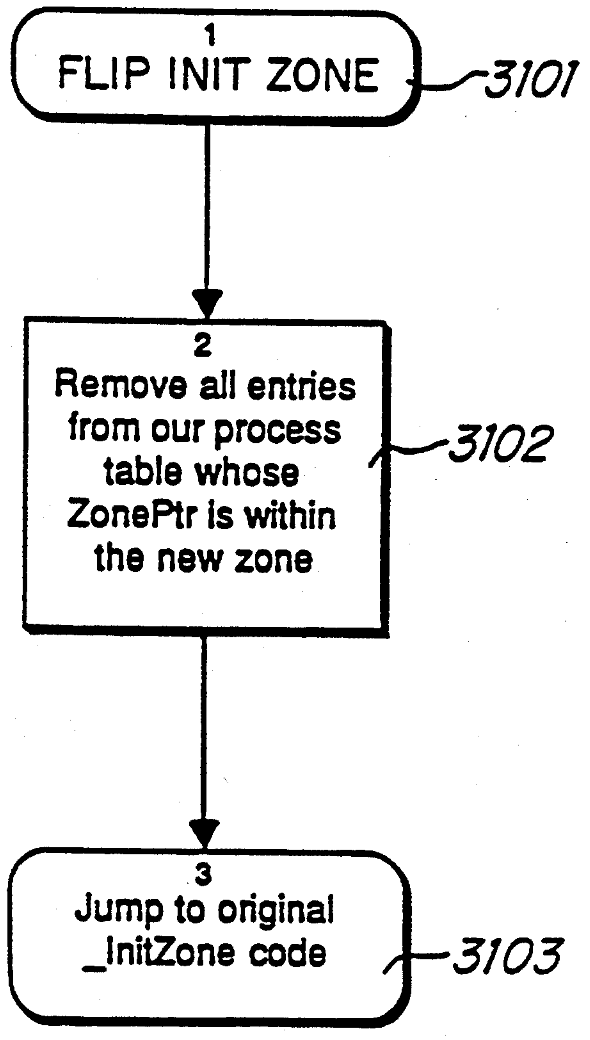
FIG. 31 shows a flow diagram of the software patch, in accordance with the present invention, to the prior art routine _InitZone.

Referring now to FIG. 31, the routine FlipInitZone 3101 executes step 3102 which removes all entries from the process table of the preferred embodiment which have a ZonePtr that lies within the new heap zone being initialized. Next, control is passed to the prior art _Initzone code 3103. This patch assists the preferred embodiment in maintaining a process table when running in a MultiFinder environment. There is no accepted method for determining when a process under the MultiFinder environment quits. Therefore, the table of processes of the preferred embodiment is updated when a new process is started, during which its zone is initialized.

Figure 32:
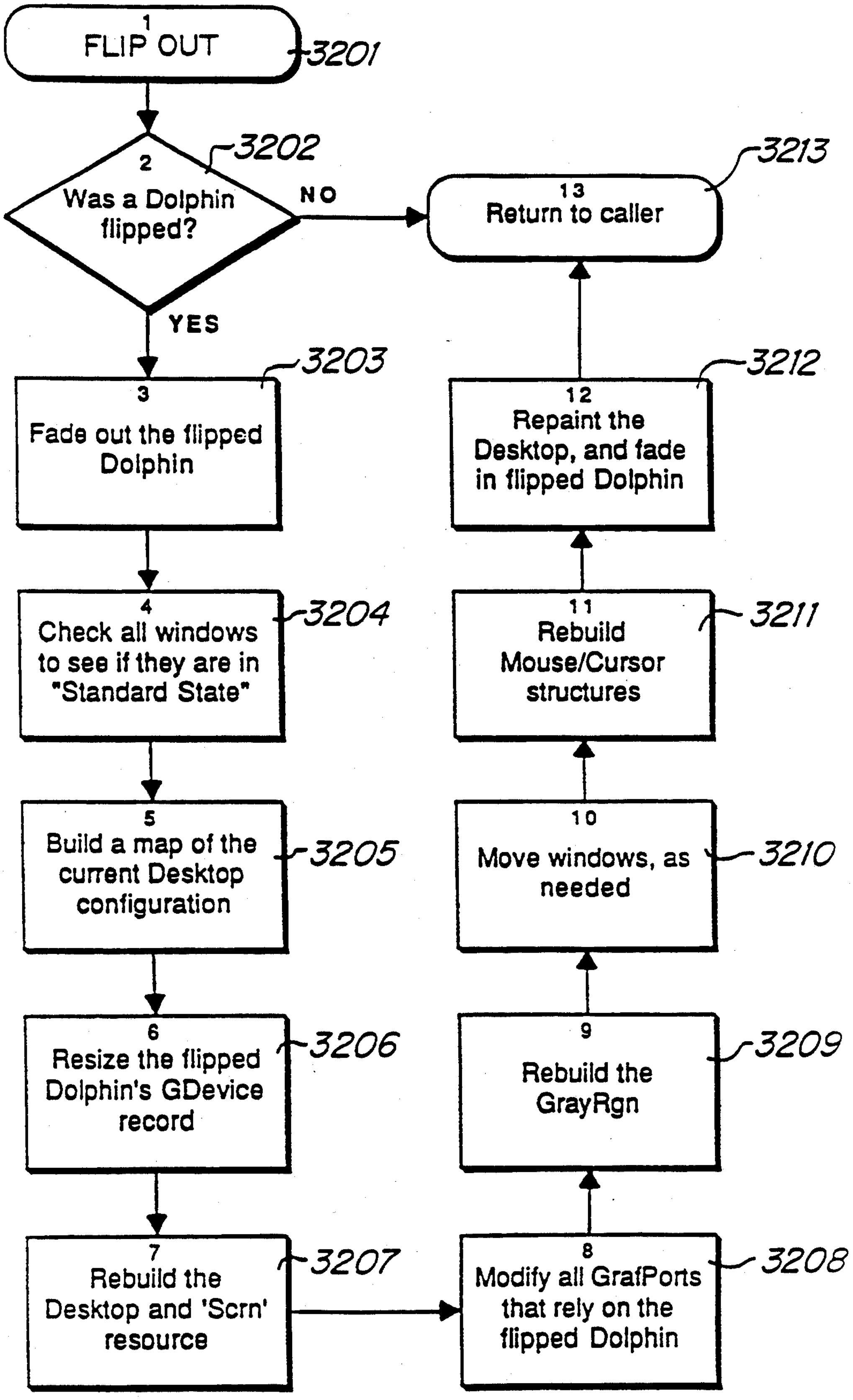
FIG. 32 shows a flow diagram of the software routine Check/Handle Flip in accordance with the present invention.
Figure 33B:
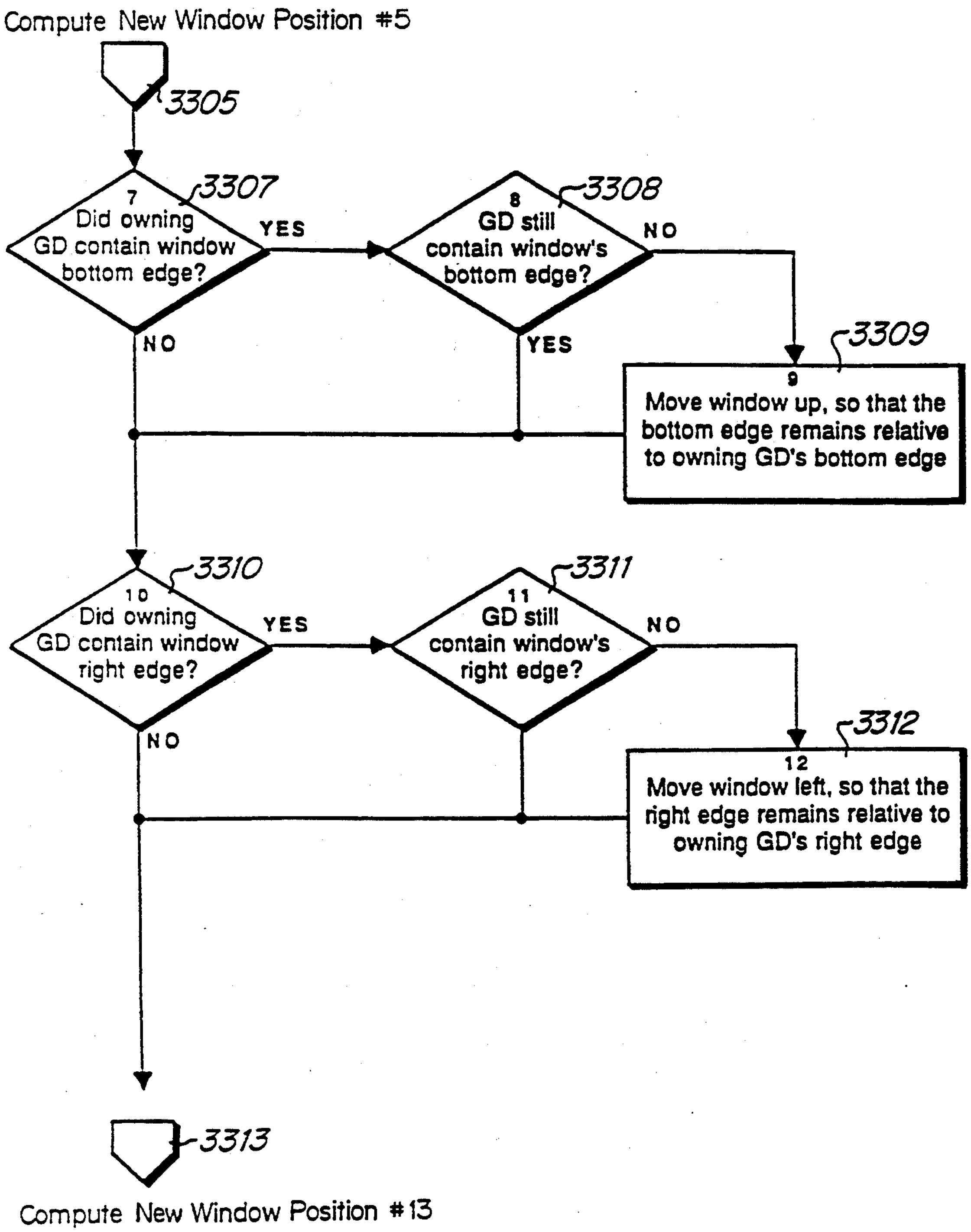
FIGS. 33(*a*), 33(*b*), 33(*c*) and 33(*d*) show a flow diagram of the software routine Compute New Window in accordance with the present invention.
Figure 33C:
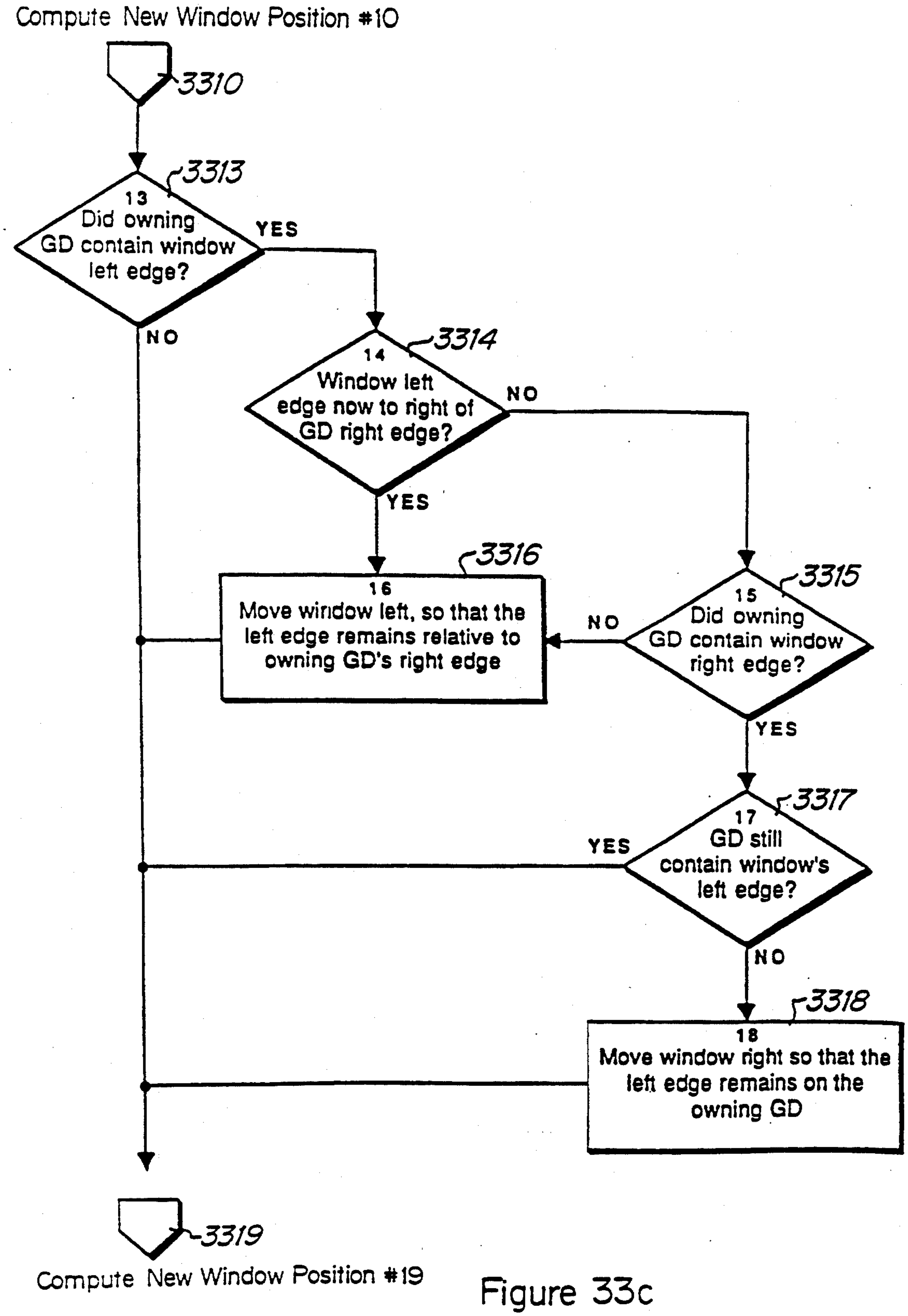
Figure 33D:
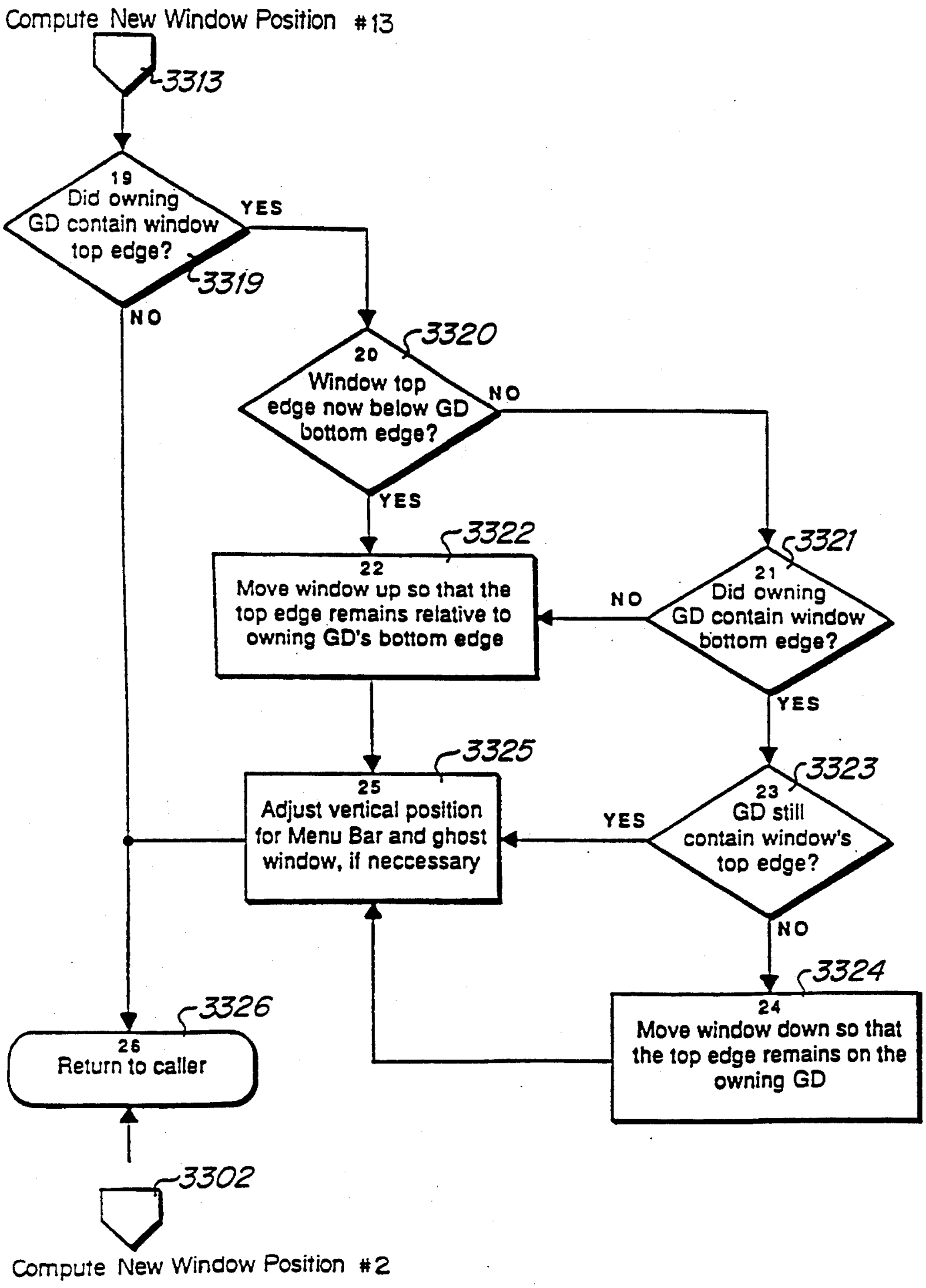
Figure 33A:
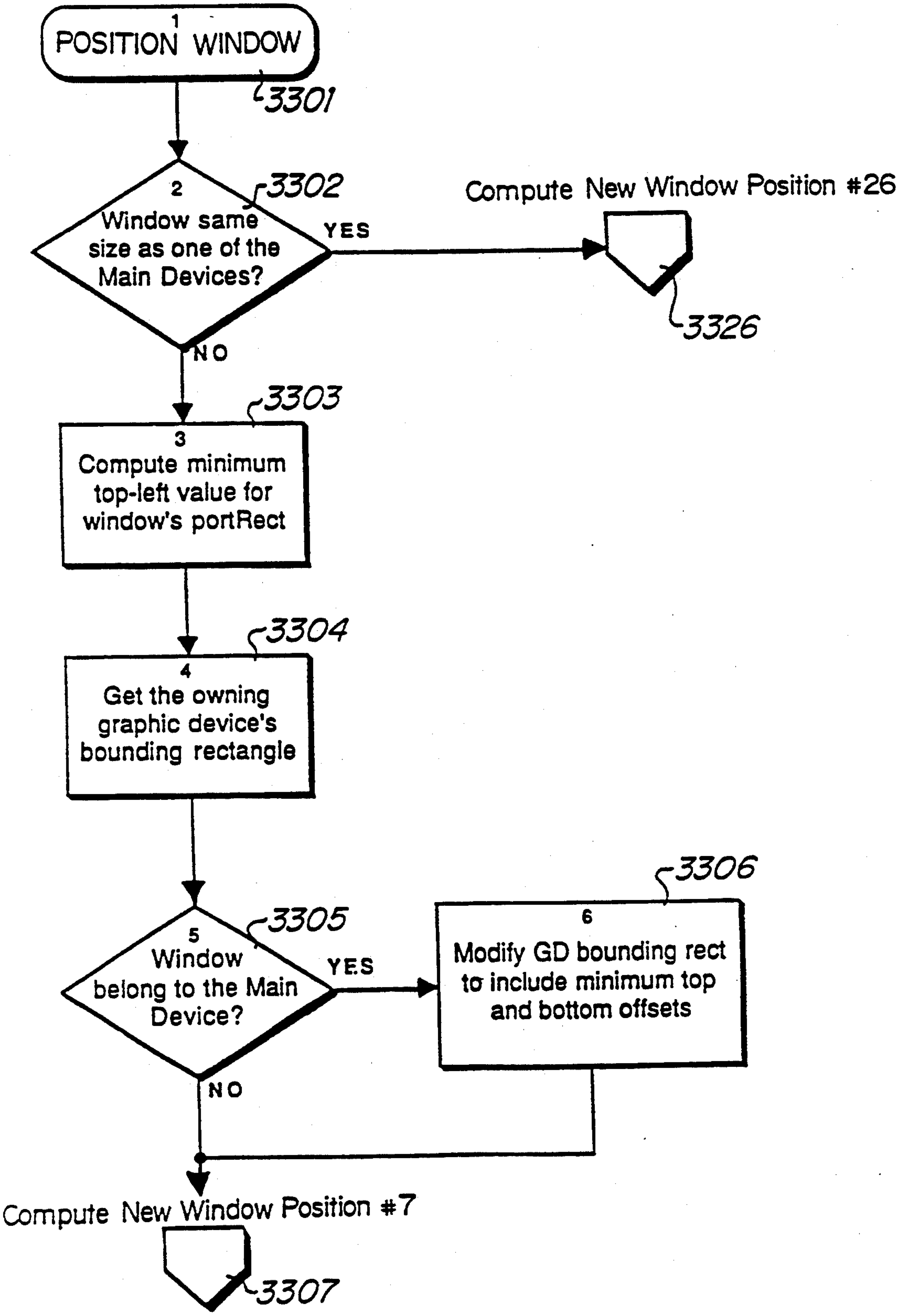

Referring now to FIG. 32, the routine FlipOut 3201 includes test 3202 which determines whether a monitor has been flipped. If not, control is returned to the caller 3213. Otherwise, step 3203 is executed to cause the flipped display to fade its image to black. Next, step 3204 is executed which checks windows to determine if they are in their standard (or "zoomed-out") state. Next, step 3205 is executed which builds an adjacency map of all of the displays currently operating in the system. Next, step 3206 is executed to resize the flipped display's prior art global GDevice record. Next, step 3207 is executed to reposition active displays as needed (to cope with the change in dimensions of the flipped device), and to update the prior art 'Scrn' system resource. Next, step 3208 is executed to modify all prior art GrafPorts which are based on the flipped device, updating them to the device's new orientation. Next, step 3209 is executed to rebuild the prior art global GrayRgn to match the new configuration of the displays. Next, step 3210 is executed to reposition windows as needed, so that they are still accessible under the new configuration of displays. Next, step 3211 is executed to rebuild the prior art mouse/cursor data structures. Next, step 3212 is executed to repaint the displays, and to fade the image on the flipped display back in so that it is once again visible. Finally, control is returned to the caller 3213. This code determines if a display is flipped, and if so, provides all of the basic processing to update prior art operating system global structures to best cope with the change.

Referring now to FIGS. 33(*a*), 33(*b*), 33(*c*) and 33(*d*), the routine Position Window 3301 includes test 3302 which determines if the window is the same size as one of the possible orientations of the display containing the menu bar. If so, control is passed directly to step 3326. If not, step 3303 is executed which computes the minimum top-left value that the window's prior art portRect variable can achieve. Next, step 3304 is called which returns the bounding rectangle of the display with which the window is best logically associated. Next, test 3305 is made to determine if the display associated with the window is the display containing the menu bar. If not, control is passed to step 3307. Otherwise, step 3306 is executed which modifies the bounding rectangle of the associated display so that it reflects the minimum top and bottom offsets which that window must maintain within its associated display (determined by the user on an applicationbyapplication basis; default values are 0). Next, test 3307 is performed which determines if the associated display contained the bottom edge of the window before the user flipped the display. If not, control is passed to step 3310. Otherwise, test 3308 is made which determines if the associated display still contains the bottom edge of the window. If so, control is passed to step 3310. Otherwise, step 3309 is executed which moves the window up so that the bottom edge remains on the associated display. Next, the test 3310 is performed which determines if the associated display contained the right edge of the window before the user flipped the current invention. If not, control is passed to step 3313. Otherwise, test 3311 is made which determines if the associated display still contains the right edge of the window. If so, control is passed to step 3313. Otherwise, step 3312 is executed which moves the window left so that the right edge remains on the associated device. Next, test 3313 is performed which determines if the associated display contained the left edge of the window before the user flipped the current invention. If not, control passes to step 3319. Otherwise, test 3314 is made which determines if the left edge of the window is to the right of the right edge of the associated display. If so, control is passed to step 3316. Otherwise, test 3315 is performed to check to determine if the associated display contained the right edge of the window before the user flipped the current invention. If not, step 3316 is executed which moves the window left, so that the left edge of the window keeps a constant distance relative to the associated right edge of the display. Otherwise, test 3317 is performed which determines if the associated graphics device still contains the left edge of the window. If so, control transfers to step 3319. Otherwise, step 3318 is executed which moves the window right so that the left edge remains on the associated display. Next, test 3319 is performed which determines if the associated display contained the top edge of the window before the user flipped the display. If not, control passes to step 3326. Otherwise, test 3320 is made which determines if the top edge of the window is below the bottom edge of the associated display. If so, control is passed to step 3322. Otherwise, test 3321 is performed to check to determine if the associated display contained the bottom edge of the window before the user flipped the display. If not, step 3322 is executed which moves the window up, so that the top edge of the window keeps a constant distance relative to the bottom edge of the associated display. Otherwise, test 3323 is performed which determines if the associated graphics device still contains the top edge of the window. If so, control transfers to step 3325. Otherwise, step 3325 is executed which moves the window down so that the top edge remains on the associated display. Next, step 3325 is executed which adjusts the vertical position of the window so that it resides below the menu bar and ghost window, if necessary. This routine is responsible for repositioning a window after the user flips a display, so that it remains accessible and logically placed on the new orientation of the displays.

Figure 34A:
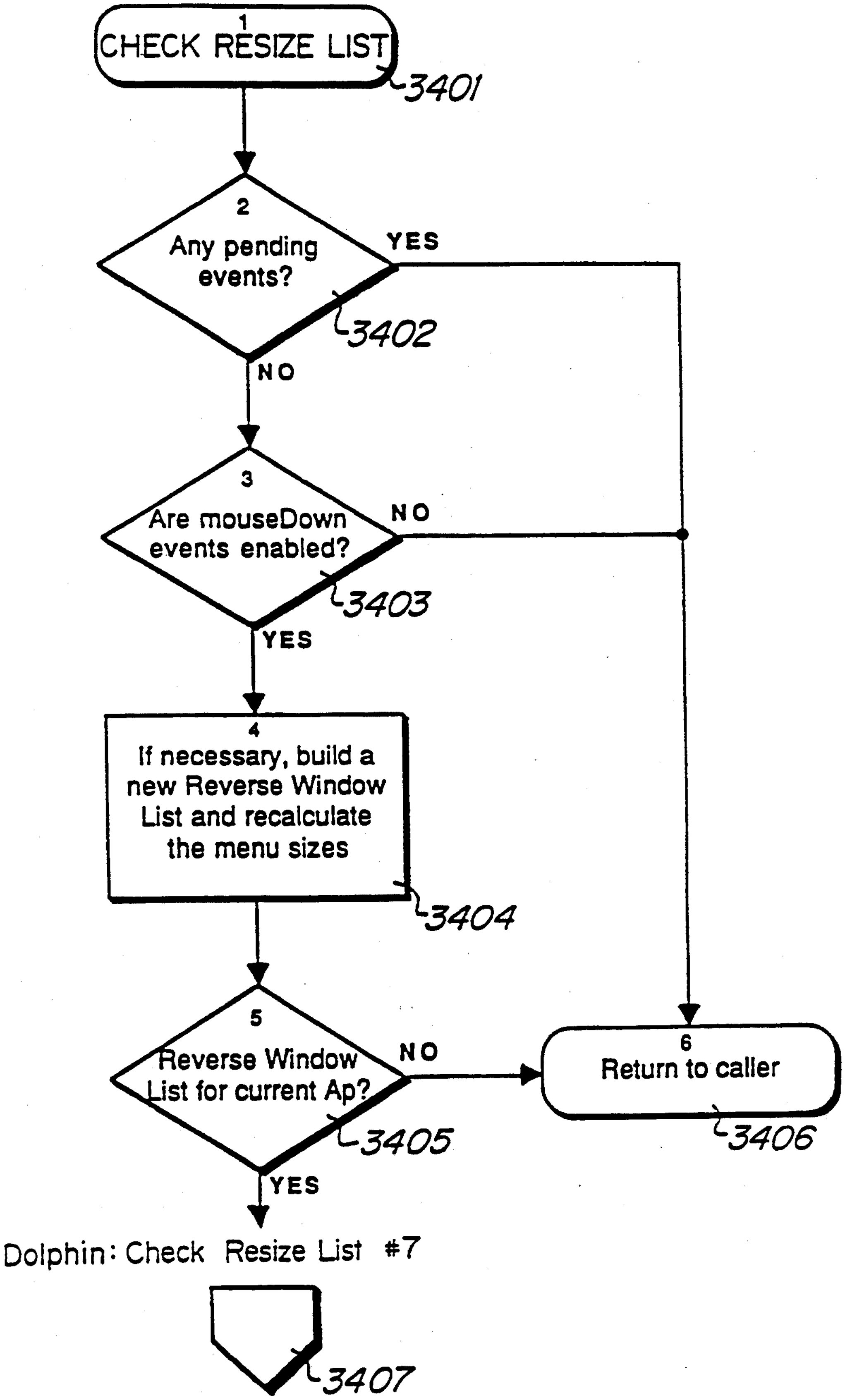
FIGS. 34(*a*) and 34(*b*) show a flow diagram of the software routine Check Resize List in accordance with the present invention.
Figure 34B:
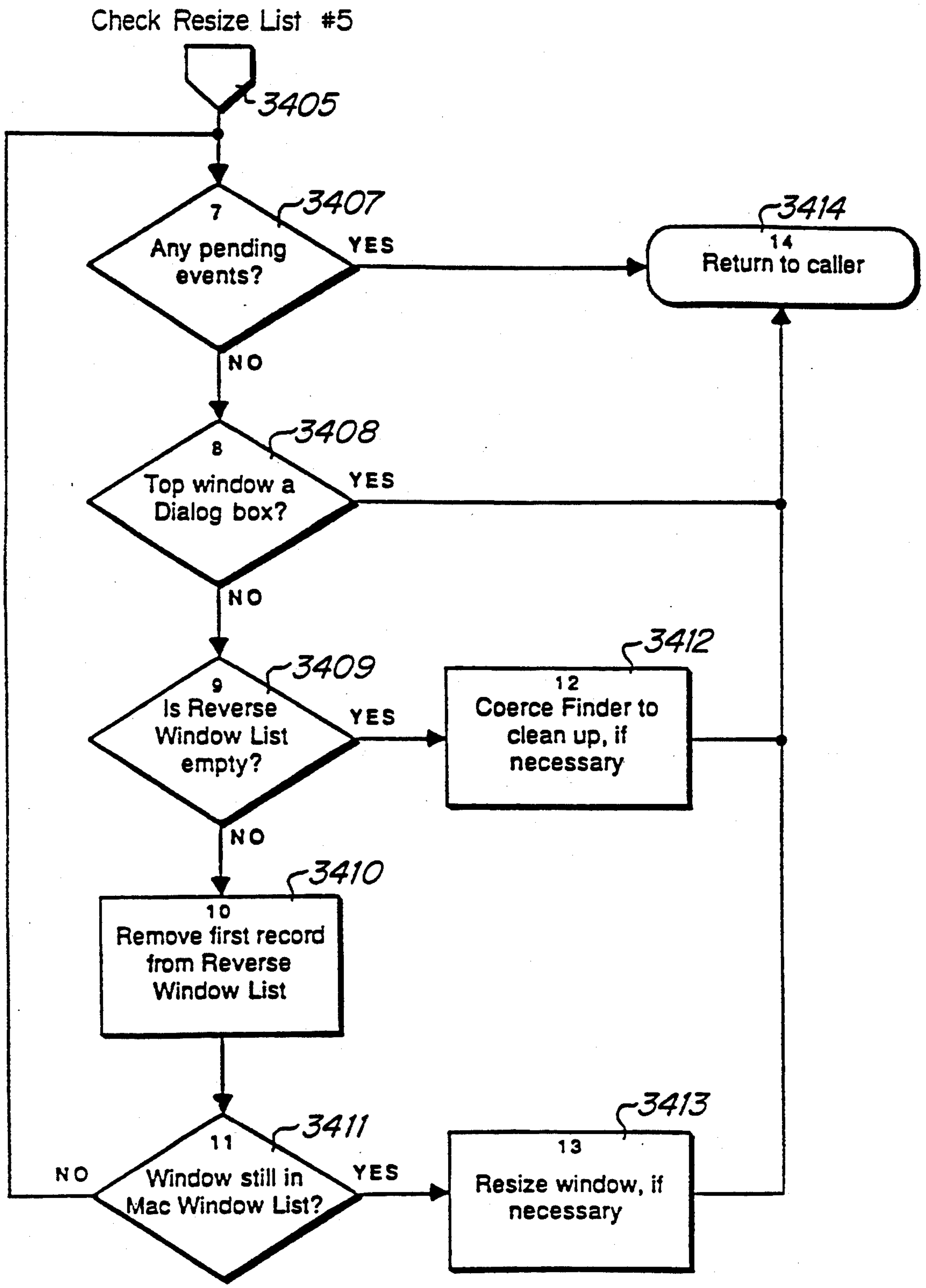

Referring now to FIGS. 34(*a*) and 34(*b*), the routine CheckResizeList 3401 includes test 3402 which determines if there are any pending events that the application needs to handle. If so, control is returned to the caller 3406. Otherwise, test 3403 is performed which determines if "mouse down" events are enabled. If not, control is returned to the caller 3406. Otherwise, step 3404 is executed, which, if necessary, builds a new list of windows (in reverse order of their appearance on the desktop) and recalculates the application's menu sizes. Next, test 3405 is performed which checks to make sure that the reverse window list currently being processed is for the application currently executing. If not, control is returned to the caller 3406. Otherwise, test 3407 is performed which determines if there are any pending events that the application needs to handle. If so, control is returned to the caller 3414. Otherwise, test 3404 is performed which determines if the topmost window being displayed is a dialog box. If so, control is returned to the caller 3414. Otherwise, test 3409 is performed which determines if the reverse window list is empty. If so, step 3412 is executed which directs the Finder to perform a cleanup operation, if necessary. Otherwise, step 3410 is executed which removes the first window from the reverse window list. Next, test 3411 is performed which determines if the window is still active in the system. If not, control is passed to step 3407. Otherwise, step 3413 is executed, which resizes the window, if necessary. Finally, control is returned to the caller 3414. This routine builds and processes the list of windows which need to be resized after the user has flipped a display according to the present invention.

Figure 35:
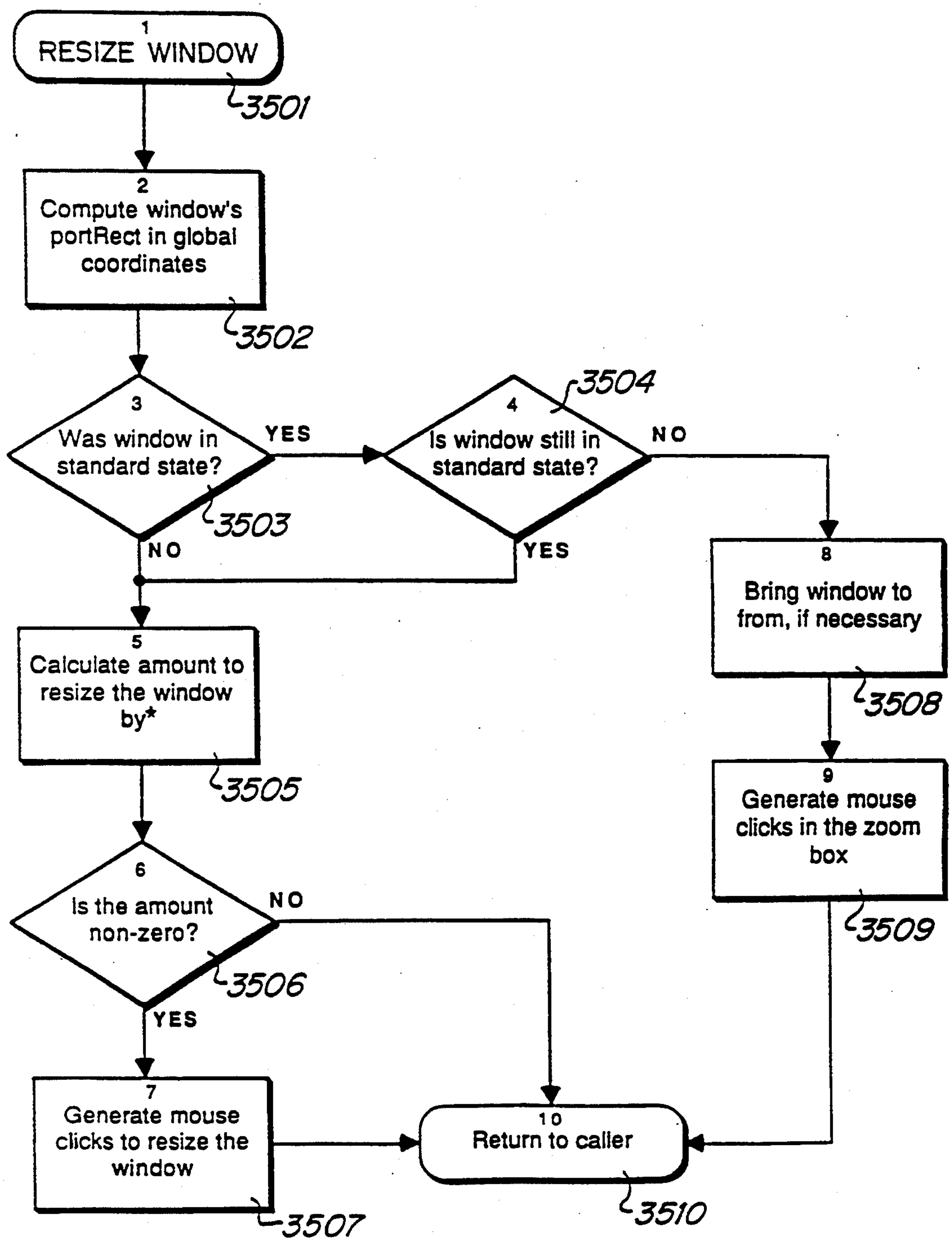
FIG. 35 shows a flow diagram of the software routine Resize Window in accordance with the .present invention.

Referring now to FIG. 35, the routine ResizeWindow 3501 first executes step 3502 which computes the prior art variable portRect of the window in global coordinates. Next, it performs test 3503 which determines if the window was in its standard ("zoomed out") state before the display was flipped by the user. If not, control is passed to step 3505. Otherwise, test 3504 is performed which determines if the window is still in its standard ("zoomed out") state. If so, control is passed to step 3505. Otherwise, step 3508 is executed which brings the window in front of all the other displayed windows. Next, step 3509 is executed which generates the phantom mouse clicks to coerce the window's application into rezooming to its standard state. Next, control is returned to the caller 3510. Step 3505 calculates the amount that the window needs to be resized by in order for it to remain fully accessible on the flipped display. Next, test 3506 is performed which determines if the resize amount is non-zero. If not, control is returned to the caller 3510. Otherwise, step 3507 is executed which generates the phantom mouse clicks needed to perform the resizing. Finally, control is returned to the caller 3510. This routine generates the phantom mouse clicks needed, if any, to resize a window after the user has flipped a display of the present invention.

Figure 36:
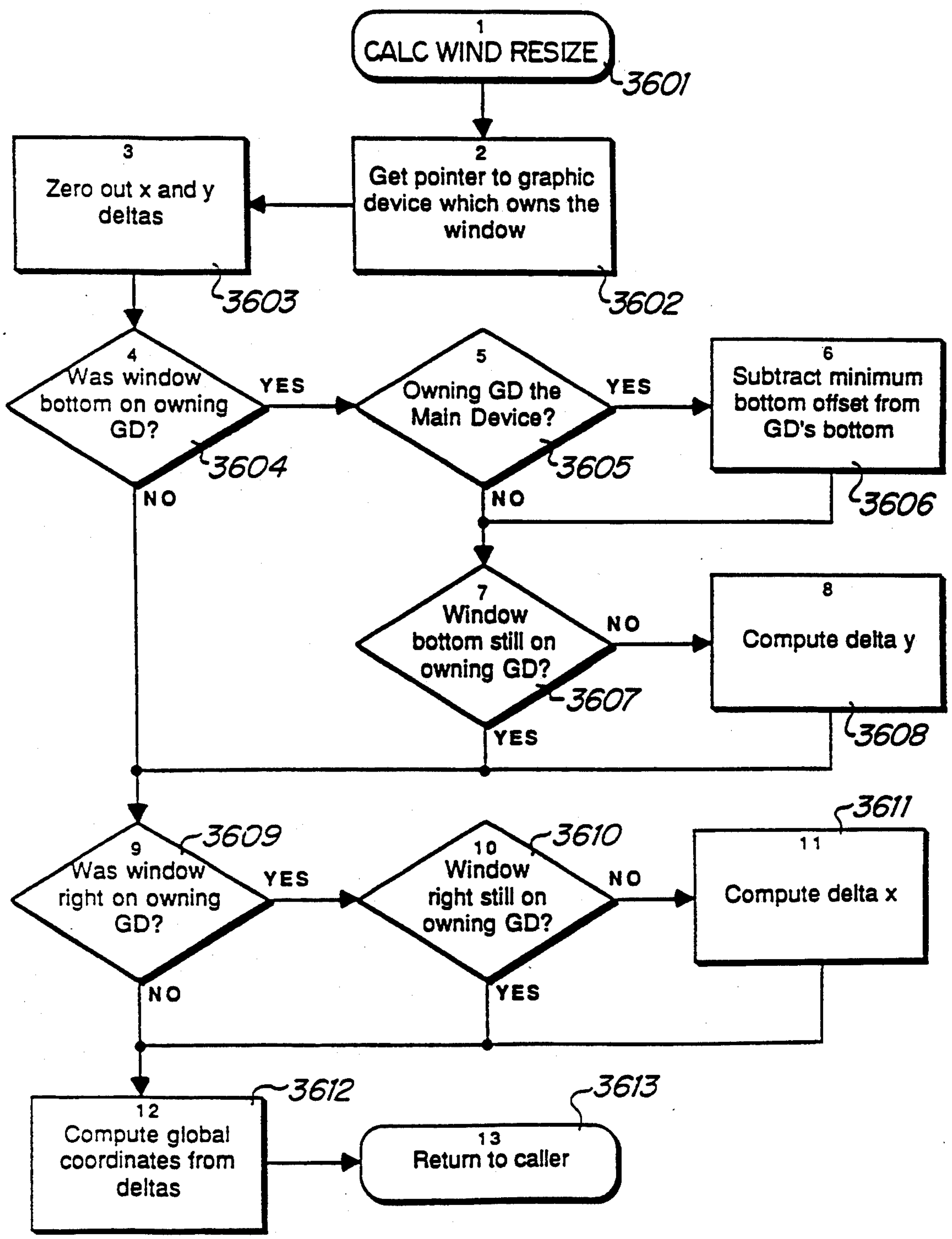
FIG. 36 shows a flow diagram of the software routine Compute Resize Amount in accordance with the present invention.

Referring now to FIG. 36, the routine CalcWindResize 3601 first executes step 3602 which returns the bounding rectangle of the display associated with the window being resized. Next, step 3603 is executed which zeros out local x and y delta variables which are used to determine the amount by which the window must be resized. Next, test 3604 is performed which determines if the bottom edge of the window was on the associated display before the user flipped the present invention. If not, control is passed to step 3609. Otherwise, test 3605 is performed which determines if the associated display is the display with the menu bar. If not, control is passed to step 3607. Otherwise, the minimum bottom offset for the application of the window is subtracted from the rectangle of the associated display (offset determined by the user on an application-by-application basis; default is zero) at step 3606. Next, test 3607 is performed to determine if the bottom edge of the window still intersects the rectangle of the associated display. If so, control is passed to step 3609. Otherwise, step 3608 is executed which computes the delta y needed to keep the bottom edge of the window on the associated display. Next, test 3609 is performed which determines if the right edge of the window was on the associated display before the user flipped the display. If not, control is passed to step 3612. Next, test 3610 is performed to check to determine if the right edge of the window still intersects the rectangle of the associated display. If so, control is passed to step 3612. Otherwise, the procedure 3611 is called which computes the delta x needed to keep the right edge of the window on the associated display. Finally, step 3612 is called which computes global coordinates from the delta x and delta y local variables. This routine is responsible for computing the amount which a window needs to be resized after the user flips the display, so that the window remains accessible and logically placed on the new orientation of the displays.

Figure 37:
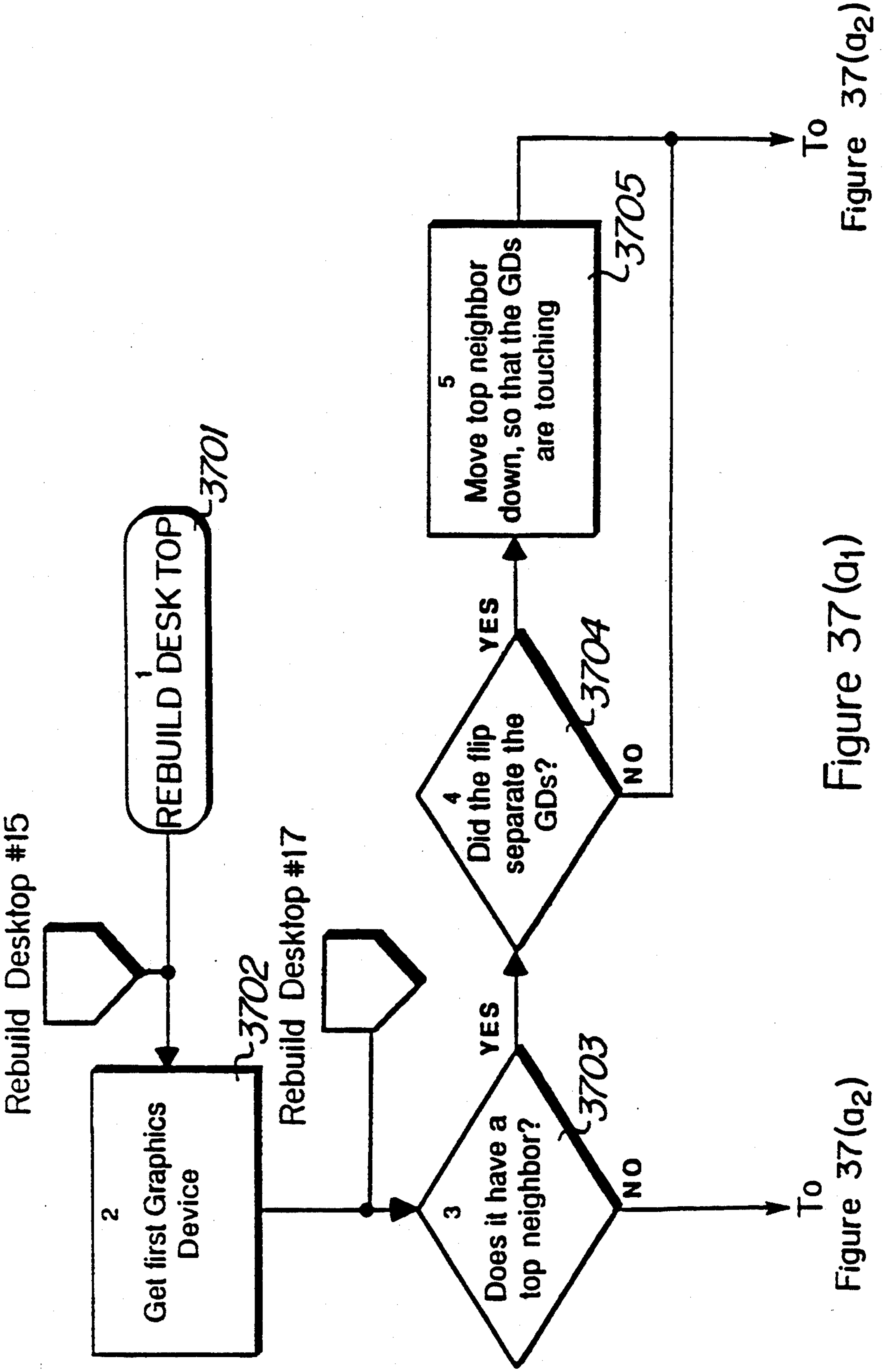
FIGS. 37(*a*1)-37(*a*2), 37(*b*), 37(*c*1)-37(*c*2), 37(*d*) and 37 show a flow diagram of the software routine Rebuild Desktop in accordance with the present invention.
Figure 37:
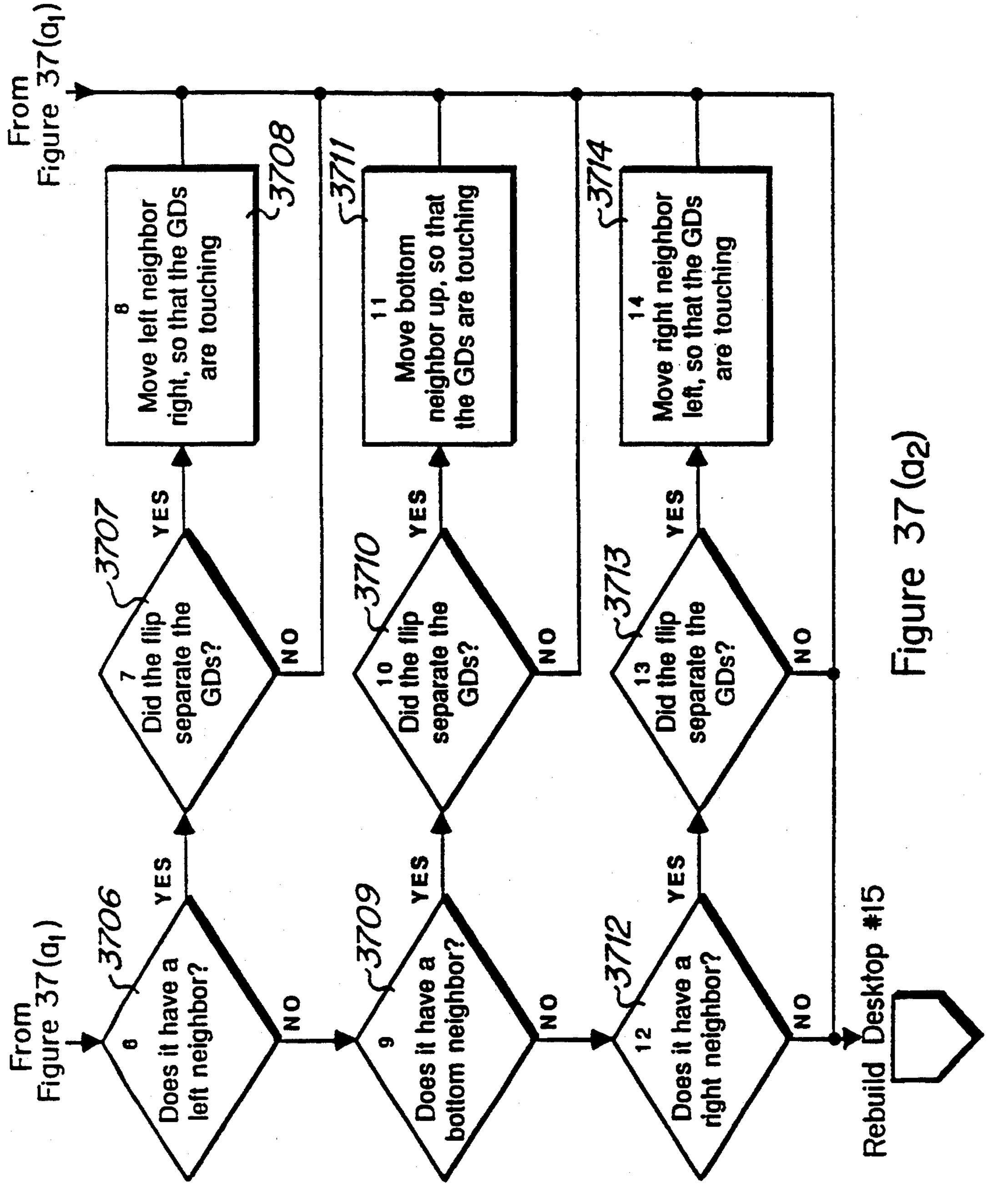
Figure 37B:
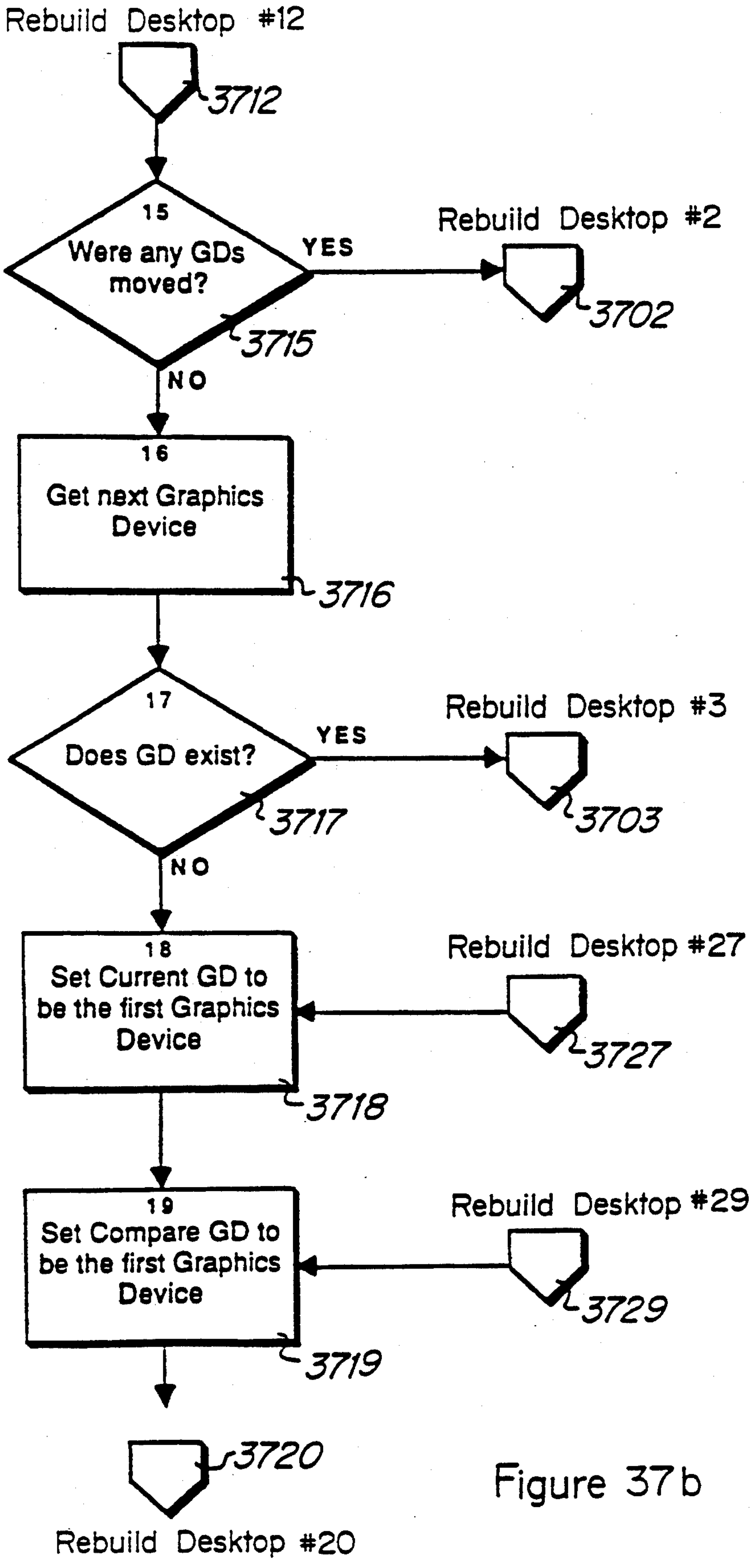
Figure 37:
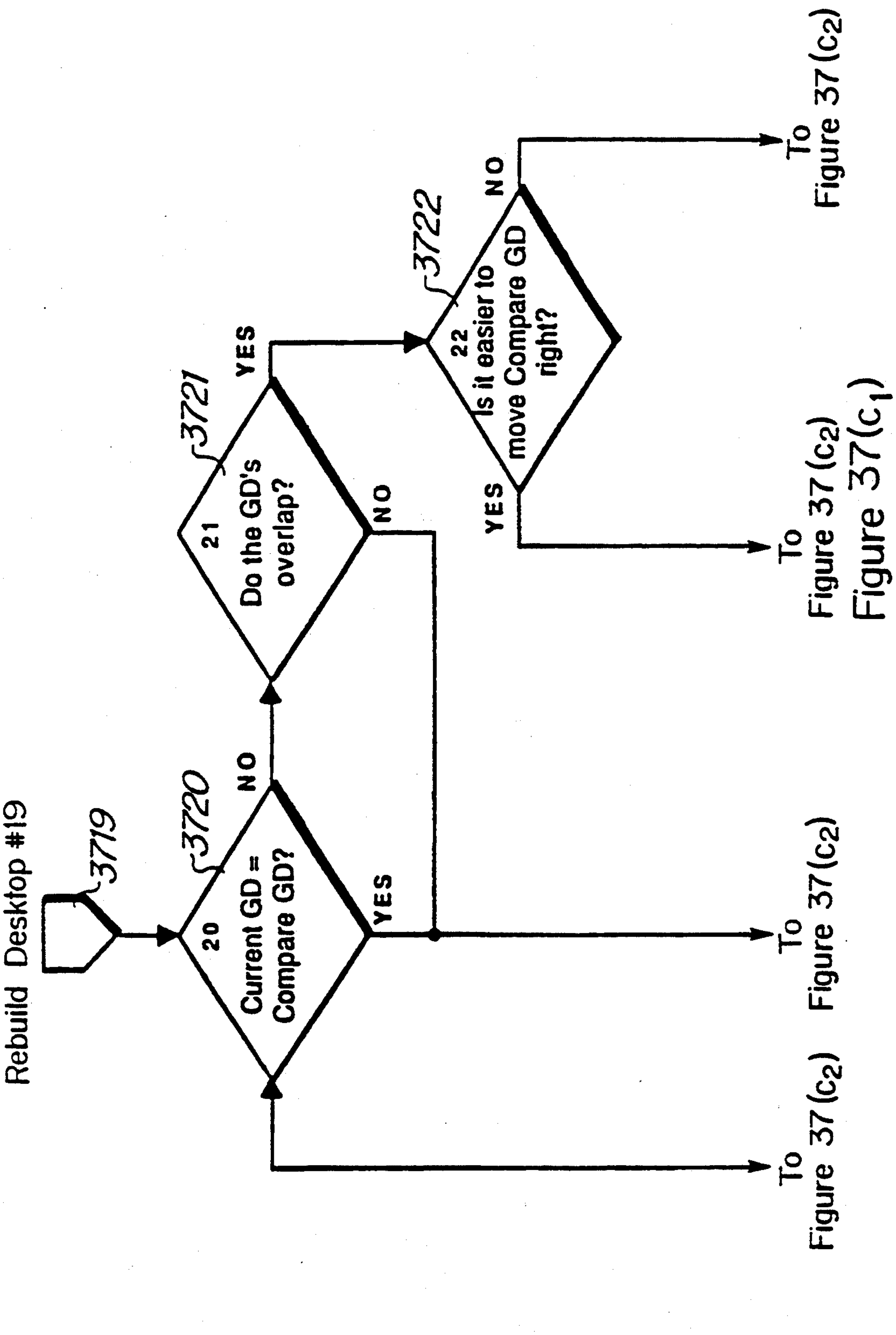
Figure 37:
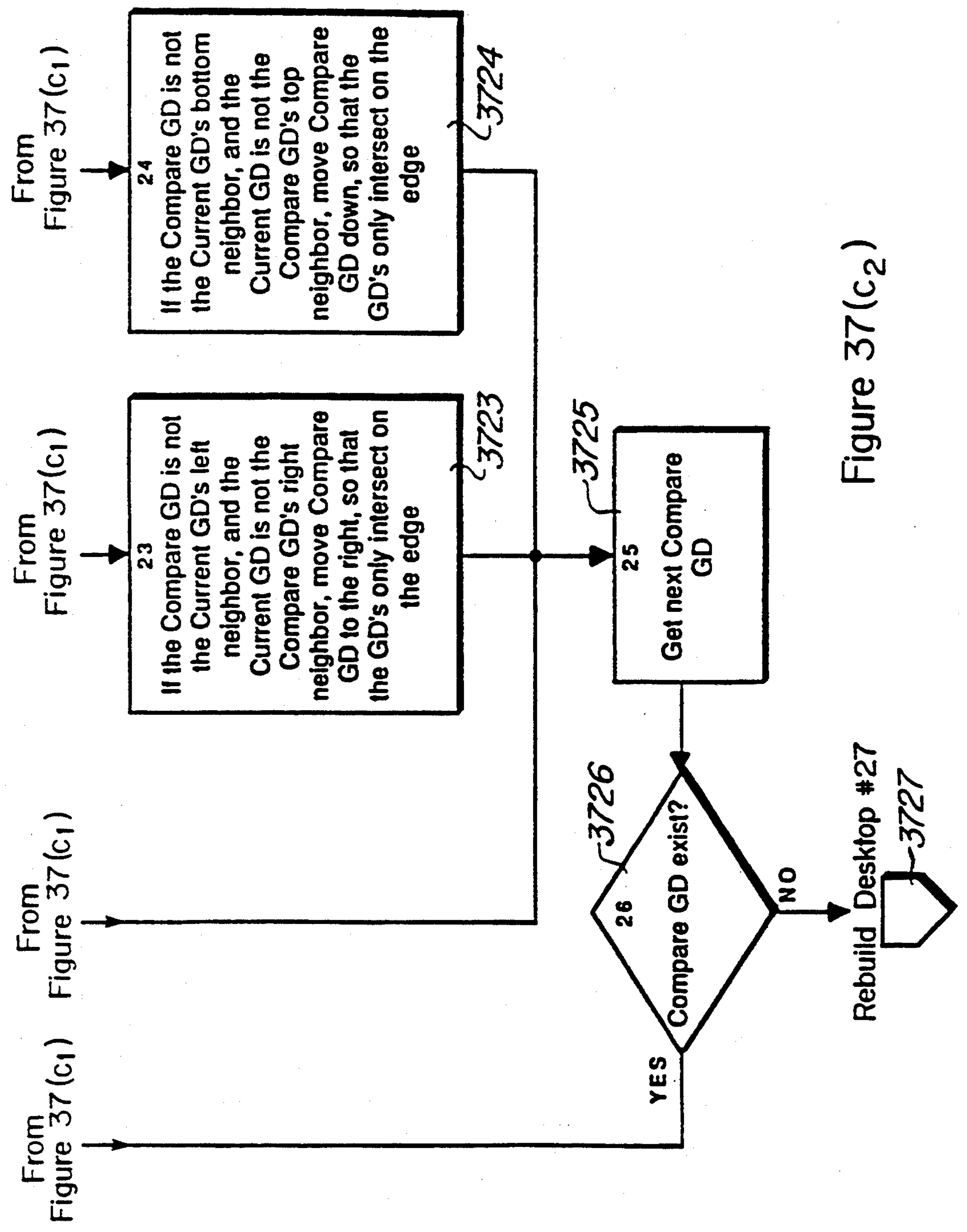
Figure 37D:
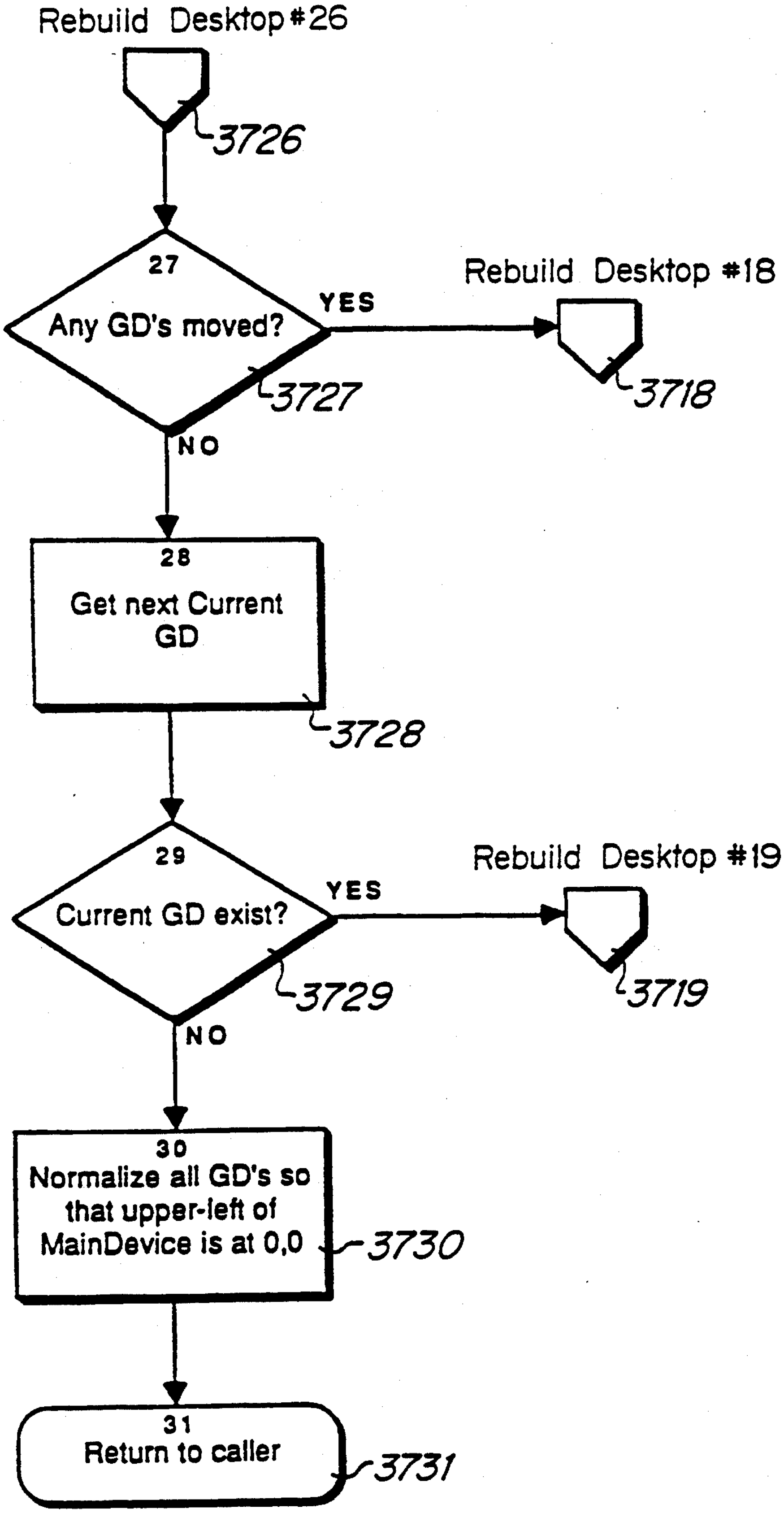
Figure 37:
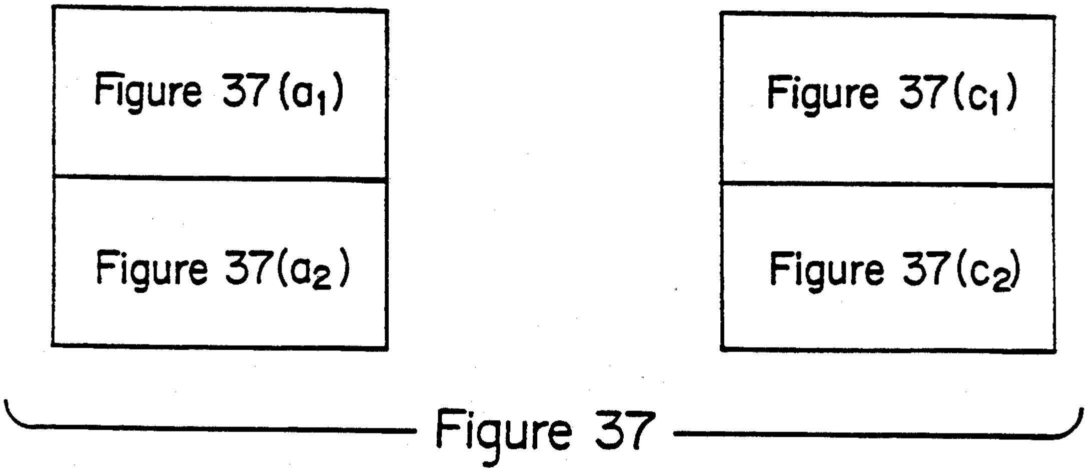

Referring now to FIGS. 37(*a*), 37(*b*), 37(*c*) and 37(*d*), the routine Rebuild Desktop 3701 first executes step 3702 which returns the bounding rectangle of the first display in the computer system. Next, test 3703 is performed which determines if the display shared its top edge with another display before the user flipped the present invention. If not, control transfers to test 3706. Otherwise, test 3704 is made which determines if the displays were separated by the flip. If not, control transfers to step 3715. Otherwise, step 3705 is executed which moves the neighbor down, so the two displays once again share the same edge, and control transfers to step 3715. Test 3706 is performed which determines if the display shared its left edge with another display before the user flipped the orientation according to the present invention. If not, control transfers to step 3709. Otherwise, test 3707 is performed which determines if the displays were separated by the flip. If not, control transfers to step 3715. Otherwise, step 3708 is called which moves the neighbor right, so the two displays once again share the same edge. Next, control transfers to step 3715. Test 3709 is performed which determines if the display shared its bottom edge with another display before the user flipped the present invention. If not, control transfers to step 3712. Otherwise, test 3710 is made which determines if the displays were separated by the flip. If not, control transfers to step 3715. Otherwise, step 3711 is called which moves the neighbor up, so the two displays once again share the same edge, and control transfers to step 3715. If test 3709 reveals that there is no bottom neighbor, then test 3712 is performed which determines if the display shared its right edge with another display before the user flipped the present invention. If not, control transfers to step 3715. Otherwise, test 3713 is made which determines if the displays were separated by the flip. If not, control transfers to step 3715. Otherwise, step 3714 is called which moves the neighbor left, so the two displays once again share the same edge. Next, test 3715 is performed which determines if any displays were moved in order to reconnect edges. If so, control passes to step 3702. Otherwise, the procedure 3716 is called, which returns the next display in the system. Next, test 3717 is performed to make sure that a display was returned by step 3716. If so, control is transferred to step 3703. Otherwise, step 3718 is executed which sets the local variable CurrentGD to be the first display in the system. Next, step 3719 is executed to set the local variable CompareGD to be the first display in the system. Next, test 3720 is performed which determines if the Current CD display matches the CompareGD display. If so, control transfers to step 3725. Otherwise, test 3721 is performed which determines if the two displays overlap in coordinate space. If not, control transfers to step 3725. Otherwise, test 3722 is performed which determines if it is easier to move the CompareGD display to the right. If so, step 3723 is executed to move the CompareGD display to the right so that the two displays only share coordinate space along one edge, provided that the CompareGD display is not the left neighbor of the CurrentGD display, and that the CurrentGD display is not the right neighbor of the CompareGD display. Otherwise, step 3724 is executed to move the Compare GD display down so that the two displays only share coordinate space along one edge, provided that the CompareGD display is not the top neighbor of the CurrentGD display, and that the CurrentGD display is not the bottom neighbor of the CompareGD display. In either case, step 3725 is called which assigns the local variable CompareGD with the next display in the system after its current value. Next, test 3726 is made which checks to make sure that the CompareGD is valid (that there actually is another display in the system). If so, control transfers to step 3720. If not, test 3727 is executed which determines if any displays were moved (changed coordinate systems). If so, control transfers to step 3718. If not, step 3728 is executed which assigns the local variable Current GD with the next display in the system after its current value. Next, test 3729 is made which checks to make sure the Current GD is valid (that there actually is another display in the system). If so, control transfers to step 3719. Otherwise, step 3730 is executed which normalizes the coordinates of all of the systems in the display so that the upper-left corner of the display with the menu bar is a 0,0. Finally, execution is returned to the caller 3731. This procedure is responsible for rearranging the coordinate systems of the displays after the user flips a display of the present invention.

Figure 38A:
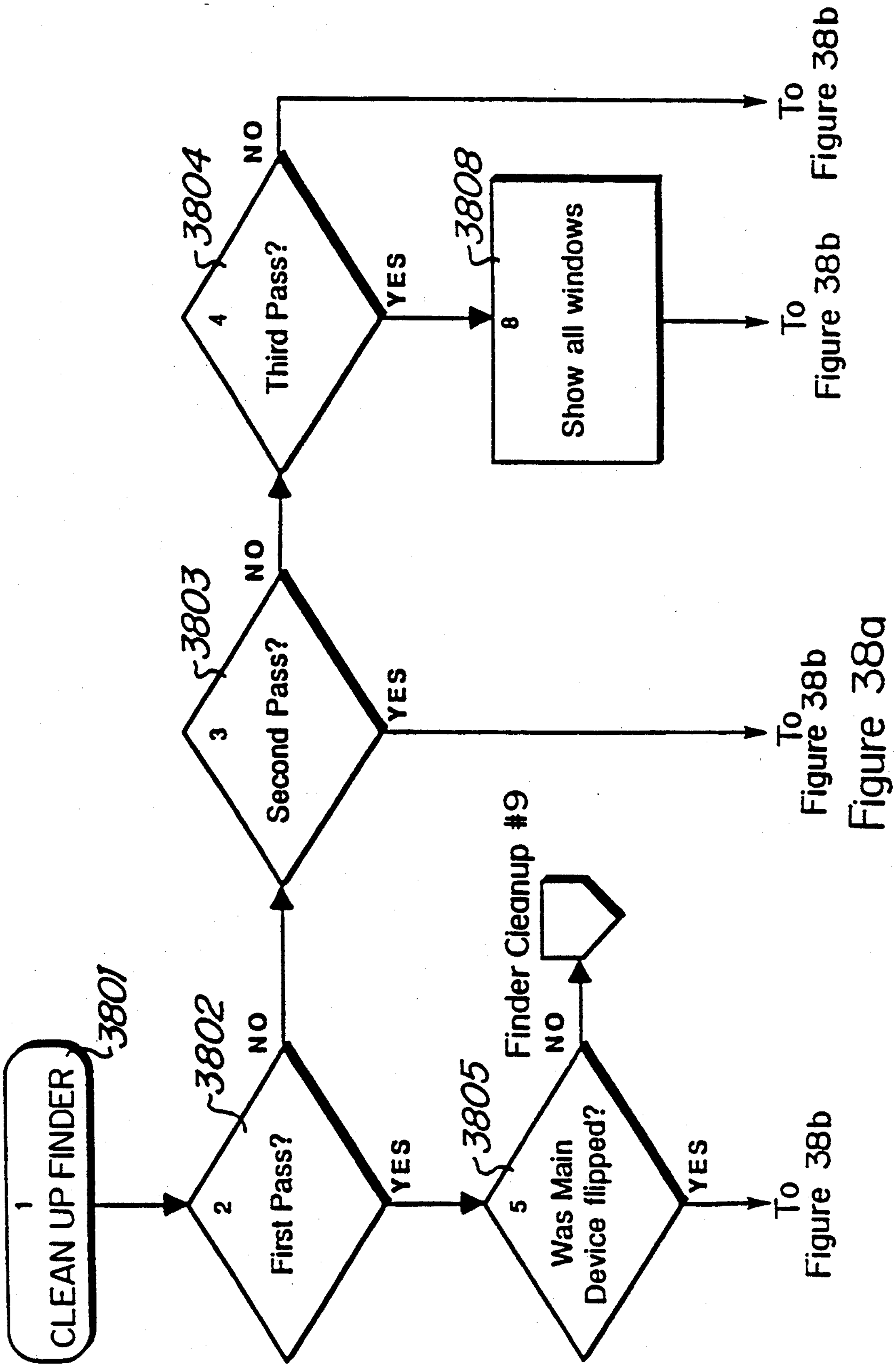
FIGS. 38 and 38(*a*)-38(*b*) show a flow diagram of the software routine Finder Cleanup in accordance with the present invention.
Figure 38B:
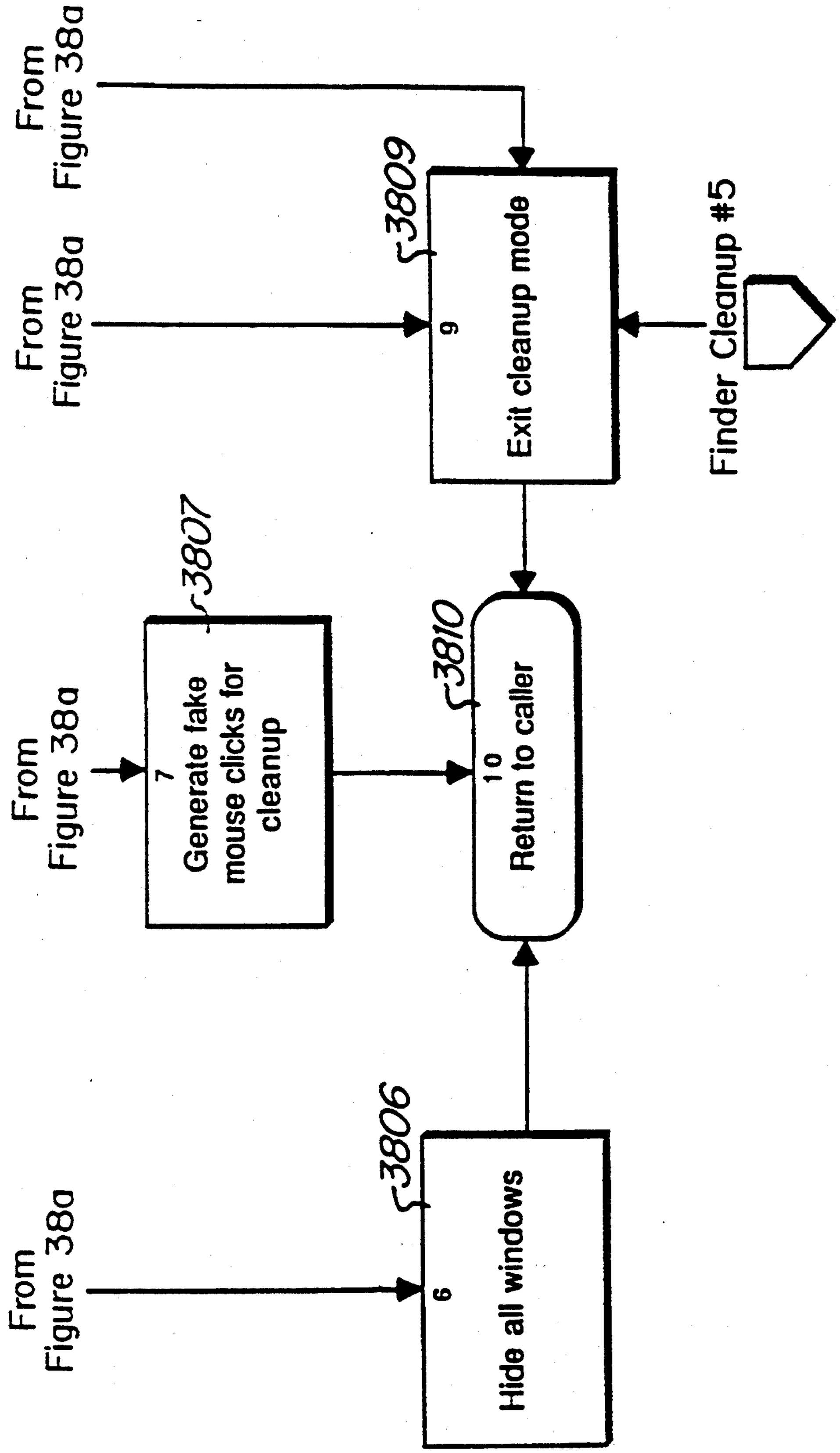
Figure 38:
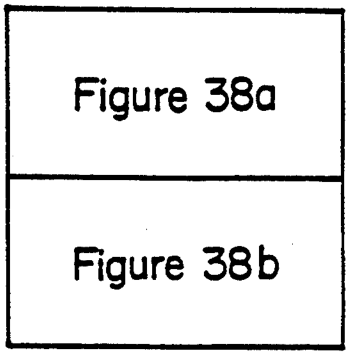

Referring now to FIG. 38, the routine CleanUpFinder 801 includes test 3802 which determines if this is the first pass through the routine since the user flipped a display of the present invention. If not, control passes to step 3803. If so, test 3805 is executed to check to determine if the flipped display contained the menu bar. If not, control passes to step 3809. Otherwise, step 3806 is executed which hides all of the visible windows of the Finder. Next, execution is returned to the caller 3810. Test 3803 determines if this is the second pass through the routine since the user flipped a display of the present invention. If not, control passes to step 3804. If so, step 3807 is executed which generates the phantom mouse clicks needed to coerce the Finder into commencing its cleanup operation. Next, execution is returned to the caller 3810. Test 3804 determines if this is the third pass through the routine since the user flipped a display of the present invention. If not, control passes to step 3809. Otherwise, step 3808 is executed which shows all of the windows of the Finder previously hidden by step 3806. Next, step 3809 is executed which causes the present invention to exit its Finder cleanup mode. Finally, execution is returned to the caller 3810. This procedure coordinates the activities needed to coerce the Finder into repositioning its desktop icons after the user has flipped a display. It is called as long as the present invention is in its Finder cleanup mode.

Figure 39:
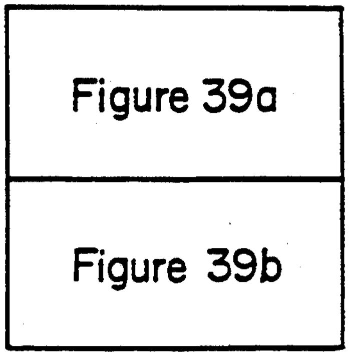
FIGS. 39 and 39(*a*)-39(*b*) show a flow diagram of the software routine Map Rectangle to Main Device in accordance with the present invention.
Figure 39A:
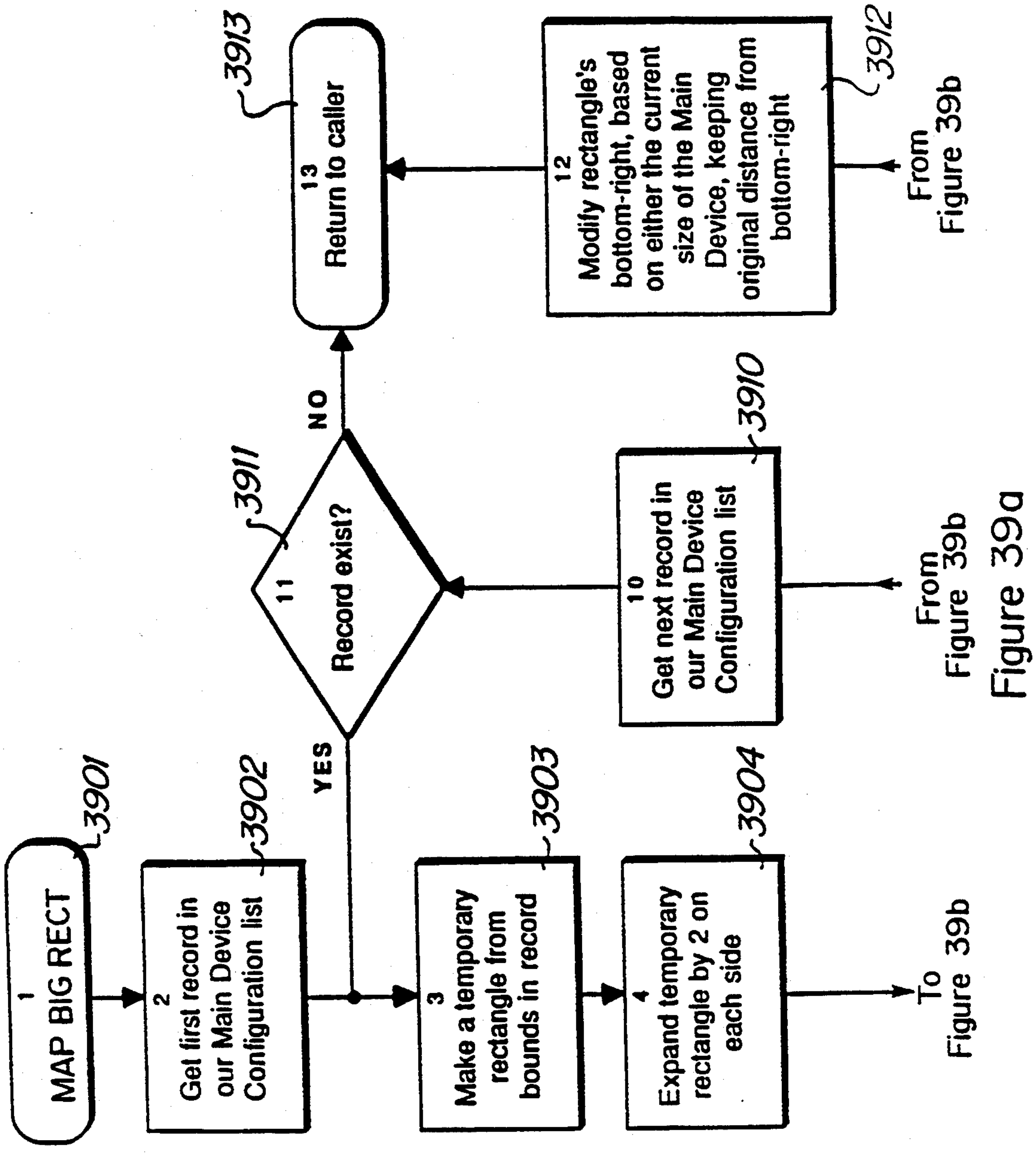
Figure 39B:
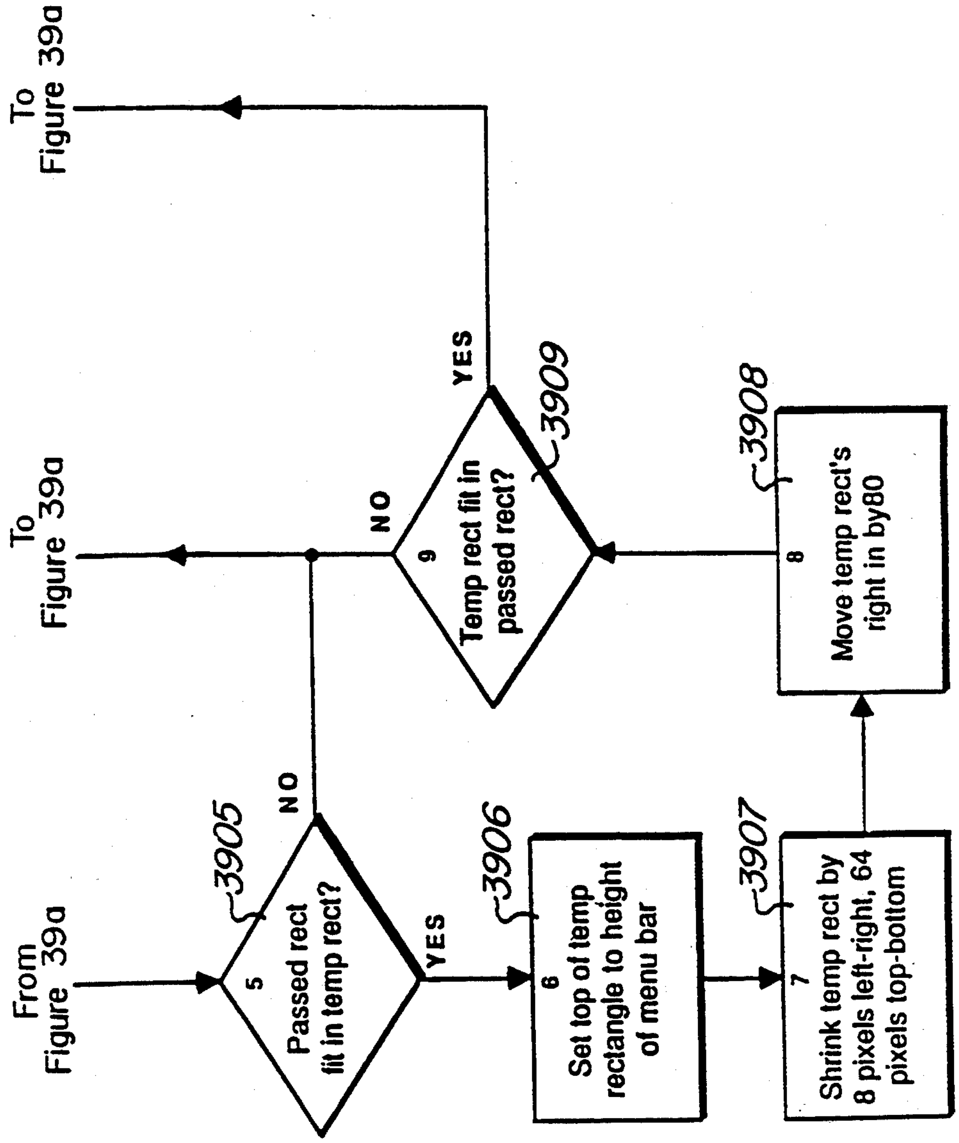

Referring now to FIG. 39, the routine MapBigRect 3901 first calls step 3902 to get the first record in a list of ossible sizes which the display with the menu bar may have. Next, step 3903 is executed which makes a temporary rectangle from the bounds in the display size record. Next, step 3904 expands the temporary rectangle by two pixels on each side. Next, test 3905 is executed which determines if the rectangle passed by the calling routine fits inside of the expanded temporary rectangle. If not, control passes to step 3910. Otherwise, step 3906 sets the top of the temporary rectangle to be the height of the menu bar. Next, step 3907 is executed to shrink the rectangle by 8 pixels left, 8 pixels right, 64 top, and 64 bottom. Next, step 3908 is executed to move the right edge of the temporary rectangle in by 80 pixels. Next, test 3909 is performed which determines if the temporary rectangle will fit inside the passed-in rectangle. If so, step 3912 modifies the bottom-right corner of the passed-in rectangle, so that the bottom-right maintains its distance relative to the current bottom-right corner of the display with the menu bar. Next, control is returned to the caller 3913. Step 3910 gets the next record in the list of possible sizes which the display with the menu bar may have. Next, test 3911 is performed to check to make sure that the record just retrieved exists. If so, execution transfers to step 3903. Otherwise, control is returned to the caller 3913. This procedure maps a given rectangle (usually representing the standard state of a window) to best fit inside the current dimensions of the display with the menu bar.

Figure 40:
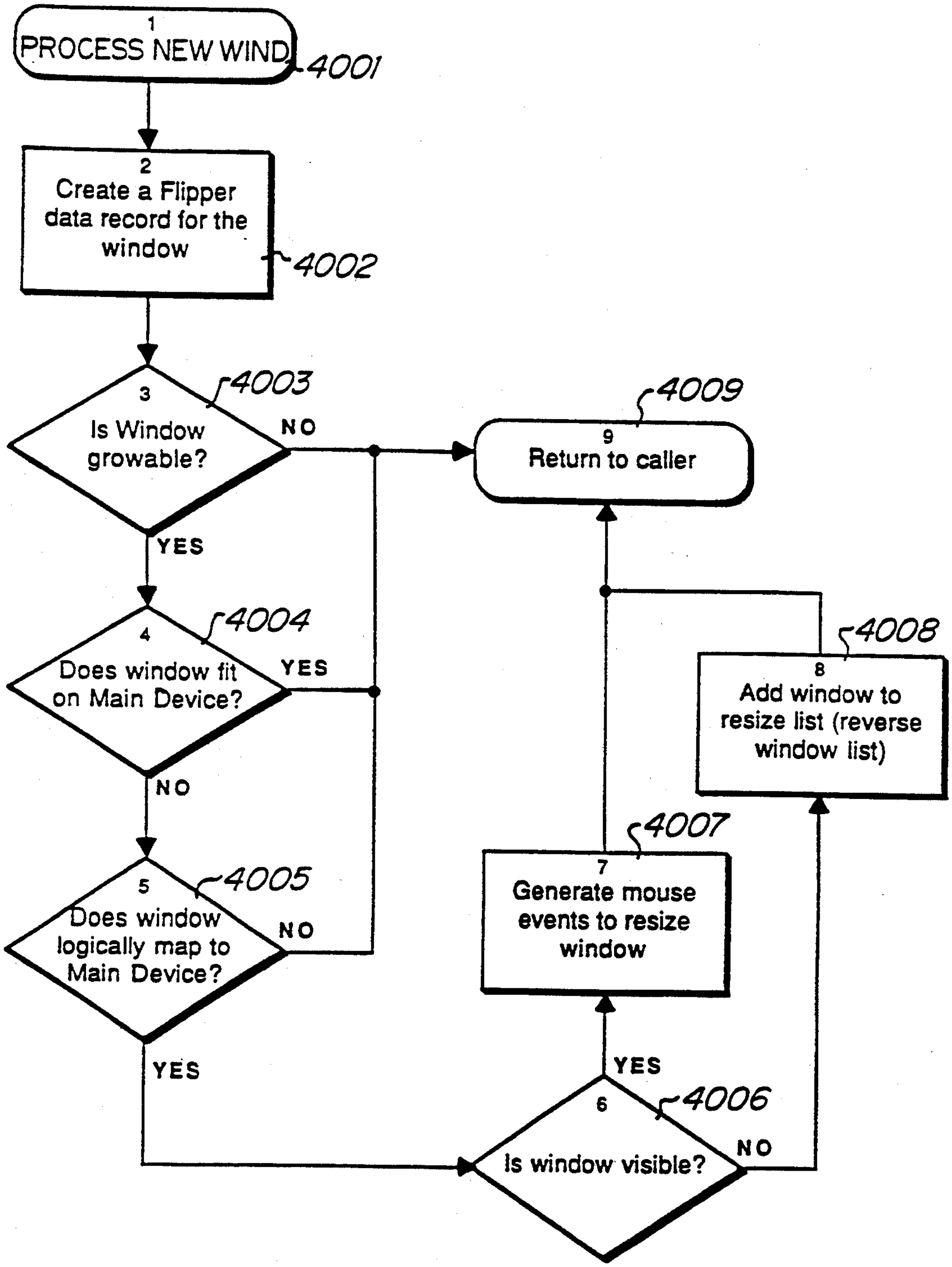
FIG. 40 shows a flow diagram of the software routine Process a New Window in accordance with the present invention.

Referring now to FIG. 40, the routine ProcessNewWind 4001 first executes step 4002 which creates an auxiliary data record for the window, so that the present invention may keep track of certain additional data relating to the window. Next, test 4003 is performed, which determines if the window is growable. If not, control is returned to the caller 4009. If so, test 4004 is performed, which determines if the window fits within the current bounds of the display with the menu bar. If so, control is returned to the caller 4009. If not, test 4005 is performed, which determines if the window can logically be mapped to the current dimensions of the display with the menu bar. If not, control is returned to the caller 4009. If so, test 4006 is performed, which determines if the window is visible. If so, step 4007 is executed which generates phantom mouse clicks to resize the window so that it fits within the current dimensions of the display with the menu bar. If not, step 4008 is executed, which adds the window to the list of windows to be resized, for later action. After either case, control is next returned to the caller 4009. This routine performs two functions. First, it allocates the extra data structure used to keep track of key information needed in reorienting/resizing a window after the user flips a display. Second, it checks the size of the window to make sure that it is sized according to a previous dimension of the display that it associated with. If it is not the right size, mouse clicks are generated to resize the window to the current dimensions of the associated display.

Figure 41A:
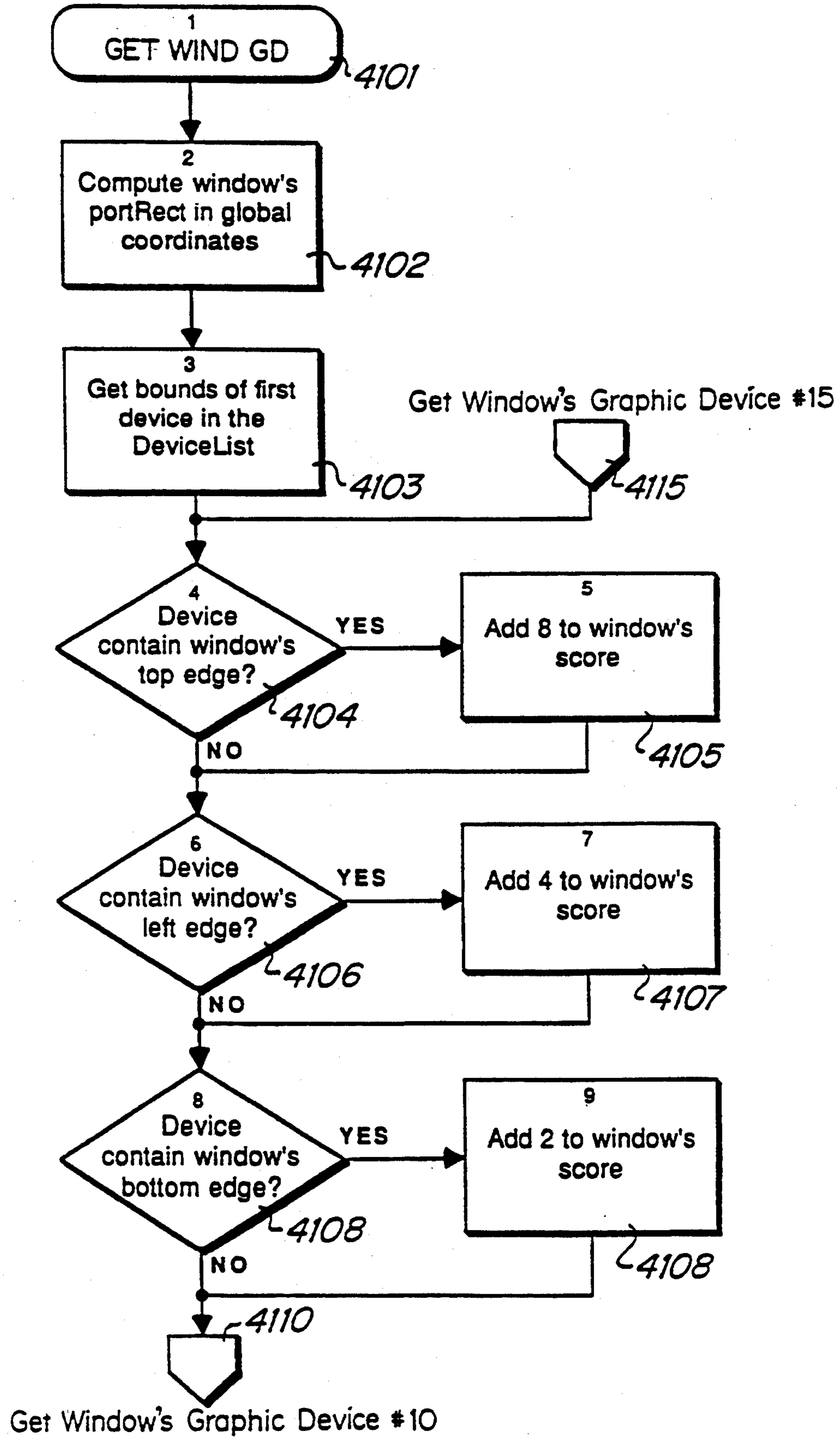
FIGS. 41(*a*) and 41(*b*) show a flow diagram of the software routine Get Window's Graphic Device in accordance with the present invention.
Figure 41B:
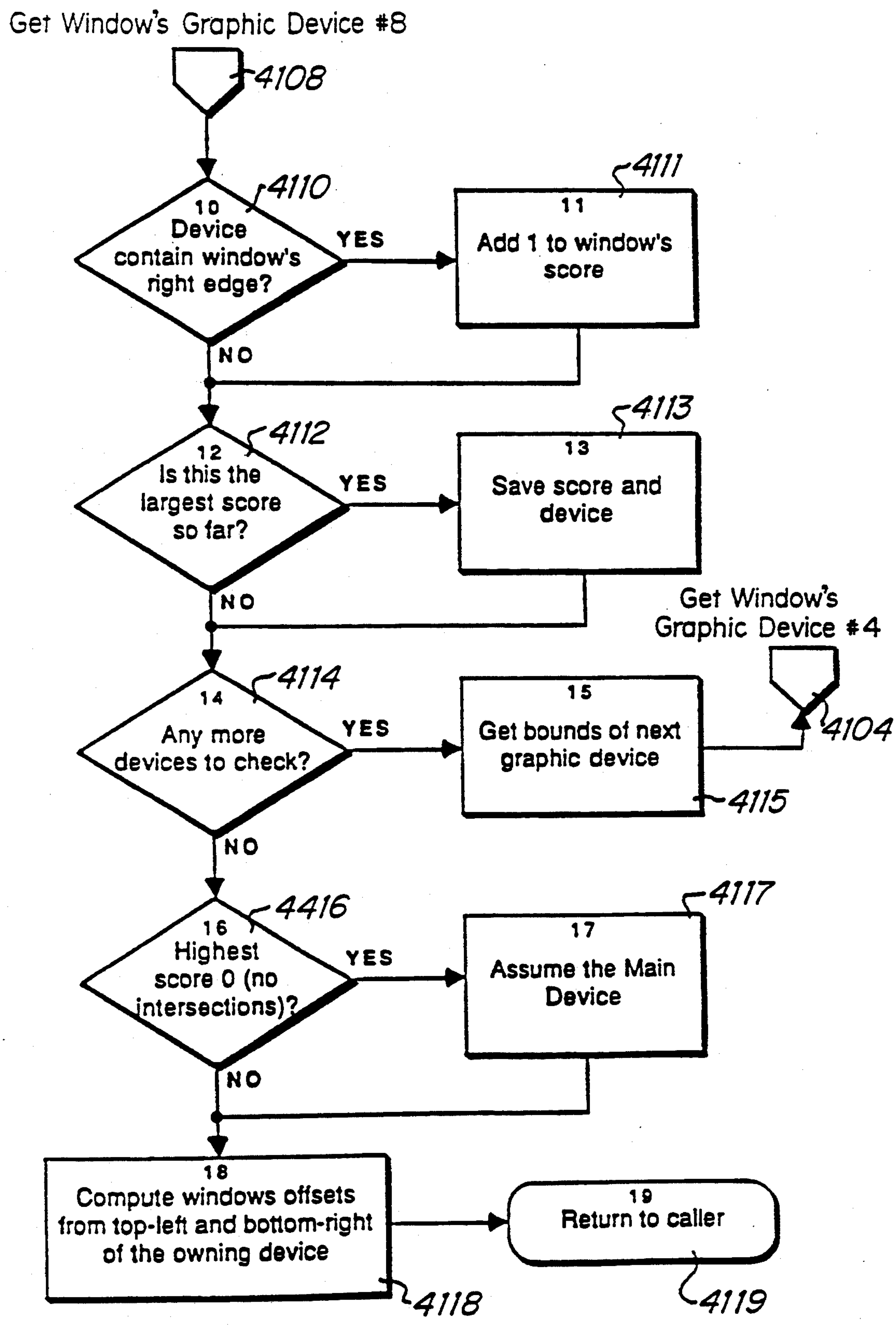

Referring now to FIGS. 41(*a*) and 41(*b*), the routine GetWindGD 4101 first executes step 4102 which returns a rectangle containing the coordinates of the visible portion of the window translated to the display coordinate system. Next, step 4103 is executed which gets the coordinates of the first display device in the system. Next, test 4104 is performed using the rectangles representing the window and display, which determines if the device contains the top edge of the window. If not, control is passed to step 4106. Otherwise, step 4105 is executed which adds the quantity eight to a weighted sum of the window for determining which display will be associated with the window. Next, test 4106 is performed, which determines if the device contains the left edge of the window. If not, control is passed to step 4108. Otherwise, step 4107 is executed which adds the quantity four to the weighted sum. Next, test 4108 is performed, which determines if the device contains the bottom edge of the window. If not, control is passed to step 4110. Otherwise, step 4109 is executed which adds the quantity two to the weighted sum. Next, test 4110 is performed, which determines if the device contains the right edge of the window. If not, control is passed to step 4112. Otherwise, the step 4111 is called which adds the quantity one to the weighted sum. Next, test 4112 is performed, which determines if the weighted sum for this device is the largest one found so far. If not, control is passed to step 4114. Otherwise, step 4113 saves the score and associated device in the auxiliary data structure for the window. Next, test 4114 is performed which determines if there are any more display devices in the system. If not, control passes to step 4116. Otherwise, step 4115 gets the bounds of the next display in the system. Next, control passes to step 4104. Test 4116 determines if the highest score obtained was zero. If not, control passes to step 4118. Otherwise, step 4117 is executed which associates the display containing the menu bar with the window. Next, step 4118 is executed which computes the window offsets from the associated display's top-left and bottom-right corners. Finally, control is returned to the caller 4119. This routine determines which display is best associated with the window, which aids in maintaining the window's relative appearance when the user flips a display of the current invention. Weighting is given to the display containing the top, left, bottom, and right edges of the window, in that order.

Although the preferred embodiment operates on defined windows in a two-screen computer display system, the invention is also useful where an image may be presented on one or more displays of any sort, the orientation of which is not completely fixed.

As an additional disclosure, the source code for the preferred embodiment of the invention is included below as an appendix. It should be noted that terminology in the source code may differ slightly from that in the remainder of the specification. Any differences in terminology, however, will be easily understood by one skilled in the art.

Therefore, a method is provided for moving and resizing computer display windows when a computer display screen is flipped between portrait orientation and landscape orientation.

We claim:

1. A process, implemented by a computer system including a plurality of display devices, for moving and redimensioning a portion of an image displayed on the plurality of display devices comprising:

assigning a weight to each of a plurality of selected elements of the image portion on a first display device;

individually calculating a plurality of total weights, one for each of the display devices, of the weights of the selected elements located at least in part on each of the display devices;

comparing the total weight corresponding to each display device with the total weight of the first display device to determine whether the image portion is substantially located on the first display device;

identifying a first change in number of displayable pixels along an axis of the first display device; and moving and redimensioning the image portion displayed on the first display device according to a predefined set of computer-implemented rules responsive to identification of the first change.

2. A computer-implemented process as in claim 1, further comprising:

identifying an image portion not substantially located on a first display device; and inhibiting the moving and redimensioning of the image portion not substantially located on one of the display devices.

3. A computer-implemented process as in claim 2, wherein the weights comprise: 8 for a top edge of the portion of the image; 4 for a left edge of the portion of the image; 2 for a right edge of the portion of the image; and 1 for a bottom edge of the image portion.

* * * * *